(12) United States Patent
Trusty et al.

(10) Patent No.: US 10,651,643 B2
(45) Date of Patent: May 12, 2020

(54) APPARATUSES AND METHODS FOR CONTROLLING POWER TO ELECTRONIC DEVICES

(71) Applicant: Revive Electronics, LLC, Carmel, IN (US)

(72) Inventors: Joel Trusty, Fishers, IN (US); Reuben Zielinski, Fishers, IN (US); Mark Earle, Fishers, IN (US); David Douberteen, Indianapolis, IN (US); Scott Moorehead, Carmel, IN (US); Micah Trusty, Fishers, IN (US)

(73) Assignee: Revive Electronics, LLC, Carmel, IN (US)

( * ) Notice: Subject to any disclaimer, the term of this patent is extended or adjusted under 35 U.S.C. 154(b) by 246 days.

(21) Appl. No.: 15/632,218

(22) Filed: Jun. 23, 2017

(65) Prior Publication Data

US 2017/0288451 A1    Oct. 5, 2017

Related U.S. Application Data

(63) Continuation of application No. PCT/US2015/000239, filed on Dec. 23, 2015, which
(Continued)

(51) Int. Cl.
*H02H 5/08* (2006.01)
*H04M 1/18* (2006.01)
(Continued)

(52) U.S. Cl.
CPC .............. *H02H 5/083* (2013.01); *H04M 1/18* (2013.01); *G01N 27/223* (2013.01); *H04M 1/0262* (2013.01)

(58) Field of Classification Search
CPC ................................. H02H 5/083; H04M 1/18
See application file for complete search history.

(56) References Cited

U.S. PATENT DOCUMENTS

| 2,496,054 A | 1/1950 | Hoyter |
| 2,846,710 A | 8/1958 | Haka |
| (Continued) | | |

FOREIGN PATENT DOCUMENTS

| CN | 2065321MT | 11/1990 |
| CN | 101106264 A | 1/2008 |
| (Continued) | | |

OTHER PUBLICATIONS

Partial Supplementary European Search Report dated Aug. 30, 2018 in connection with European Application No. 15873786.6, 12 pages.

(Continued)

*Primary Examiner* — Carlos Amaya
*Assistant Examiner* — David A Shiao
(74) *Attorney, Agent, or Firm* — Baker & McKenzie LLP

(57) ABSTRACT

Methods and apparatuses for detecting when an electronic device, preferably a portable electronic device (PED) in some embodiments, has been exposed to moisture, and inhibiting the flow of electrical power to the electronic device when the moisture is too high or increasing too fast are disclosed. Embodiments sample air within the device, measure the moisture in the sampled air, inhibit the connection of electrical power to the device if the moisture exceeds a threshold, and permit the connection of electrical power to the device if the moisture is below a threshold. Some embodiments measure the moisture in the ambient air to improve effectiveness. Other embodiments allow resetting of a tripped condition. Other embodiments include constant sampling of air from within the device to assist drying, and
(Continued)

inhibiting application of power to the device until the device is sufficiently dry. Still other embodiments interrupt power from the battery within the device.

17 Claims, 26 Drawing Sheets

Related U.S. Application Data is a continuation-in-part of application No. 14/903,886, filed as application No. PCT/US2014/046151 on Jul. 10, 2014, now abandoned.

(60) Provisional application No. 61/844,654, filed on Jul. 10, 2013, provisional application No. 62/095,997, filed on Dec. 23, 2014.

(51) Int. Cl.
  *G01N 27/22* (2006.01)
  *H04M 1/02* (2006.01)

(56) References Cited

U.S. PATENT DOCUMENTS

| | | |
|---|---|---|
| 3,897,604 A | 8/1975 | Weimer |
| 3,932,944 A | 1/1976 | Chiba |
| 4,020,563 A | 5/1977 | Hoefer |
| 4,386,471 A | 6/1983 | Bowrey et al. |
| 4,464,582 A | 8/1984 | Aragaki et al. |
| 4,515,751 A | 5/1985 | Krieg, Jr. |
| 4,589,971 A | 5/1986 | Mayeaux |
| 4,704,805 A | 11/1987 | Kaya et al. |
| 4,733,428 A | 3/1988 | Malinge et al. |
| 4,882,851 A | 11/1989 | Wennerstrum et al. |
| 5,005,410 A | 4/1991 | Webster et al. |
| 5,039,696 A | 8/1991 | Niwata et al. |
| 5,067,251 A | 11/1991 | Zlobinsky et al. |
| 5,172,488 A | 12/1992 | Okane |
| 5,293,697 A | 3/1994 | Kawakami |
| 5,318,164 A | 6/1994 | Barnes et al. |
| 5,335,703 A | 8/1994 | deJong |
| 5,343,747 A | 9/1994 | Rosen |
| 5,349,845 A | 9/1994 | Blom |
| 5,399,920 A | 3/1995 | Van Tran |
| 5,456,025 A | 10/1995 | Joiner et al. |
| 5,578,753 A | 11/1996 | Weiss et al. |
| 5,625,962 A | 5/1997 | Fleissner |
| 5,640,783 A | 6/1997 | Schumaier |
| 5,671,546 A | 9/1997 | Haala |
| 5,715,612 A | 2/1998 | Schwenkler |
| 5,732,478 A | 3/1998 | Chapman et al. |
| 5,852,879 A | 12/1998 | Schumaier |
| 5,889,466 A | 3/1999 | Ferguson |
| 5,992,049 A | 11/1999 | Trost |
| 6,025,580 A | 2/2000 | Yagi |
| 6,067,727 A | 5/2000 | Muraoka |
| 6,108,074 A | 8/2000 | Bloom |
| 6,122,836 A | 9/2000 | Tenedini et al. |
| 6,185,839 B1 | 2/2001 | Kholodenko |
| 6,551,552 B1 | 4/2003 | Lyublinski et al. |
| 6,552,308 B2 | 4/2003 | Nishimura |
| 6,557,268 B1 | 5/2003 | Berg et al. |
| 6,568,249 B2 | 5/2003 | Devine |
| 6,622,399 B1 | 9/2003 | Theriault et al. |
| 6,675,636 B2 | 1/2004 | Sadler |
| 6,821,025 B2 | 11/2004 | Gerhard |
| 6,834,443 B2 | 12/2004 | Bloemendaal |
| 6,874,247 B1 | 4/2005 | Hsu |
| 6,893,530 B2 | 5/2005 | Kishimoto et al. |
| 6,938,359 B2 | 9/2005 | Birgersson et al. |
| 7,050,837 B2 | 5/2006 | Menz et al. |
| 7,194,822 B2 | 3/2007 | Kolari |
| 7,205,900 B2 | 4/2007 | Liu et al. |
| 7,243,857 B2 | 7/2007 | Kallestad |
| 7,460,350 B2 | 12/2008 | Talbot et al. |
| 7,557,466 B2 | 7/2009 | Wong et al. |
| 7,594,343 B2 | 9/2009 | Woerdehoff et al. |
| 7,612,315 B2 | 11/2009 | Corradini |
| 7,631,538 B2 | 12/2009 | Imhof |
| 7,665,226 B2 | 2/2010 | Tsuruta et al. |
| 7,814,678 B2 | 10/2010 | Romanek |
| 7,992,318 B2 | 8/2011 | Kawaji |
| 8,058,588 B2 | 11/2011 | Gagas et al. |
| 8,112,900 B2 | 2/2012 | Romanek |
| 8,203,689 B2 | 6/2012 | Gomi |
| 8,281,499 B2 | 10/2012 | Friesen et al. |
| 8,355,233 B2 | 1/2013 | Schumacher et al. |
| 8,416,542 B2 | 4/2013 | Nakamura |
| 8,446,049 B2 | 5/2013 | Lee |
| 8,498,087 B2 | 7/2013 | Rabu et al. |
| 8,689,461 B1 | 4/2014 | Cookson |
| 8,886,971 B2 | 11/2014 | Chuang |
| 8,991,067 B2 | 3/2015 | Zielinski |
| 9,071,046 B2 | 6/2015 | Stevens et al. |
| 2001/0025431 A1 | 10/2001 | Kitano et al. |
| 2001/0045421 A1 | 11/2001 | Sullivan |
| 2003/0019124 A1 | 1/2003 | Miyakawa et al. |
| 2003/0115768 A1 | 6/2003 | Hoffman |
| 2004/0050076 A1 | 3/2004 | Palfy et al. |
| 2004/0079136 A1 | 4/2004 | Pillon |
| 2005/0079888 A1 | 4/2005 | Menz et al. |
| 2005/0218239 A1 | 10/2005 | Busch |
| 2006/0029730 A1 | 2/2006 | Campbell |
| 2006/0058069 A1 | 3/2006 | Garcia et al. |
| 2006/0164772 A1* | 7/2006 | Guo ............... H02H 3/445 |
| | | 361/93.1 |
| 2006/0208914 A1 | 9/2006 | Liu et al. |
| 2006/0255166 A1 | 11/2006 | Imamura et al. |
| 2007/0258870 A1 | 11/2007 | Brown et al. |
| 2008/0013241 A1 | 1/2008 | Wong et al. |
| 2008/0204218 A1 | 8/2008 | Tupman |
| 2008/0281528 A1 | 11/2008 | Relle, Jr. |
| 2009/0019718 A1 | 1/2009 | Mittleman et al. |
| 2009/0145783 A1 | 6/2009 | Forker |
| 2009/0158614 A1 | 6/2009 | Singh et al. |
| 2009/0227118 A1 | 9/2009 | Liu et al. |
| 2009/0272176 A1 | 11/2009 | Lopez et al. |
| 2009/0273480 A1* | 11/2009 | Mittleman ......... H04M 1/0274 |
| | | 340/604 |
| 2010/0032600 A1 | 2/2010 | Doe et al. |
| 2010/0095504 A1 | 4/2010 | Slack et al. |
| 2010/0103566 A1 | 4/2010 | Chen |
| 2010/0122470 A1 | 5/2010 | Davis et al. |
| 2010/0273477 A1 | 10/2010 | Namaky |
| 2010/0304091 A1 | 12/2010 | Wang |
| 2011/0047814 A1 | 3/2011 | Watson et al. |
| 2011/0067262 A1 | 3/2011 | Eero |
| 2011/0099831 A1 | 5/2011 | Parisi et al. |
| 2011/0104940 A1 | 5/2011 | Rabu et al. |
| 2011/0137607 A1 | 6/2011 | Hsieh |
| 2011/0279931 A1 | 11/2011 | Nakamura |
| 2012/0020015 A1 | 1/2012 | Tian et al. |
| 2012/0038374 A1 | 2/2012 | Johnson |
| 2012/0085324 A1 | 4/2012 | Saito et al. |
| 2012/0171462 A1 | 7/2012 | Tsai |
| 2012/0231841 A1 | 9/2012 | Niederberger et al. |
| 2012/0304483 A1 | 12/2012 | Sirard et al. |
| 2013/0088094 A1* | 4/2013 | Paik ............... H04M 1/18 |
| | | 307/118 |
| 2013/0096375 A1 | 4/2013 | Iyama et al. |
| 2013/0111227 A1 | 5/2013 | Sauerwein, Jr. |
| 2013/0151870 A1* | 6/2013 | Chuang .............. G06F 1/26 |
| | | 713/300 |
| 2013/0167874 A1 | 7/2013 | Mittleman et al. |
| 2013/0182360 A1* | 7/2013 | Stevens .............. H02H 5/00 |
| | | 361/71 |
| 2013/0192083 A1 | 8/2013 | Zielinski |
| 2013/0207455 A1 | 8/2013 | Doljack |
| 2013/0287213 A1* | 10/2013 | Sekiyama .......... H03G 3/20 |
| | | 381/55 |
| 2013/0339304 A1* | 12/2013 | Lee ............... G05B 1/01 |
| | | 707/652 |

(56) References Cited

U.S. PATENT DOCUMENTS

| | | | | |
|---|---|---|---|---|
| 2014/0160680 A1* | 6/2014 | Stevens | ............... | H05K 5/0213 361/700 |
| 2014/0185177 A1* | 7/2014 | Li | ........................ | H02H 5/083 361/115 |
| 2014/0191588 A1* | 7/2014 | Stevens | ............... | G06F 1/1632 307/125 |
| 2014/0191874 A1* | 7/2014 | Stevens | ............... | H03K 17/94 340/604 |
| 2014/0237268 A1* | 8/2014 | Mese | ....................... | G06F 1/26 713/300 |
| 2014/0247529 A1* | 9/2014 | Borini | ................... | H02H 5/083 361/91.2 |
| 2014/0307356 A1* | 10/2014 | Hong | ..................... | H02H 5/083 361/78 |
| 2015/0168059 A1 | 6/2015 | Zielinski | | |
| 2015/0179037 A1* | 6/2015 | Ren | ........................ | G01L 7/18 340/522 |
| 2015/0192362 A1 | 7/2015 | Zielinski | | |
| 2015/0226481 A1 | 8/2015 | Marchiori | | |
| 2016/0080553 A1* | 3/2016 | Dempster | ......... | H04M 1/72569 455/550.1 |
| 2016/0126722 A1* | 5/2016 | Liao | ....................... | H04M 1/18 361/93.1 |
| 2016/0239047 A1* | 8/2016 | Weber | ................... | G06F 1/1656 |
| 2016/0241059 A1* | 8/2016 | Li | ........................ | H04M 1/18 |
| 2016/0241945 A1* | 8/2016 | Zadesky | .............. | H04R 1/086 |

FOREIGN PATENT DOCUMENTS

| | | |
|---|---|---|
| CN | 201018665 | 2/2008 |
| CN | 101986360 | 3/2011 |
| CN | 201955259 | 8/2011 |
| CN | 102217291 A | 10/2011 |
| DE | 2631785 A1 | 4/1977 |
| DE | 102006047664 | 4/2008 |
| EP | 0539607 | 5/1993 |
| EP | 1125177 | 1/2004 |
| EP | 2810004 | 12/2014 |
| EP | 2479523 | 2/2015 |
| JP | H03124740 U | 12/1991 |
| JP | H04161021 A | 6/1992 |
| JP | 7265824 | 10/1995 |
| JP | 10174301 | 8/1998 |
| JP | 2001197175 | 7/2001 |
| JP | 3366541 B2 | 1/2003 |
| JP | 2003-502001 A | 3/2003 |
| JP | 2007135008 | 5/2007 |
| JP | 2011171894 | 9/2011 |
| KR | 20120064704 | 6/2012 |
| WO | 9848855 | 11/1998 |
| WO | 0023861 | 4/2000 |
| WO | 2000053983 | 9/2000 |
| WO | 2007033493 | 3/2007 |
| WO | 2009087102 | 7/2009 |
| WO | 2010070551 | 6/2010 |
| WO | 2011145555 | 11/2011 |
| WO | 2013116599 | 8/2013 |

OTHER PUBLICATIONS

International Search Report and Written Opinion dated May 15, 2013 in connection with International Application No. PCT/US2013/024277, 16 pages.

ehow.com, http://www.ehow.com/print/how_2042819_dry-out-wet-cell-phone.html, "How to Dry Out a Wet Cell Phone", dated Jun. 5, 2013, 2 pages.

U.S. Trademark Registration No. 4,280,438 registered Jan. 22, 2013, for the mark DRYBOX, 1 page.

Exhibitor News from International CTIA Wireless, 2012, May 3, 2013, 1 page.

Lucio, Valentino, "A Solution for Soaked Cells", San Antonio Express-News, Oct. 19, 2011, 3 pages.

Cooper, Sean, "Drybox Rescue Station: the ultimate cellphone drying system (hands-on)", www.engadget.com, May 2, 2013, 13 pages.

http://www.dryboxrescue.com/, DRYBOX The New Way to Save a Wet Phone Fast, Jun. 6, 2013, 5 pages.

International Search Report and Written Opinion dated Feb. 24, 2014 in connection with International Application No. PCT/US2013/070178.

International Preliminary Report on Patentability dated Aug. 14, 2014 in connection with International Application No. PCT/US2013/024277, 12 pages.

Final Office Action dated Sep. 3, 2014 in connection with U.S. Appl. No. 14/080,595.

Non-Final Office Action dated Sep. 20, 2013 in connection with U.S. Appl. No. 13/756,879.

Response After Non-Final Office Action dated Dec. 20, 2013 in connection with U.S. Appl. No. 13/756,879.

Final Office Action dated Feb. 28, 2014 in connection with U.S. Appl. No. 13/756,879.

Response After Final Office Action dated May 28, 2014 in connection with U.S. Appl. No. 13/756,879.

Response After Final Office Action dated Jun. 13, 2014 in connection with U.S. Appl. No. 13/756,879.

Advisory Action dated Jun. 18, 2014 in connection with U.S. Appl. No. 13/756,879.

Advisory Action dated Jul. 9, 2014 in connection with U.S. Appl. No. 13/756,879.

Response After Final dated Aug. 28, 2014 in connection with U.S. Appl. No. 13/756,879.

Non-Final Office Action dated Feb. 28, 2014 in connection with U.S. Appl. No. 14/080,595.

Response After Non-Final Action dated May 28, 2014 in connection with U.S. Appl. No. 14/080,595.

International Search Report and Written Opinion dated Aug. 27, 2014 in connection with International Application No. PCT/US2014/028634.

Notice of Allowance dated Jan. 20, 2015 in connection with U.S. Appl. No. 13/156,879.

Non-Final Office Action dated Sep. 30, 2014 in connection with U.S. Appl. No. 13/756,879.

Response After Non-Final Action dated Dec. 29, 2014 in connection with U.S. Appl. No. 13/756,879.

RCE and Response After Final Office Action dated Feb. 3, 2015 in connection with U.S. Appl. No. 14/080,595.

Third Office Action dated Aug. 22, 2018 in connection with Chinese Application No. 201480049547.9, 5 pages.

Non-Final Office Action dated Apr. 10, 2015 in connection with U.S. Appl. No. 14/080,595.

International Preliminary Report on Patentability dated May 28, 2015 in connection with International Application No. PCT/US2013/070178.

Demand and Article 34 Amendments dated Jan. 14, 2015 in connection with International Application No. PCT/US2014/028634.

International Preliminary Report on Patentability dated Apr. 15, 2015 in connection with International Application No. PCT/US2014/028634.

Extended European Search Report dated Jun. 12, 2015 in connection with European Application No. 13744398.2.

Non-Final Office Action dated Nov. 23, 2015 in connection with U.S. Appl. No. 14/080,705.

First Examination Report dated Jun. 8, 2015 in connection with Chinese Application No. 201380016934.8.

Non-Final Office Action dated Sep. 1, 2015 in connection with U.S. Appl. No. 14/213,142.

Office Action dated Oct. 23, 2015 in connection with Colombian Application No. 14189.782.

Non-Final Office Action dated Jan. 29, 2016 in connection with U.S. Appl. No. 14/080,595.

MacVittie, Lori, "Remote Management In-Reach", Network Computing, 14, 16; ProQuest p. 22, Aug. 21, 2003.

Extended European Search Report dated Mar. 23, 2017 in connection with European Application No. 14822876.0, 8 pages.

(56) References Cited

OTHER PUBLICATIONS

Examination Report dated Jan. 26, 2018 in connection with European Application No. 14822876.0, 3 pages.
Extended European Search Report dated Dec. 4, 2018 in connection with European Application No. 15873786.6, 11 pages.
First Office Action dated May 17, 2019 in connection with Colombian Application No. 16032720, 8 pages.
Eurasian Office Action dated Jul. 25, 2016 in connection with Eurasian Application No. 201491450, 2 pages.
Eurasian Office Action dated Mar. 22, 2018 in connection with Eurasian Application No. 201491450, 2 pages.
Eurasian Office Action dated Oct. 31, 2018 in connection with Eurasian Application No. 201491450, 3 pages.
Notice of Reasons for Refusal dated Sep. 26, 2017 in connection with Japanese Application No. 2016-525482, 6 pages.
Decision of Rejection dated Mar. 6, 2018 in connection with Japanese Application No. 2016-525482, 8 pages.
Decision of Grant for Patent dated Sep. 25, 2018 in connection with Japanese Application No. 2016-525482, 5 pages.
First Notification of Office Action dated Sep. 28, 2017 in connection with Chinese Application No. 201480049547.9, 29 pages.
Second Office Action dated Mar. 9, 2018 in connection with Chinese Application No. 201480049547.9, 4 pages.
Examination Report dated Jan. 21, 2020 in connection with Indian Application No. 201617004673, 6 pages.

\* cited by examiner

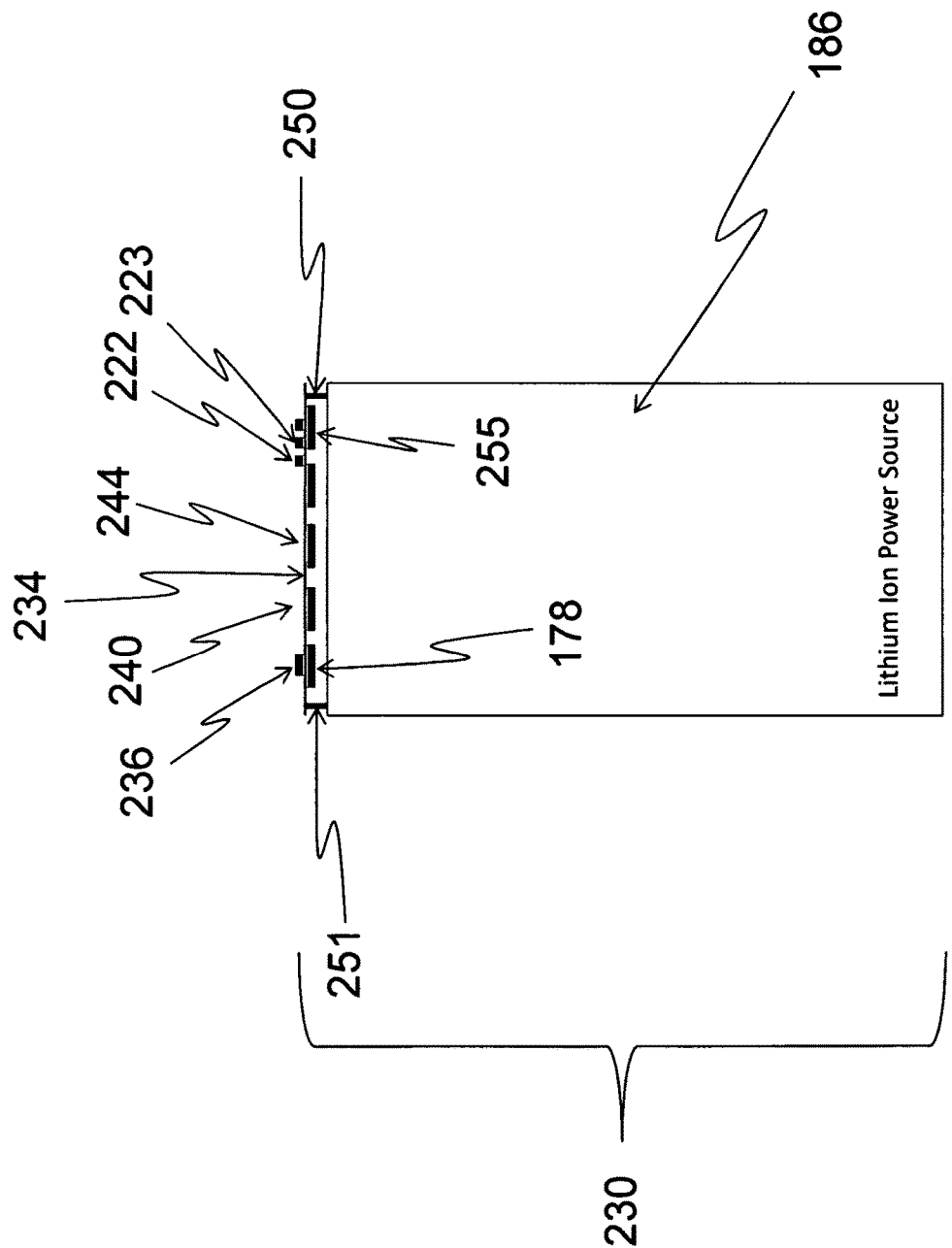

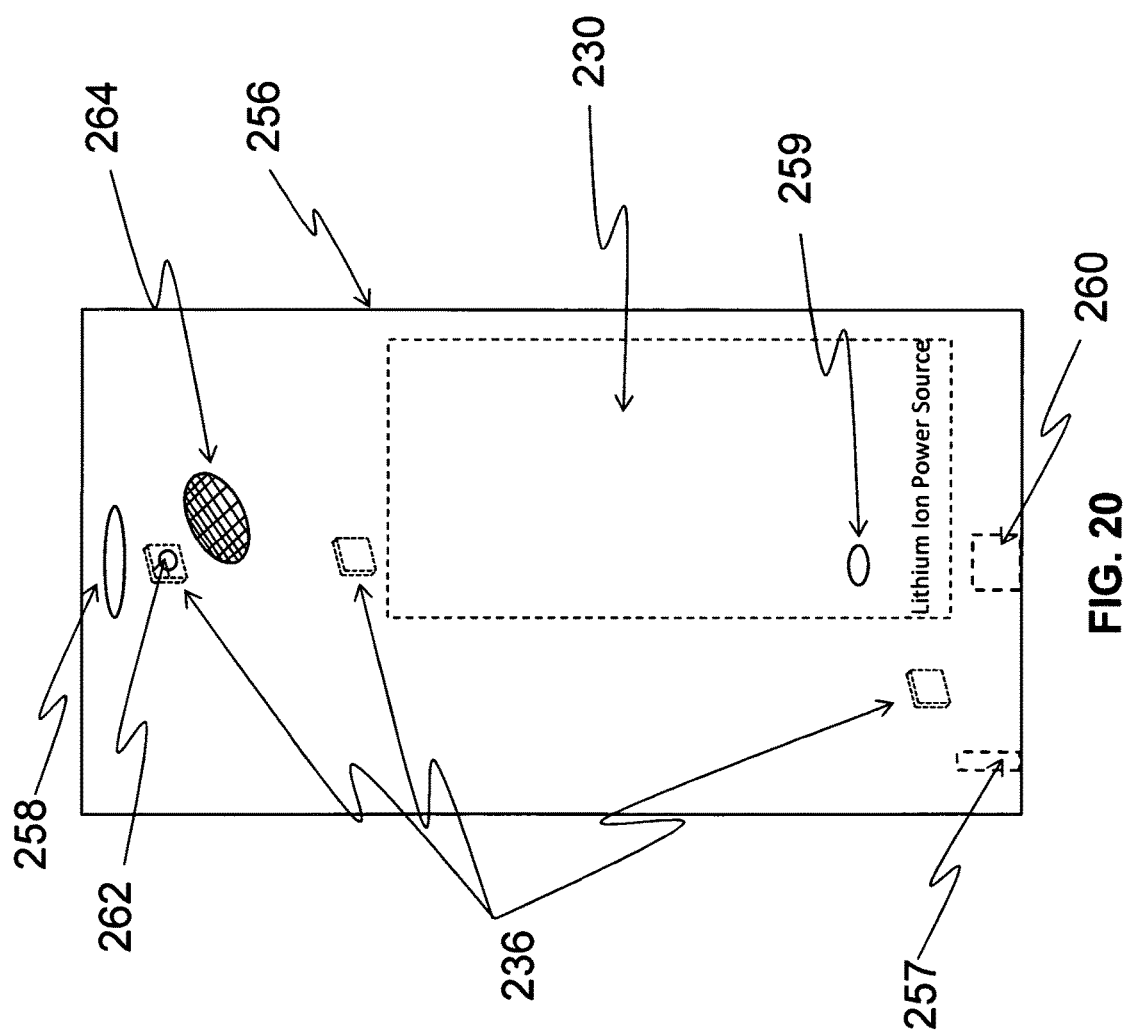

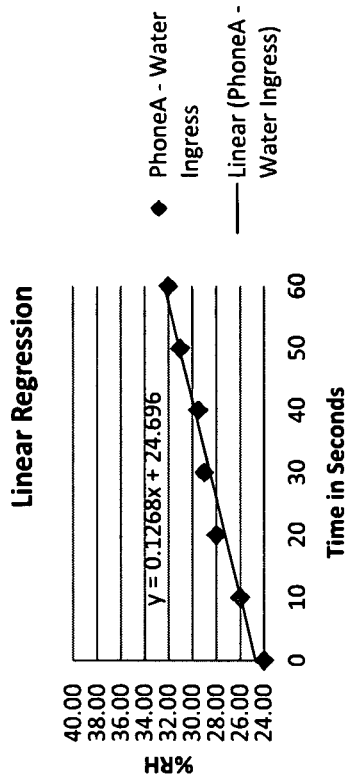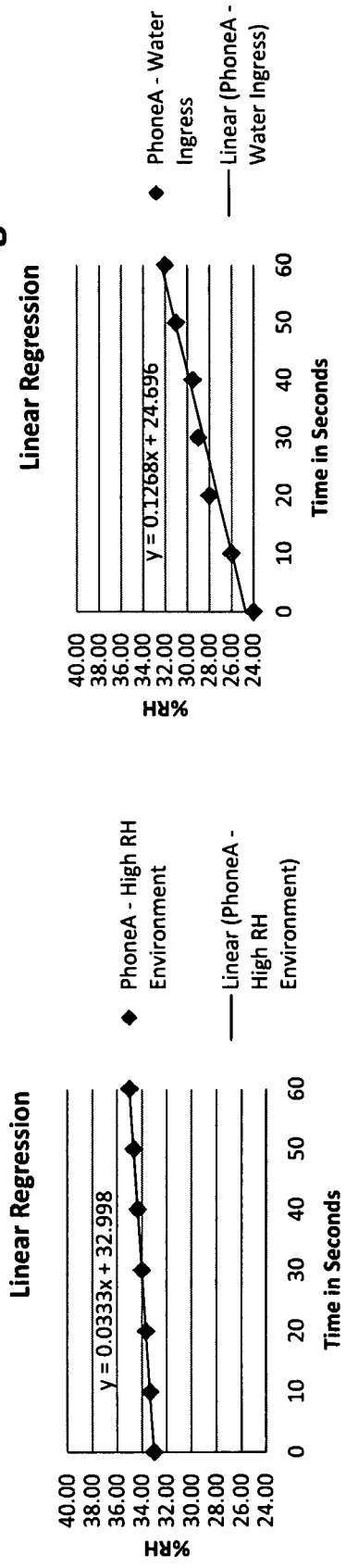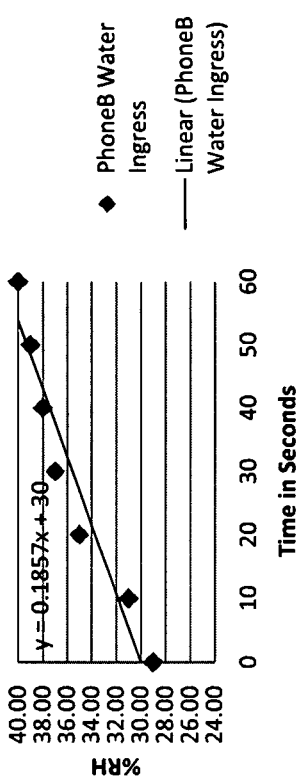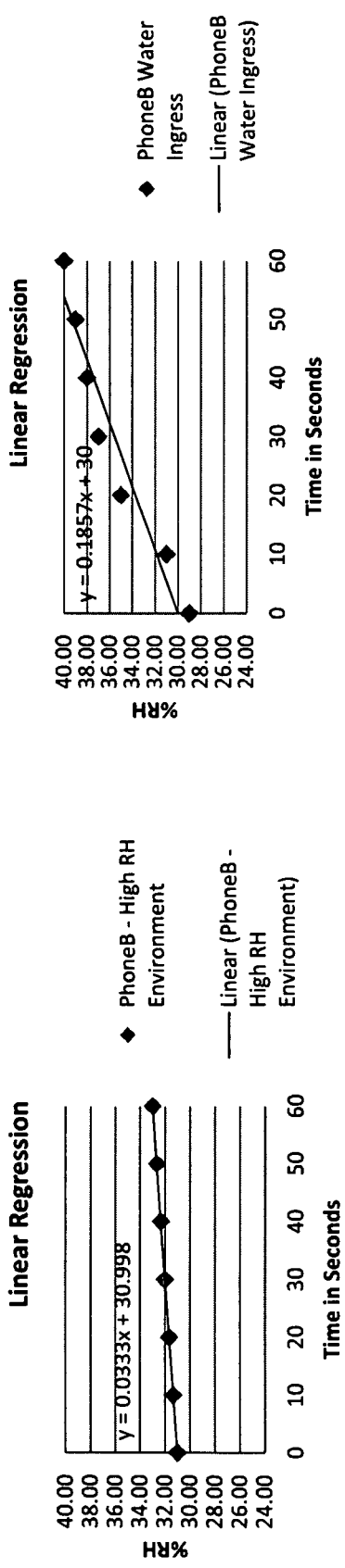
FIG. 22

APPARATUSES AND METHODS FOR CONTROLLING POWER TO ELECTRONIC DEVICES

CROSS-REFERENCE TO RELATED APPLICATIONS

This application is a continuation of International Application No. PCT/US2015/000239, filed Dec. 23, 2015, which claims the benefit of U.S. Provisional Application No. 62/095,997, filed Dec. 23, 2014. The disclosures of both applications are hereby incorporated by reference for all purposes.

FIELD

Embodiments of the present disclosure generally relate to the detection of a moist environment and/or wet circuitry within an electronic device. In some embodiments, power to the wet electronics is inhibited and/or interrupted to prevent damage of the electronic device when moisture is detected within the device. Further embodiments of the present disclosure relate to the integration of moisture detection and power interruption into the power source itself, thus providing self-protection to electronic devices.

BACKGROUND

Electronic devices are frequently manufactured using ultra-precision parts for tight fit-and-finish dimensions intended to keep moisture from entering the interior of the device. Many electronic devices are also manufactured to render disassembly by owners or users difficult without rendering the device inoperable, even prior to drying attempts. With the continued miniaturization of electronics and increasingly powerful computerized software applications, it is commonplace for people today to carry multiple electronic devices, such as portable electronic devices (PED). Cell phones are currently more ubiquitous than telephone land lines, and many people inadvertently subject these devices to contact with water (liquid or vapor) or other fluids on a daily basis throughout the world. Example locations where PED may be subjected to moisture include, for example, bathrooms, kitchens, swimming pools, lakes, washing machines, or other areas where electronic devices (e.g., small, portable electronic devices) can be submerged in water or subjected to high humidity conditions. PEDs which frequently have miniaturized solid-state transistorized memory for capturing and storing digitized media in the form of phone contact lists, e-mail addresses, digitized photographs, digitized music and the like, are frequently rendered completely (or at least partially) inoperable after being subjected to a sufficient amount of moisture.

SUMMARY

It was discovered by the inventors of the inventions disclosed herein that a common reaction for an owner of a PED that has been rendered at least partially inoperative due to moisture intrusion is to connect the device to a charging source. This reaction is presumably due to the owner having a natural response to connect the PED to a charger when the device is inoperative. Although the precise reason for this reaction is speculative, it may be caused by owner's knowledge that the PED is battery powered, and a likely cause of any inoperative battery powered device is a low battery state. Indeed, an owner may have previously "fixed" an inoperative electronic device by simply connecting the device to a charger. As such, when faced with a blank display, a common reaction is to assume a dead battery, and proceed to connect the device to a charger.

Regardless of the underlying rationale, this common reaction typically damages the electronics within the PED if the device has been rendered inoperative due to moisture intrusion. Once the device is subjected to power from either the internal power source or external charging circuit, and because the electronic device is wet and therefore highly susceptible to the flow of electrons along unintended pathways, it is common for a wet electronic device to be permanently damaged once connected to a power source. Without protection to prevent the electrons from flowing along unintended pathways (e.g., some form of "trip" circuitry), the internal electronics are "shorted." Depending on where the moisture resides in the electronic device, the shorting can cause damage to various parts of the device, which can take the form of broad damage or local damage (such as local damage to the digitized screen or the battery charging circuit itself). Because internal power sources have charging circuits integrated into the power source itself, the power source charging circuit can be electrically damaged beyond repair. Unless the user realizes that the device is inoperative due to moisture intrusion, permanent damage to the device will typically occur without the user's knowledge. Moreover, since charging devices currently available on the market do not incorporate a moisture detector or other means of detecting the extent of the wetness within the device, the consumer is left to guess whether he or she should try charging the PED to render it operable again.

Even a small amount of water (or moisture) intrusion into a PED can be sufficient to adversely affect the operation of the device, and potentially render the device inoperative. For example, a small drop of liquid water less than 1 mm in diameter dispersed within an electronic device (such as a smartphone) can raise the relative humidity inside the electronic device three to four percent (3%-4%), thereby rendering the device inoperative.

It was realized by the inventors that new methods and apparatuses (one example being a type of "smart" charging system) could reduce or prevent damage to electronic devices suffering from moisture intrusion, and particularly in situations where there is no exterior indication to the user that the interior of the electronic device is indeed wet.

Embodiments of the present disclosure relate to apparatuses and methods to prevent connection of electrical power to components of an electronic device (preferably a PED in at least one embodiment) in situations where moisture within the device are sufficiently high to damage (or potentially damage) the device when the device is connected to an electrical power source. Certain embodiments relate to humidity detection during an attempted charging event, in-line vacuum-scavenging, or both. In some embodiments, the charger does not apply power to a connected device until certain conditions are met. If a wet or high moisture condition is detected after connecting a charger to an electronic device, power may be withheld from the electronic device to protect the wet electronic device from damage. In other embodiments, humidity detection techniques are integrated into a charging circuit that is an integral part of the power source. In some embodiments, the power source itself is interrupted from the charging circuit, thus permitting the electronic device to self-protect itself.

In certain embodiments, gas (e.g., air) is extracted from within the electronic device, such as via a micro-miniature vacuum-scavenging pump. A moisture detector then detects moisture within the extracted air. An optional chamber encompasses both the pump outlet and the moisture detector to facilitate delivery of extracted air to the sensor. The moisture (e.g., humidity) of the extracted air is indicative of the moisture within the electronic device. In at least one embodiment, ambient air is sampled and the moisture content (e.g., the relative humidity) of the extracted air is compared to the moisture content (e.g., relative humidity) of the ambient air. If the moisture content of the extracted air is sufficiently low, electrical power is supplied to the device.

Still further embodiments of the present disclosure relate to apparatuses and methods to detect high moisture conditions, high battery discharge conditions, or both as related to a battery within an electronic device (again, preferably a PED in at least one embodiment), and to prevent the battery from discharging at a rate that will damage the device. Some embodiments employ an active control of the battery to prevent high discharge rates, and some embodiments disconnect the battery from the electronic device when a high moisture condition is detected. By protecting the circuitry in the electronic device from high currents that can irreparably damage the circuitry, the device can be dried and returned to a fully-operational state. The moisture detection and/or current limiting circuitry can be part of the battery, part of the electronic device, or part of a separate device that may be positioned between the battery and the electronic device (e.g., a battery case or clip that transfers the electrical energy of the battery to the electronic device). In embodiments with both moisture detection and current controlling circuitry, the moisture detection and current controlling circuitry can be located on the same device (e.g., both located on the battery, electronic device or separate device), or the moisture detection and current controlling circuitry can be located on different devices.

Certain features of the present disclosure address these and other needs and provide other important advantages. This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this disclosure.

FIG. 19 is a top view of a power source and charging printed circuit board depicting electrical charging components on charging circuit printed circuit board together with power interrupter circuitry according to one embodiment of an electronic power interruption arrangement of the present invention.

FIG. 20 is a front view of a smart phone depicting various locations that a moisture sensor could be mounted within the phone for optimal moisture sensing according to various embodiments of an electronic power interruption arrangement of the present invention.

FIG. 22 is a graphical representation of the scatter plots of the data in FIG. 21 with slopes and y-intercepts depicted for purposes of showing the discernable difference between high-humidity conditions in the environment vs. high-humidity conditions as a result of water ingress.

DESCRIPTION OF THE ILLUSTRATED EMBODIMENTS

Figure 1:
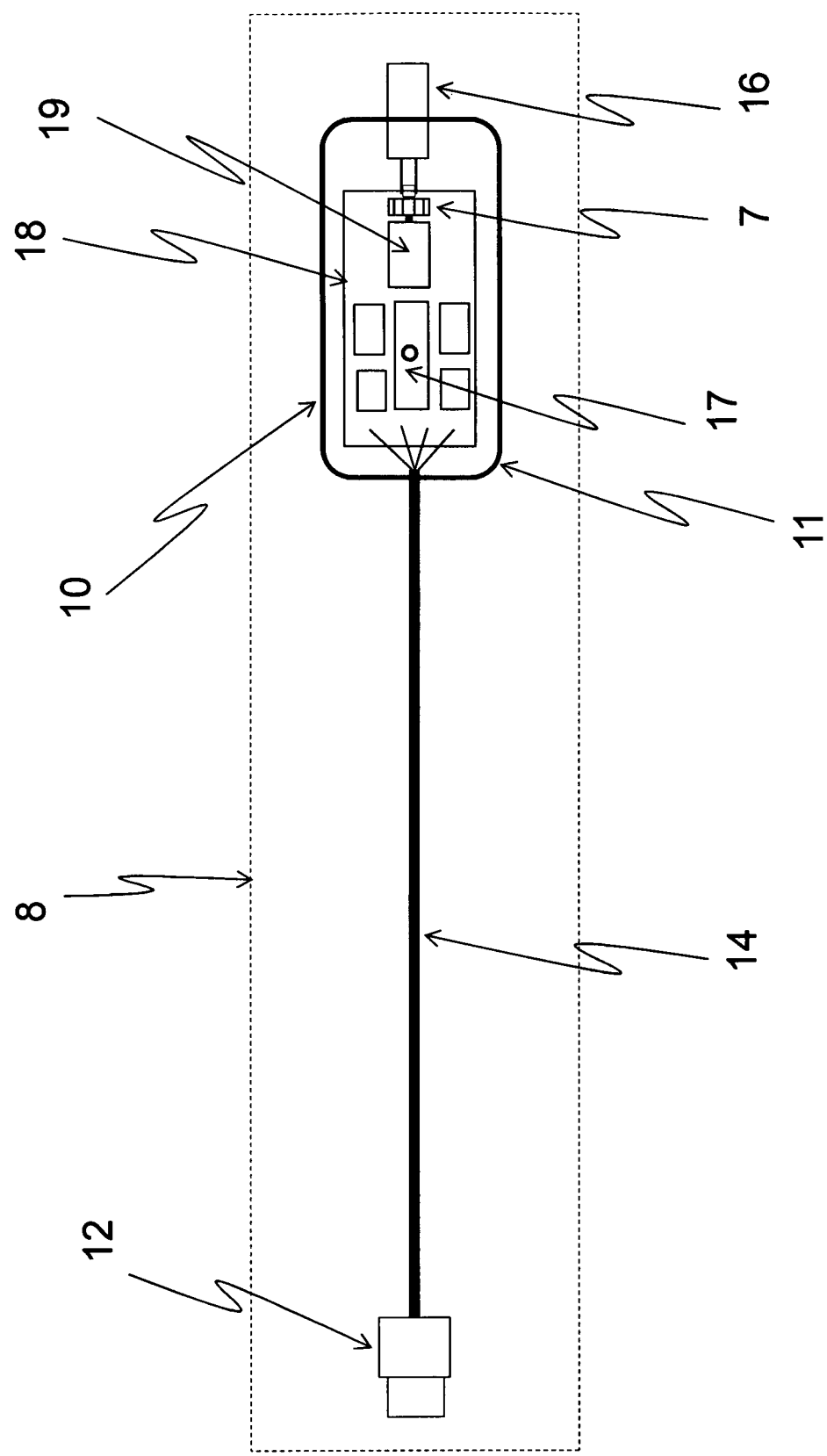
FIG. 1 is a top view of a power interrupter according to one embodiment of the present invention.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the disclosure as illustrated herein are contemplated as would normally occur to one skilled in the art to which the invention relates. At least one embodiment is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Elements depicted in one figure with reference numerals similar to or the same as those depicted in other figure(s) function similarly to or the same as the elements in the other figure(s) except as shown and/or described.

Embodiments of the present disclosure include devices and equipment generally used for charging or providing electrical power to electronic devices, preferably a portable electronic device (PED) in at least one embodiment. Embodiments include methods and apparatuses for interrupting and/or preventing the connection of an electronic device (e.g., PEDs such as cell phones, digital music players, pagers, cameras, tablet computers, laptop computers, earbuds, hearing aids, and wearable computers (e.g., Apple Watch, Google Glass, and Fitbit®) to a power source when the device has been subjected to water, high-humidity conditions, or other deleterious wetting agents that can render the device inoperable. At least one embodiment provides a vacuum scavenger pneumatically coupled to a moisture detector to detect moisture within the device. The moisture detector can provide a signal to a controller, which is capable of interrupting power to the device. The signal from the moisture detector can be variable and contain profiles that indicate the degree (or extent) of wetness of (or within) the device. This signal can be used to actuate a relay and provide a user a visual indication that the charging circuit has been "tripped" (interrupted) or, alternatively, is operational and charging or providing electrical power to the device. Thus, a device that may otherwise be damaged when it is connected to an electrical charging or power source is protected from electrical damage by this invention.

A top view of a power interrupter 8 (e.g., an apparatus for interrupting power while charging or providing electrical power to wet electronic devices) according to one embodiment of the present invention is shown in FIG. 1. Power interrupter 8 includes a housing 11, a power connector 12 (e.g., an electrical wall plug or a standard USB-A connector), an electrical cable 14, and electronics control unit 10 (which may be over-molded). Electronics control unit 10 preferably includes electronics (e.g., a printed circuit board 19), a moisture detector (e.g., moisture sensor 17), an electronic device connector 16 (e.g., a USB Mini-B connector), a pneumatic connector adapted to connect to a port of the electronic device (e.g., a headphone jack, a power receptacle, a multi-pin connector, a docking connector, etc.) and withdraw gas (e.g., air) from the electronic device, an optional pump 7 (which in at least one embodiment is a micro vacuum impeller mechanism), and a means for directing air from the pneumatic connector electronic device connector 16 to the moisture sensor 17, such as an optional passageway, plenum, tube, enclosure (e.g., scavenged air enclosure 18), etc. In some embodiments, the housing itself is sufficient to direct air from the pneumatic port to the moisture sensor 17 eliminating the need for a passageway or a scavenged air enclosure.

In the illustrated embodiment of FIG. 1, the pneumatic connector and the electronic device connector 16 are the same structure and the following discussion assumes such a configuration. However, alternate embodiments include a pneumatic connector and an electronic device connector 16 that are defined by different structures and may connect to different ports of the electronic device.

Cable 14 may be fabricated from any materials useful for delivering electrical energy for charging or providing electrical power to electronic devices. Scavenged air enclosure 18 may be fabricated from any material capable of directing air to moisture sensor 17. In some embodiments, air enclosure 18 can be formed using various manufacturing processes, and can withstand various processes such as overmolding without adversely affecting its functionality. In at least one embodiment, air enclosure 18 is formed of an injected molded material, such as plastic. Although power interrupter 8 is depicted as using a USB Mini-B connector for connecting to a device that has potentially been exposed to moisture, other embodiments include other connectors that may be of a standard or specialized configuration.

Figure 2:
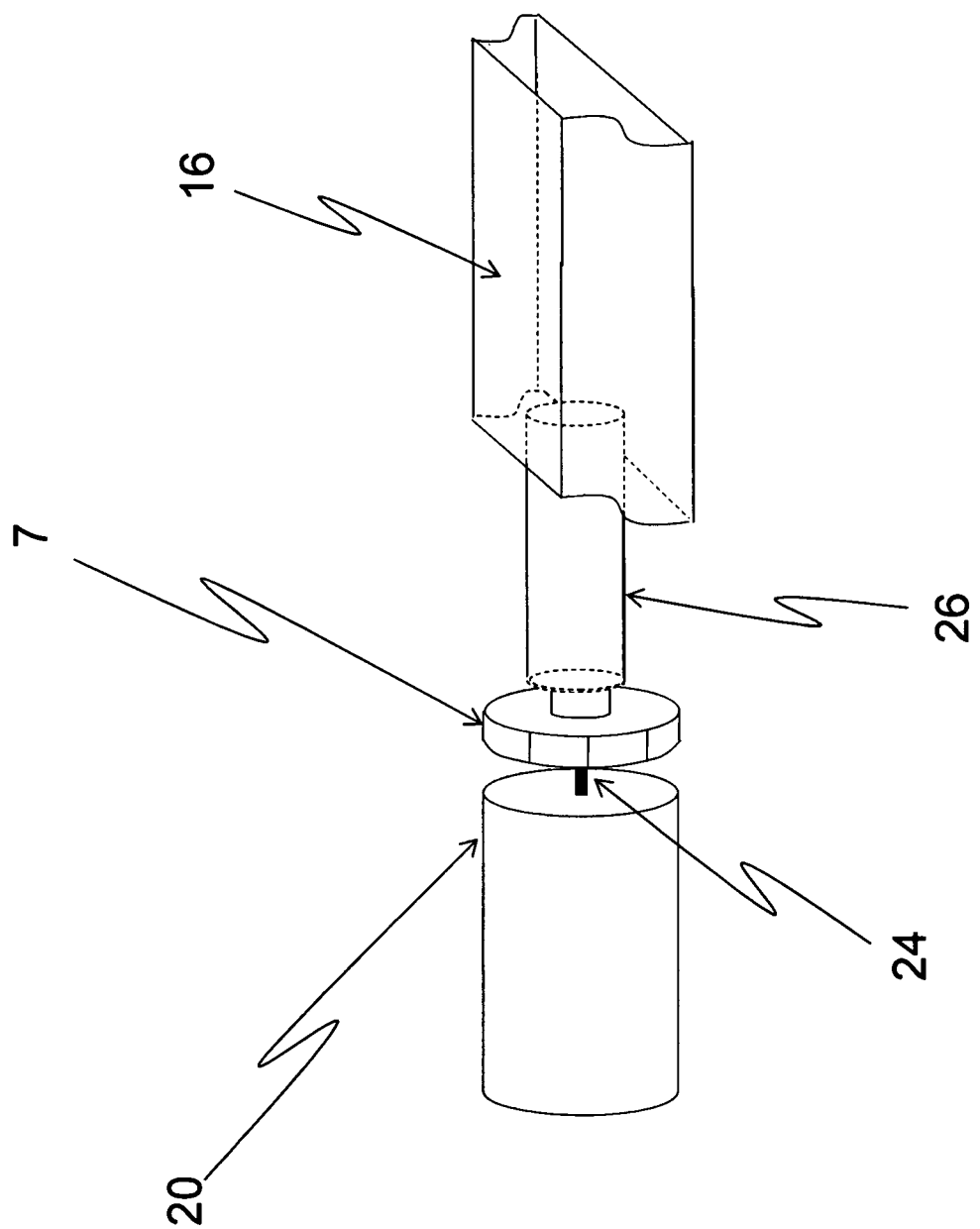
FIG. 2 is a partial enlarged view of the power interrupter depicted in FIG. 1.

FIG. 2 depicts an enlarged view of a vacuum scavenger according to at least one embodiment of the present invention. This embodiment includes a motor 20 (e.g., a micro motor), pump 7 and a connector (e.g., tube 26) pneumatically connecting pump 7 and electronic device connector 16. Pump 7 may be connected to motor 20 in a variety of manners, one example being a micro motor armature shaft 24. When driven by motor 20, pump 7 draws gas (e.g., air) from connector 16 and through tube 26. When connected to an electronic device, such as being connected to an existing port of the device, gas (e.g., air) will be drawn from the port of the device, through connector 16 and through tube 26.

Figure 3:
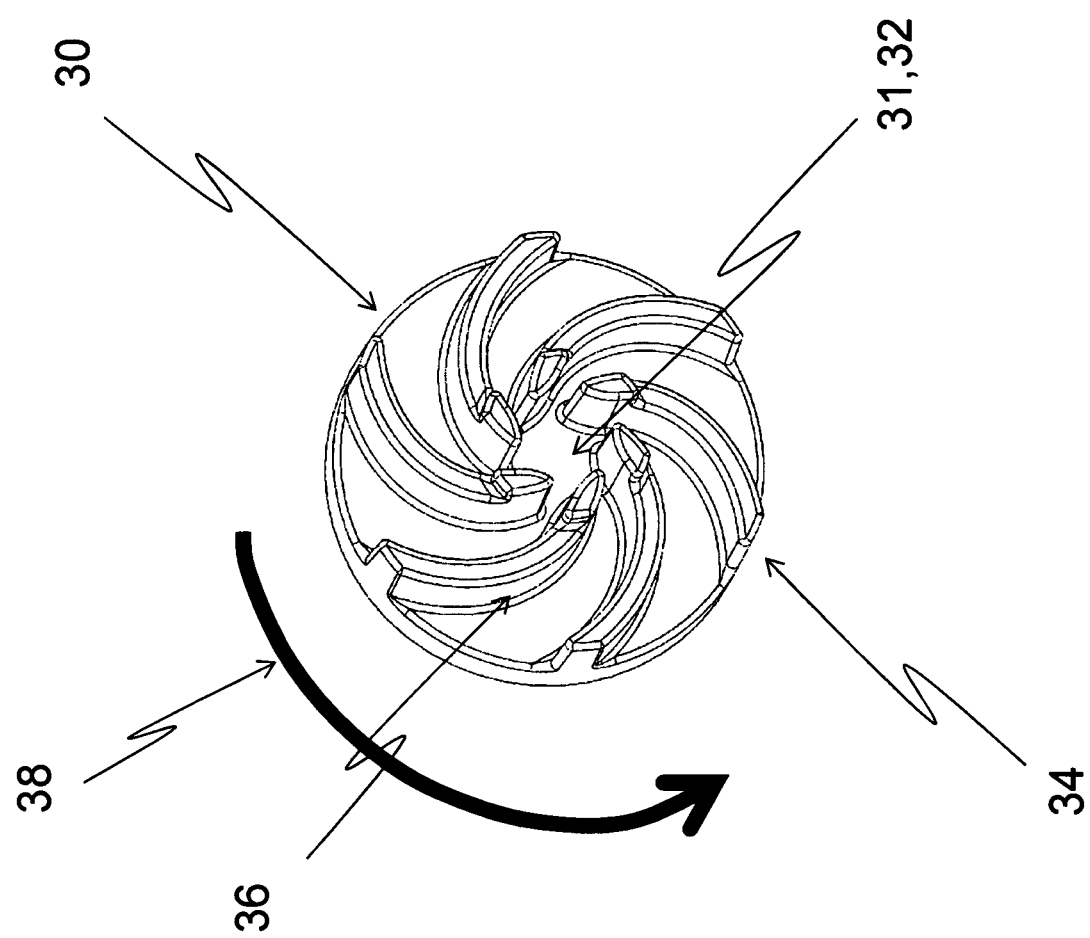
FIG. 3 is an isometric view of an impeller with one side plate removed and usable with the power interrupter depicted in FIG. 1 according to one embodiment of the present invention.
Figure 4:
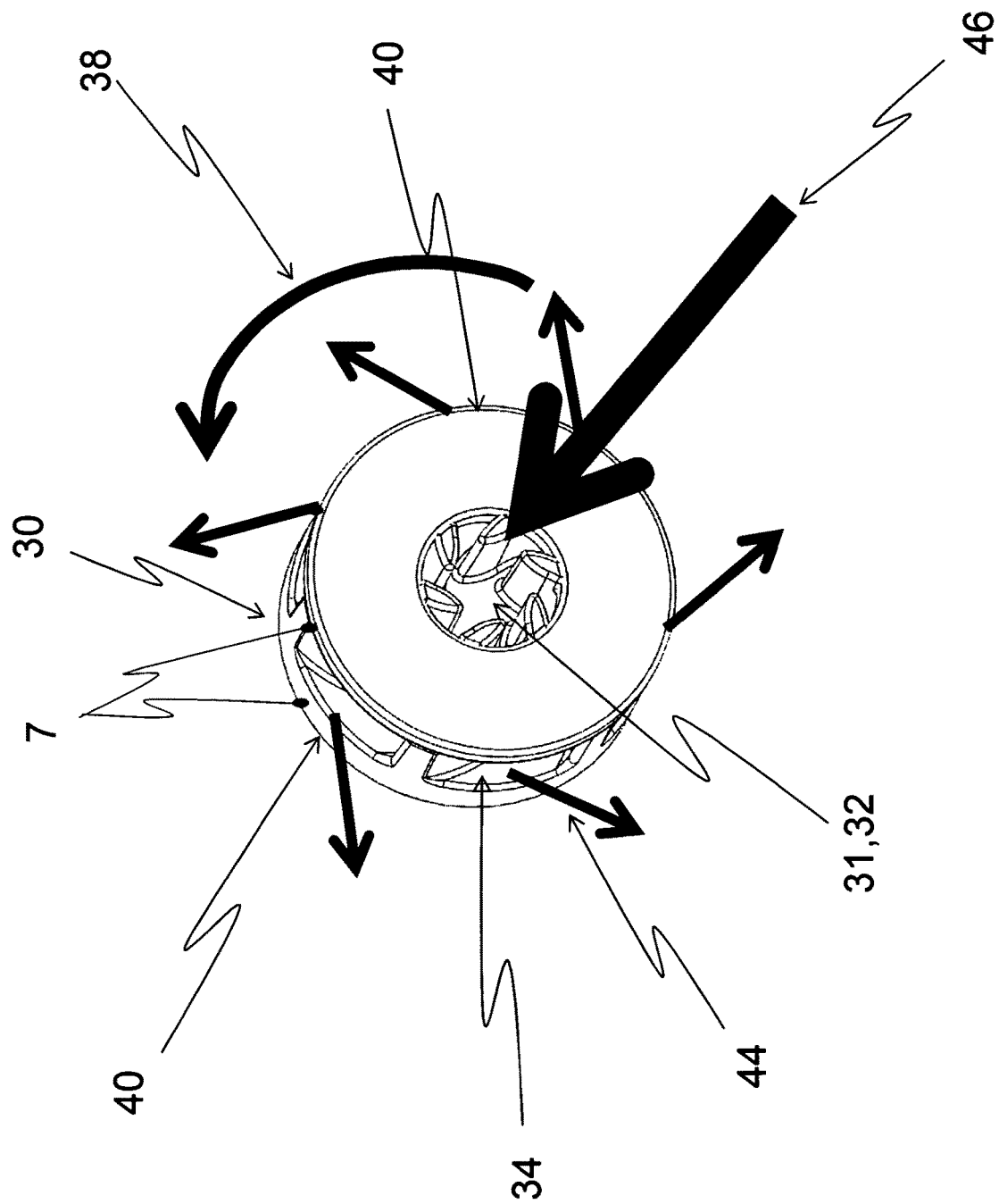
FIG. 4 is an isometric view of the impeller depicted in FIG. 3 with the removed side plate in position, rotating counterclockwise (as depicted from the reader's perspective), with airflow vectors depicting the general flow of air through and around the impeller.

FIGS. 3 and 4 depict a pump 7 according to at least one embodiment of the present invention. In the depicted embodiment, pump 7 includes an impeller (e.g., micro impeller 30), aperture 32 and exhaust 34. Exhaust 34 is defined by an open region disposed around the circumference of pump 7, and may include ducts that direct the gas in a particular direction.

Impeller 30 also includes one or more vanes 36, which are depicted as being curved in FIG. 3, but may take on different shapes such as straight or segmented. Vanes 36 are frequently positioned between two surfaces 40. In at least one embodiment, one surface includes an aperture 32 at (or near) the center of vanes 36, which forms an intake 31 when impeller is rotated in the appropriate direction, such as depicted in FIG. 4. At least one side surface 40 may be integral with vanes 36, and at least one side surface 40 may be a separately constructed member that is connected to vanes 36.

When actuated by motor 20 to rotate in direction 38, gas (e.g., air) flows into the pump 7 generally in direction 46 and radially out of pump 7. The exiting gas travels generally along direction vectors 44. Impeller 30 forces gas (e.g., air) out through exhaust 34 and imparts a radial component of velocity to the gas. The forcible exiting of the gas through exhaust 34 creates a low-pressure region at aperture 32, which draws gas (e.g., air) from within the device and delivers the gas from the device to the moisture sensor 17.

In alternate embodiments, a shroud/cover (not depicted) is positioned around impeller 30 to capture and direct air exiting impeller 30 (see, e.g., FIG. 4) or entering impeller 30 (see, e.g., FIG. 9) into a channel (e.g., a tube) to direct the air along a specific pathway and direction.

Figure 5:
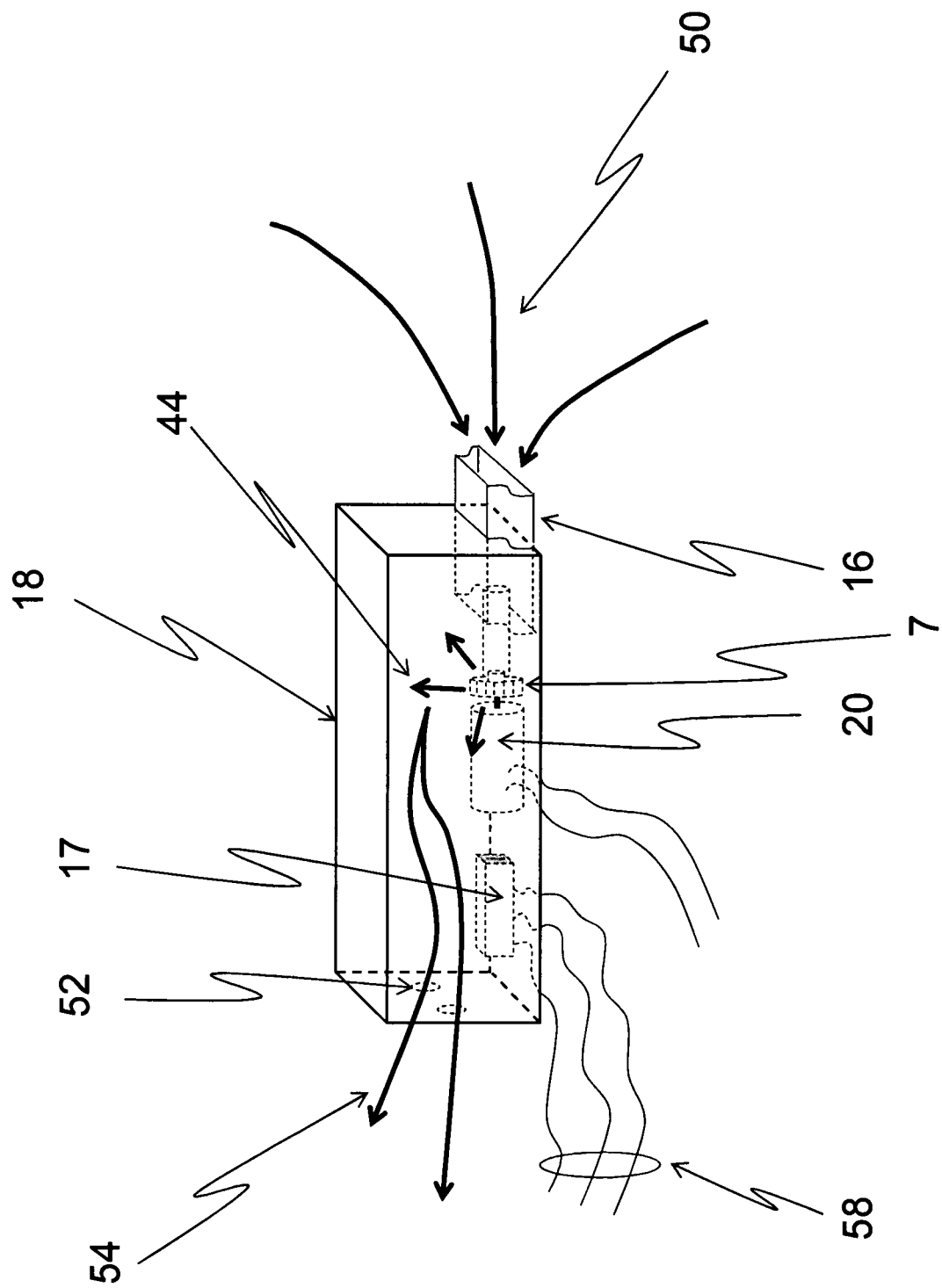
FIG. 5 is an isometric view of the power interrupter depicted in FIG. 1 with the impeller rotating as depicted in FIG. 4 and airflow vectors depicting the general flow of air through and around the power interrupter.

Turning to FIGS. 1 and 5, an optional scavenged air enclosure (e.g., scavenged air enclosure 18) may be included to direct gas from pump 7 to moisture sensor 17. Alternate embodiments may utilize different means or mechanisms for directing gas from pump 7 to moisture sensor 17, such as housing 11 can be used to directing gas from pump 7 to moisture sensor 17. In other embodiments, combinations of one or more channels, tubes, vanes and/or similar gas directing structures can be used to direct the gas (in whole or in part) from electronic device connector 16 and to the moisture sensor 17.

An expanded view of one embodiment of scavenged air enclosure is depicted in FIG. 5. Scavenged air enclosure 18 houses electronic device connector 16, pump 7, motor 20, and moisture sensor 17. Pump 7 produces a low-pressure region in electronic device connector 16, which causes air to flow into connector 16. When connector 16 is connected to an electronic device, gas from inside the device (e.g., scavenged air 50) will flow to moisture sensor 17 via connector 16. Air exhaust 54 from pump 7, which is typically at a higher pressure than the ambient air, exits enclosure 18 through pressure exhaust ports 52. In addition to moisture sensor 17 and pump 7, scavenged air enclosure 18 may also house other circuitry, which may be used to control various aspects of power interrupter 8.

The circuitry in power interrupter 8 is powered by a power source. In the embodiment depicted in FIG. 6, power connector 12 can be connected to an external power supply, such as a conventional electrical wall outlet or a USB power port, to supply power to power interrupter 8. In the depicted embodiment, power connector 12 is formed as a USB power connector, which is configured and adapted to connect to an AC-DC charging transformer 60 with electrical connectors adapted to fit a power receptacle, such as a conventional wall outlet. Power connector 12 may connect to various types of power sources, such as a power outlet in a vehicle or a computer. Some embodiments include an internal power source integral with power interrupter 8, such as a battery (which may be rechargeable or single-use) within housing 11. The battery may be used to operate much of the functionality of the device without the need to rely on external power.

Figure 7:
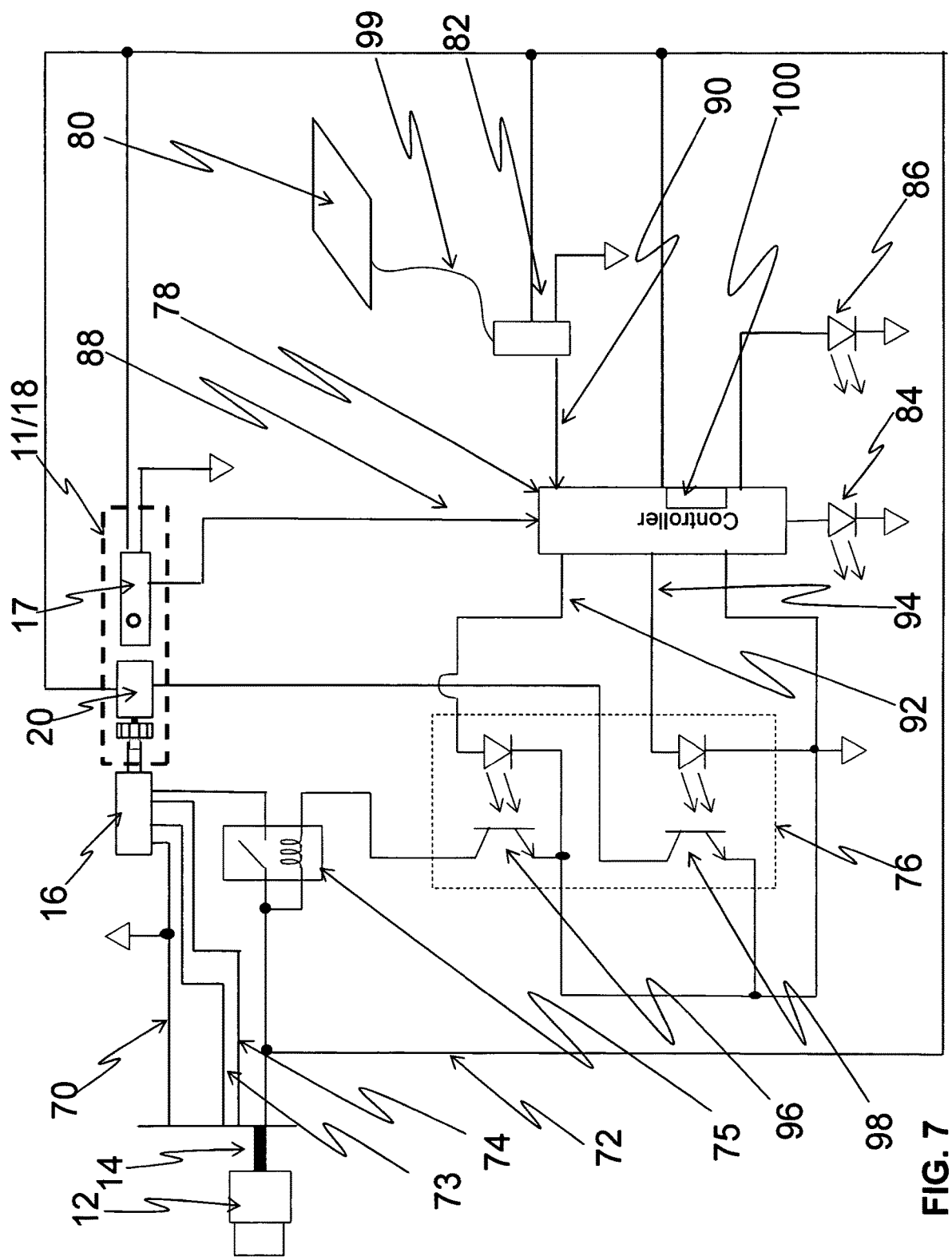
FIG. 7 is a schematic circuit diagram usable with the power interrupter depicted in FIG. 1 according to one embodiment of the present invention.

A schematic diagram of an example power interrupter and/or method that may be used with one or more embodiments described herein is depicted in FIG. 7. Power connector 12 is typically grounded, such as by being electrically connected with electronic device connector 16 using a ground wire 70. Power connector 12 may also be electrically connected to connector 16 by a transmit signal wire 73 and receive signal wire 74, one or both of which may be directly wired to electronic device connector 16 via electrical cable 14. A switch, e.g., relay 75, selectively controls power to the electronic device connector 16. A power bus (e.g., a 5-volt power bus 72) is connected to electronic device connector 16 through the switch (e.g., relay 75), which is normally open and energized by circuitry (e.g., circuitry 76). In the example embodiment, circuitry 76 includes an opto-isolator circuit and transistors 96 and 98, which is an efficient configuration to accomplish the switching described below. In at least one embodiment, transistors 96 and 98 are Darlington transistors. Nevertheless, other embodiments utilize other circuitry configurations to accomplish the desired switching.

In the example embodiment depicted in FIG. 7, transistor 96 is controlled by relay signal 92 driven from controller 78. Controller 78 can contain algorithms (e.g., permanent algorithms) that reside in a memory (e.g., ROM memory 100).

Motor 20 is electrically connected to the power bus (e.g., 5-volt power bus 72) and switched on and off via circuitry 76, such as with transistor 98, which is controlled by motor signal 94 driven from controller 78.

Optionally, a tripped status indicator (e.g., a red LED 84), functional status indicator (e.g., a green LED 86), or both may be connected to controller 78 to provide the user with the status of the charging circuit.

An optional capacitive sensing plate 80 may be connected to capacitive signal sensor 82 by capacitive signal line 99. Capacitive signal sensor 82 may be connected to controller 78 by sensor signal line 90. In some embodiments, capacitive sensing plate 80 is mounted under and inside electronics control unit 10.

Moisture sensor 17, which in some embodiments is housed within scavenged air enclosure 18, may be electrically connected to controller 78 through signal wire 88.

In use, connector 16 of power interrupter 8 is connected to an electronic device (such as mobile telephone 62) and a power source (such as with connector 12). See, e.g., FIG. 6. Electrical power (e.g., DC power from AC-DC transformer block 60 transmitted through cable 14) is supplied to power circuit board 19, electronics control unit 10 and pump 7. In embodiments including a scavenged air enclosure 18, the circuit board 19 may be housed within the scavenged air enclosure 18. During the power-up period, controller 78 boots-up and begins to execute algorithms and routines stored in memory, such as an on-board ROM. (Although a microcontroller is depicted as the main control system, it is generally understood that one skilled in the art could utilize standard logic circuitry to perform the same control function.)

Figure 6:
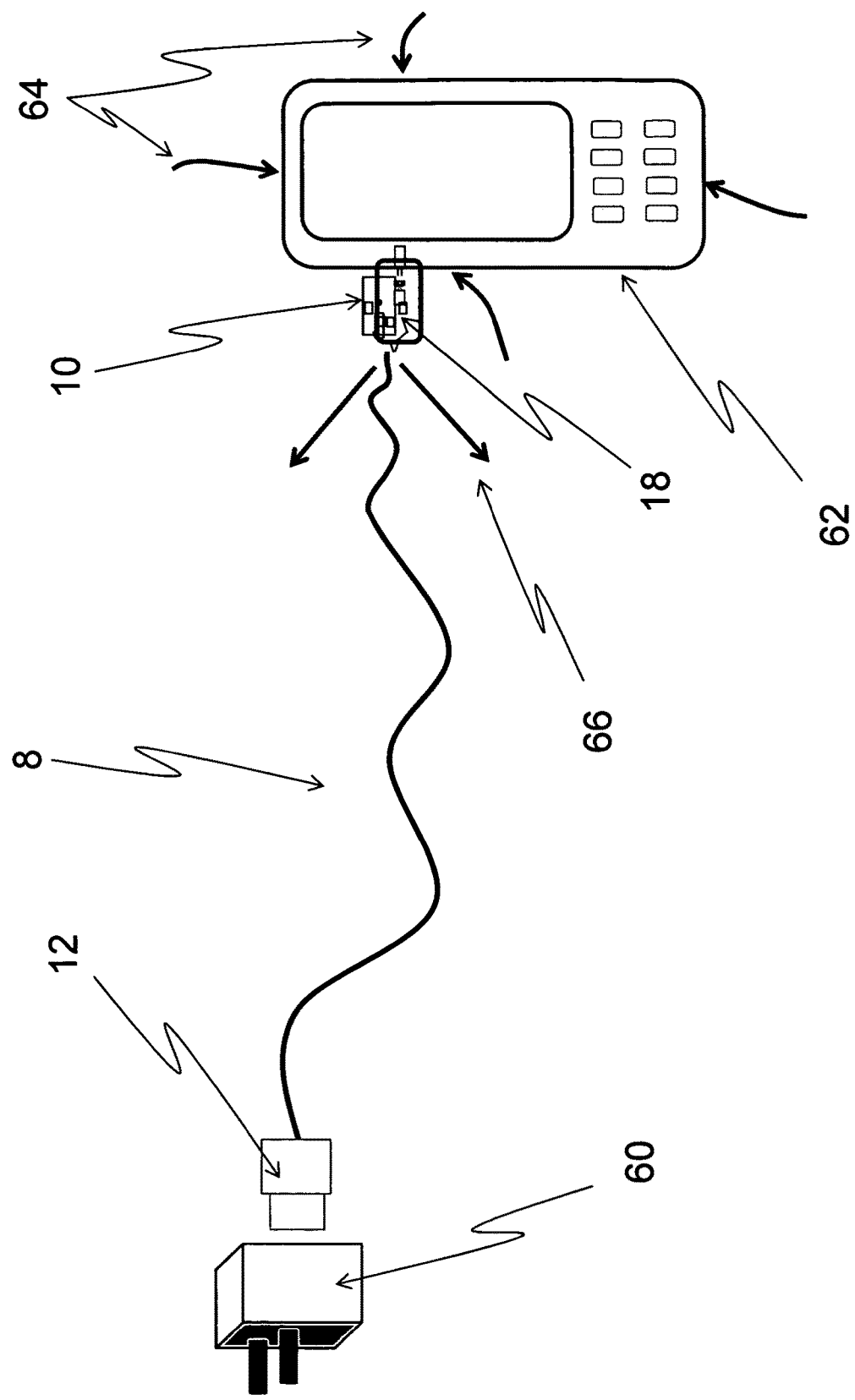
FIG. 6 is an isometric view of the power interrupter depicted in FIG. 1 connected to an electronic device according to one embodiment of the present invention.

To initiate an air sampling cycle operation, controller 78 activates motor 20 through signal 94 that in turn activates transistor 98. Activation of transistor 98 provides the connection to ground bus 70 and causes pump 7, which is connected to 5-volt power bus 72, to begin to spin. Motor 20 rotates impeller 30 of pump 7 in direction 38, which produces a low-pressure region (vacuum) at aperture 32 (intake port 31) and connector 16, and draws air into pump 7. Gas (e.g., air) within the electronic device (e.g., phone 62) is drawn through connector 16 (which is pneumatically coupled to phone 62), through tube 26 (which is pneumatically connected to connector 16), and into aperture 32 (which is pneumatically connected to tube 26) along direction 46. As such, gas from inside phone 62 is scavenged by pump 7. Moisture sensor 17 is then exposed to air scavenged from the electronic device (e.g., telephone 62), which may be facilitated by structures within power interrupter 8 such as air enclosure 18. The electronic device (e.g., telephone 62) will typically allow ambient air to flow into the device's casing through various ports or seal gaps. (See, e.g., air vectors 64 of FIG. 6 depicting the generalized flow of air around the telephone 62.)

Moisture sensor 17 detects moisture in the gas sampled from the electronic device. For example, moisture sensor 17 may be various types of electronic moisture detectors, such as polymeric, elastic, resistive or capacitive type sensors. In the embodiment depicted in FIG. 7, moisture sensor 17 is powered and sampled by electrical wiring bus 58, which includes signal wire 88 connected to controller 78. Controller 78 samples moisture sensor 17 and monitors the moisture content (e.g., relative humidity). In at least one embodiment, controller 78 monitors the moisture content for approximately 10-15 seconds. In alternate embodiments, controller 78 monitors the moisture content for less than approximately 10 seconds, while in still other embodiments controller 78 monitors the moisture content for greater than approximately 10 seconds.

In at least one embodiment, pump 7 and moisture sensor 17 sample the moisture content of the ambient air and microcontroller 78 uses such information to determine whether the electronic device is sufficiently dry to apply electrical power to the device. In at least one embodiment, aperture 32 may be selectively connected to connector 16 and an alternate entry port capable of sampling outside air while connector 16 is connected to an electronic device. In other embodiments, the direction pump 7 moves air is reversed making exhaust ports 52 function as ambient air intake ports. See, e.g., the one or move embodiments related to FIGS. 8 and 9.

In some embodiments, moisture sensor 17 samples the moisture content of the ambient air, such as by sampling through an alternate entry port or by being activated before connector 16 is connected to the electronic device. In the later example, pump 7 may be activated immediately upon connection of connector 12 to a power source and sample the ambient air before connector 16 is connected to the device. (In this embodiment the user may be directed to ensure that power interrupter 8 is powered before being connected to the device). The moisture value of the ambient air can then be stored for later use.

Figure 10:
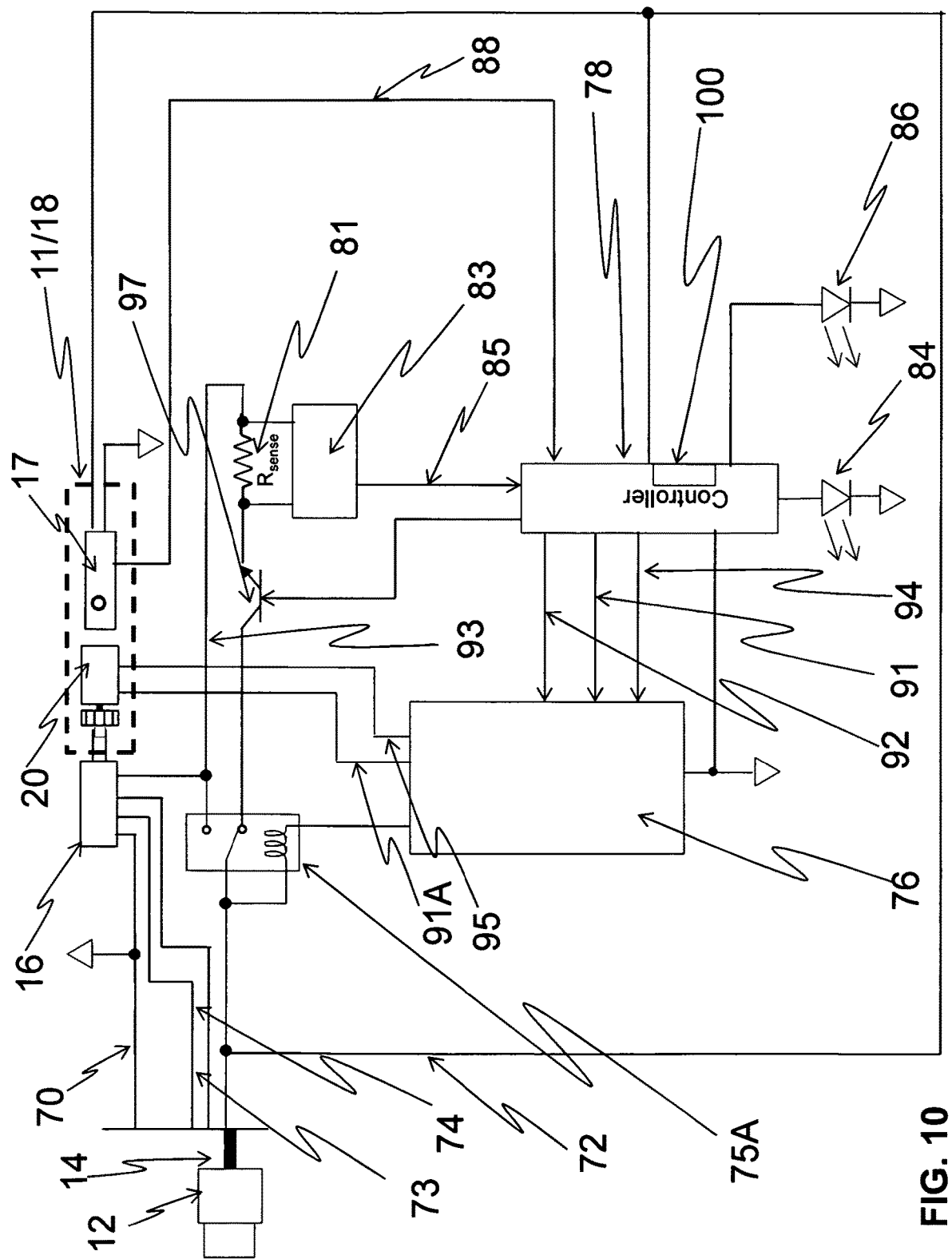
FIG. 10 is a schematic circuit diagram usable with the power interrupter depicted in FIG. 1 according to another embodiment of the present invention.

In still a further embodiment, power interrupter 8 is capable of detecting when connector 16 is not connected to an electronic device (see, e.g., discussion of the one or more embodiments related to FIG. 10), and samples the ambient air when connector 16 is not connected to an device. If power interrupter 8 has not sampled the ambient air prior to being connected to an device, power interrupter 8 can give an indication to the user to disconnect connector 16 from the electronic device so that a sample of the ambient air can be made.

In embodiments where ambient air is sampled for moisture content, controller 78 can compare the moisture value of the ambient air to the moisture value of the air within the electronic device. The mathematical difference between the ambient moisture and the moisture within the device can then be calculated by controller 78, and controller 78 can determine whether the electronic device (e.g. phone 62) is sufficiently dry to connect power (such as when the mathematical difference is approximately zero) or is too moisture laden to connect power (such as with the mathematical difference is greater than approximately zero).

In some embodiments, controller 78 is programmed to determine that the electronic device is sufficiently dry for connection of electrical power to the device when the relative humidity of the sampled air (as measured in percent saturation) and the relative humidity of the ambient air (as measured in percent saturation) differ by no more than one (1). In further embodiments, controller 78 is programmed to determine that the electronic device is sufficiently dry for connection of electrical power to the device when the relative humidity of the sampled air (as measured in percent saturation) and the relative humidity of the ambient air (as measured in percent saturation) differ by no more than one-half (½). In still further embodiments, controller 78 is programmed to determine that the electronic device is sufficiently dry for connection of electrical power to the device when the relative humidity of the sampled air (as measured in percent saturation) and the relative humidity of the ambient air (as measured in percent saturation) differ by approximately zero (0).

In still further embodiments, a controller 78 determines whether power should be applied to the electronic device without comparing the moisture content of the device to ambient conditions.

If moisture in the electronic device measured by moisture sensor 17 is above a threshold, i.e., the device has been exposed to excessive amounts of moisture, power interrupter 8 will keep the device isolated from the power supply. For example, if controller 78 determines that the moisture within the device is too high to connect the device to the power source (such as if the difference in moisture content between ambient conditions and the conditions within the device are greater than approximately zero), the microcontroller maintains a disconnected state (sometimes referred to as a "tripped" state) between the device and the electrical power source, such as by not sending a signal to signal line 92, which will cause transistor 96 to remain de-energized and relay 75 to remain open. In some embodiments, the disconnected state is the normal state for relay 75, creating a fail-safe mode that prevents the device from being connected to the power source unless the detected moisture is below a predetermine threshold. In some embodiments, relay 75 is physically biased, such as by a spring, to the disconnected state to ensure power interrupter 8 returns to a safe state if power is interrupted. In some embodiments controller 78 will activate a signal (e.g., a visual signal such as red LED 84) when controller 78 determines that moisture in the device is too high to connect electrical power.

In some embodiments, controller 78 continuously powers motor 20 while electronics control unit 10 is in a "tripped" state, which maintains a scavenging state on phone 62 while sampling moisture sensor 17 by controller 78 via signal wire 88. In alternate embodiments. the sampling may be continuous, at pre-programmed intervals, or upon command by a user. If the scavenging of air from the electronic device (e.g., phone 62) sufficiently dries the device, controller 78 would detect this state and thereafter allow connection of the device to the power source.

If moisture in the electronic device measured by moisture sensor 17 is below a threshold, i.e., the device has not been exposed to excessive amounts of moisture, power interrupter 8 will supply power to the device. For example, when controller 78 determines that the device is sufficiently dry to connect electrical power to the electronic device, controller 78 connects the device to electrical power, such as by sending a signal to signal line 92, which causes transistor 96 to energize and close relay 75 (which may be open in its normal state), and to thereby provide power to electronic device connector 16. With connector 16 connected to the device (e.g., phone 62), power from cable 14 is supplied to phone 62. In some embodiments controller 78 will activate a signal (e.g., a visual signal such as a green LED 86) when controller 78 determines that the device is sufficiently dry to connect electrical power and/or power is provided to the device.

Some embodiments include an optional capacitive sensing plate 80 (see, e.g., FIG. 7) to detect the increased capacitance from a user's hand and determine when the power interrupter 8 is being handled by a user. For example, in the embodiment depicted in FIG. 7, capacitive sensing plate 80 signals controller 78, via signal line 90 and capacitive signal sensor 82, that a user is handling the power interrupter 8. Controller 78 can then use this information in a variety of ways. For example, controller 78 can initiate sampling of ambient air, such as to obtain a baseline humidity measurement, once it determines a user is handling power interrupter 8.

Controller 78 may also use the information concerning whether power interrupter 8 is being held to signal the user. For example, in at least one embodiment, controller 78 activates a signal (e.g., red LED 84) to indicate to a user that the user may touch (e.g., grasp) electronics control unit 10. In an alternate embodiment, controller 78 activates a user signal to indicate that ambient air is being sampled, such as by commanding a light (e.g., red LED 84) to illuminate and/or flash on and off while ambient air is being sampled. Controller 78 may further turn off red LED 84 once a baseline humidity (e.g., ambient relative humidity) is determined, which may signal a user that the power interrupter 8 is then ready for connection to an electronic device. Another light (e.g., green LED 86) may also be used to signal a user that the power interrupter 8 is ready for connection to a device, such as by being commanded to illuminate and/or flash on and off. Although the preceding description of solidly lit and flashing lights provides one form of visual feedback or indicia to the user, it should be understood that various combinations of flashing/solid lights, audible signals (e.g., chimes and buzzers), and/or tactile feedback (e.g., vibrators) can be used to inform the user of the proper sequence for connecting the power interrupter 8 to such an electronic device.

In further embodiments, contact by a user can result in relay 75 being commanded to the "open" condition so that no electrical energy is supplied to connector 16. Once the user touches power interrupter 8, the capacitive sensing plate 80 provides a capacitive signal to capacitive signal sensor 82, which sends a signal (via signal wire 90) to controller 78, causing controller 78 to maintain relay 75 in the open condition while allowing moisture sensor 17 to monitor air moisture. If after a period of time (e.g., approximately 10-15 seconds) the relative humidity difference is not reduced to within appropriate levels, controller 78 maintains relay 75 in the open condition while sampling moisture sensor 17 and allowing moisture sensor 17 to monitor scavenged air moisture from within the electronic device.

In some embodiments, the state of scavenging and monitoring moisture while interrupting power to connector 16 can be manually commanded by a user to "reset" the device to its initial sensing configuration.

In some embodiments, power interrupter 8 (e.g., relay 75 in power interrupter 8) disconnects the battery within the electronic device from the circuitry of the electronic device, and is capable of protecting not only the device load but the device charging circuitry from the device battery itself. In some embodiments, relay 75 is a double pole, double throw (DPDT) relay.

Figure 8:
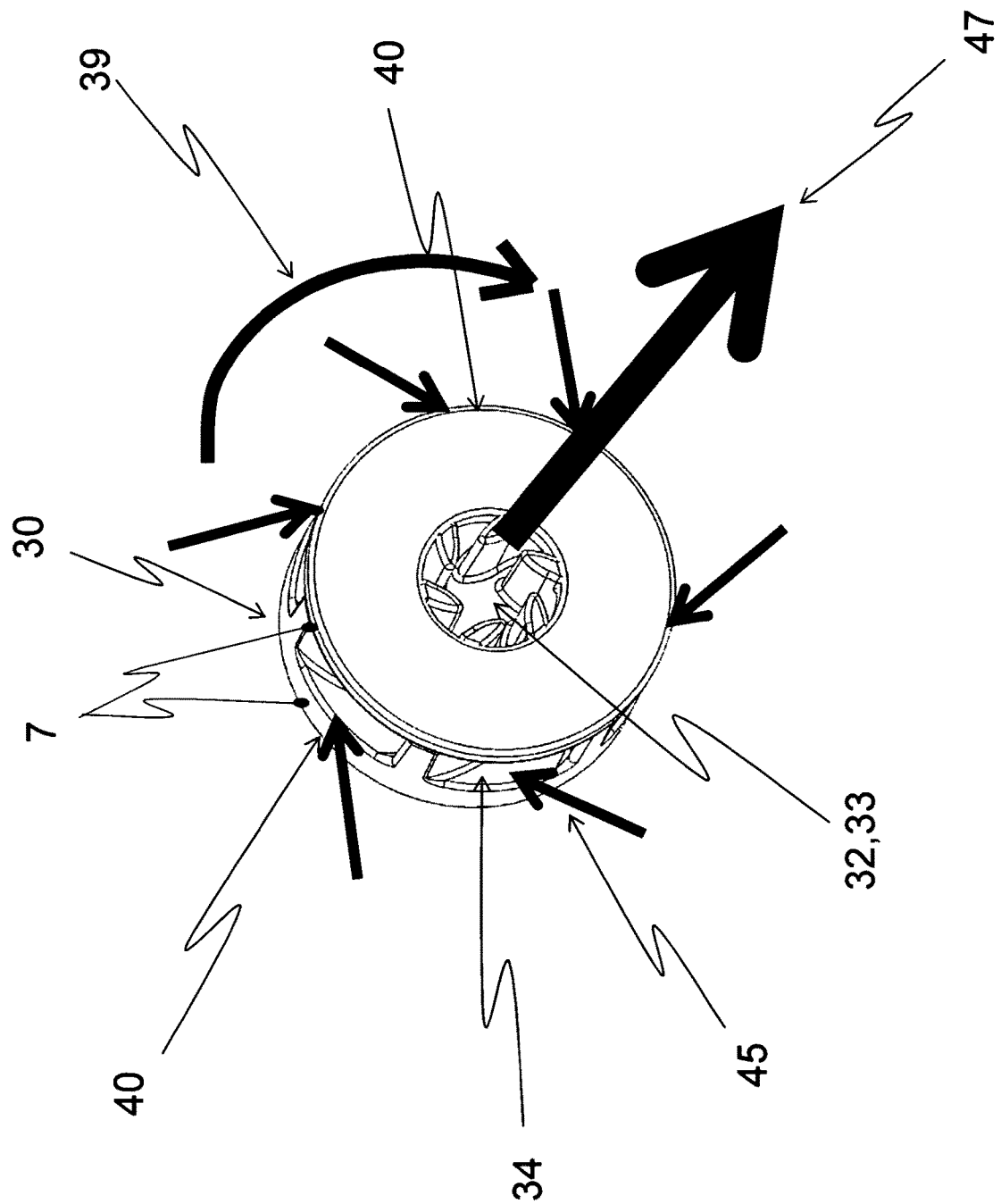
FIG. 8 is an isometric view of the impeller depicted in FIG. 4 with the removed side plate in position, rotating clockwise (as depicted from the reader's perspective), with airflow vectors depicting the general flow of air through and around the impeller.

Referring now to FIG. 8, in at least one embodiment pump 7 (e.g., micro impeller 30) increases the pressure within connector 16, which can force gas (e.g., air) into the electronic device to which power interrupter 8 is connected. For example, at least one embodiment is capable of reversing the rotational direction of micro impeller 30, switching power interrupter 8 from a device that draws air from within the electronic device to which power interrupter 8 is connected, to a device that forces air into the electronic device to which power interrupter 8 is connected. In the example depicted in FIG. 8, impeller 30 spins in direction 39 (the clockwise direction as depicted from the reader's perspective) and generates air vectors 45 (generally moving gas into impeller 30) and 47 (generally moving gas out from aperture 32), resulting in aperture 32 being an exhaust port 33 for pump 7.

Figure 9:
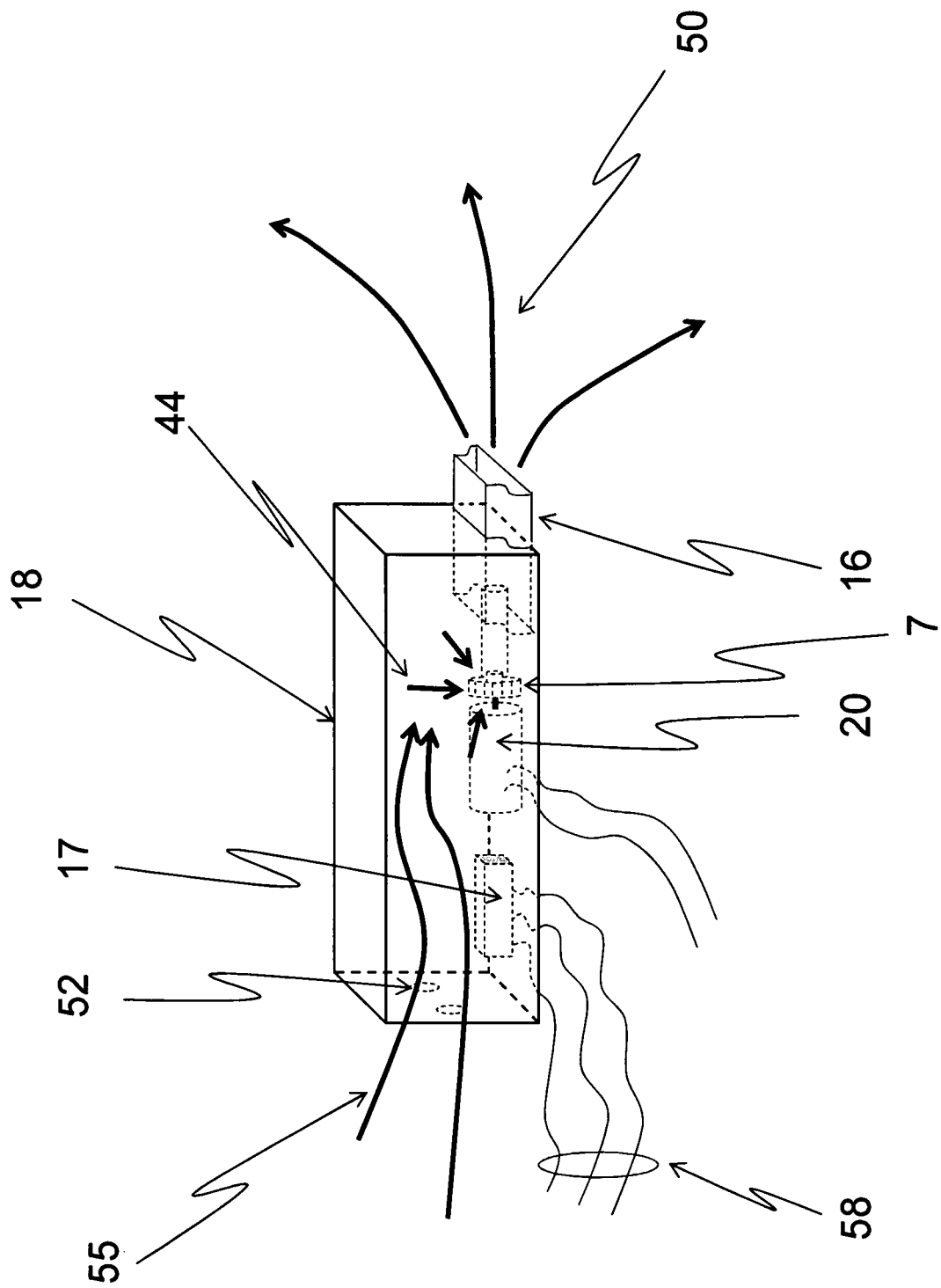
FIG. 9 is an isometric view of the power interrupter depicted in FIG. 1 with the impeller rotating as depicted in FIG. 8 and airflow vectors depicting the general flow of air through and around the power interrupter.

FIG. 9 depicts a generalized airflow pattern occurring within and around scavenged air enclosure 18 when pump 7 is driven in the reverse direction from the direction depicted in FIGS. 3-5, which may occur when motor 20 is signaled to reverse its direction.

FIG. 10 depicts a schematic circuit diagram of an example power interruption apparatus and/or method for interrupting power to an electronic device, which may be used with one or more embodiments described herein, e.g., the embodiments depicted and described with respect to FIGS. 1-6 and 8-9. Elements depicted in FIG. 10 with reference numerals similar to or the same as those depicted in other figure(s), e.g., FIG. 7, function similarly to or the same as the elements in the other figure(s) except as shown and/or described. The circuitry depicted in FIG. 10 also includes portions that may be used to detect whether connector 16 is electrically connected to the electronic device being tested.

A switch, e.g., relay 75A, selectively controls power to the electronic device connector 16. Relay 75A (depicted as a single pole double throw (SPDT) relay in FIG. 10) allows electrical energy (e.g., 5V from USB connector 12) to be present on the collector of a switch (e.g., bias transistor 97) in the non-energized position. A current sensor (e.g., precision current sensor 83) utilizes voltage across a resistor (e.g., $R_{sense}$ resistor 81) to determine if leakage current is flowing into electronic device connector 16 via common power line 93, which provides electrical connectivity and current flow through $R_{sense}$ resistor 81. Microcontroller 78 biases transistor 97 and allows current to flow through $R_{sense}$ resistor 81 when electronic device connector 16 is connected to an electronic device.

The size of the $R_{sense}$ resistor 81 can be set to limit the leakage current to an amount that will not damage a wet PED. In at least one embodiment, the size of $R_{sense}$ resistor 81 limits the leakage current to no greater than approximately 10 milliamperes. In at least one embodiment, the resistance of $R_{sense}$ resistor 81 is approximately 500 ohms. In other embodiments, the resistance of $R_{sense}$ resistor 81 is at least approximately 200 ohms and at most approximately 1000 ohms.

Current sensor 83 senses the amount of leakage current and provides an electrical signal 85 to microcontroller 78. Microcontroller 78 can use the information about the leakage current from current sensor 83 to determine whether electronic device connector 16 is connected to an electronic device without damaging the device.

Control circuitry, such as half bridge amplifier 76, can be used to control motor 20. For example, in at least one embodiment, half bridge amplifier 76 reverses pump 7 (such as via controller 78 and directional control lines 91 and 94) so that the flow through pump 7 changes direction (such as by the motor bias lines 91A and 95 toggling from 5 VDC and ground potential) when the device changes from a calibration mode to a device sampling mode.

In use, the circuitry depicted in FIG. 10 samples precision current sensor 83 to determine if connector 16 is connected to an electronic device. This sampling of precision current sensor 83 may be done, for example, when power is applied to the power interrupter or after a set period after power is applied to the power interrupter.

If microcontroller 78 does not receive an electrical signal 85 from current sensor 83, microcontroller 78 determines that connector 16 is not connected to an electronic device. When this occurs, microcontroller 78 can signal motor 20, via control lines 91 and 94, to actuate pump 7 to draw ambient air 55 into the Dower interrupter as depicted in FIG. 9, i.e., through exhaust ports 52. As such, ambient air is imparted onto moisture sensor 17 to provide a real-time ambient humidity determination. In alternate embodiments, pump 7 is actuated to draw ambient air 55 into the power interrupter as depicted in FIG. 5, i.e., through connector 16, when microcontroller 78 determines that connector 16 is not connected to the device. In still further embodiments, ambient air may be drawn in through an alternate ambient air passageway allowing the moisture detector(s) to sample ambient air while connector 16 is connected to the device, without reversing the direction of flow induced by pump 7, and without pumping air into the device.

If microcontroller 78 receives an electrical signal 85 from current sensor 83, microcontroller 78 determines that connector 16 is connected to an electronic device. With the leakage current being low, this functionality allows microcontroller 78 to determine if the device is connected to electronic device connector 16 without damaging the device. When this occurs, microcontroller 78 can bias motor 20 in the forward direction allowing pump 7 to provide a vacuum to connector 16 to sample the air within the device to which connector 16 is connected, and deliver the sampled air to moisture sensor 17. Microcontroller 78 can then determine if the device is sufficiently dry, such as by determining if moisture within the sampled air is below a predetermined threshold. In at least one embodiment, microcontroller 78 uses the calibration humidity from the ambient air as a baseline to determine if the device is sufficiently dry. If dry, microcontroller 78 signals SPDT relay 75A of FIG. 10 to energize via relay signal 92, which results in the SPDT relay 75A switching out the $R_{sense}$ resistor 81 and providing a full 5 VDC to connector 16.

In some embodiments, microcontroller 78 modulates motor 20 to sequence pump 7 in backward and forward directions to periodically sample ambient air. In still another embodiment, pump 7 can periodically draw ambient air using valves without the need to reverse the flow of gas through pump 7.

In some embodiments, connector 16 may include additional structure to enhance the pneumatic connection between connector 16 and the electronic device, such as pliable seals or o-rings.

In still further embodiments, power interrupter 8 may be incorporated directly into an electronic device to sample the moisture within the device (and in some embodiments compare with the moisture of the ambient conditions) and determine whether the moisture is sufficiently low to connect the power source to other portions of the device. At least one such embodiment is discussed with respect to FIG. 11. In some embodiments, the power interrupter 8 integrated into the electronic device will default to maintaining a disconnected state between the power source and the remaining portions of the electronic device, unless the moisture detector detects that the device is sufficiently dry to permit connection to the power source without damaging the device.

When incorporated into the electronic device itself, the power interrupter can function as a front end protection circuit for the device, and can include a power input for connecting the power interrupter to a power source (e.g., the electronic device's battery, a wall outlet, or both) and to a power output for connecting the power interrupter to the power input circuitry of the device. The power interrupter can utilize the input power to bias the power interrupter circuitry and protect the remaining electronics in the device.

Figure 11:
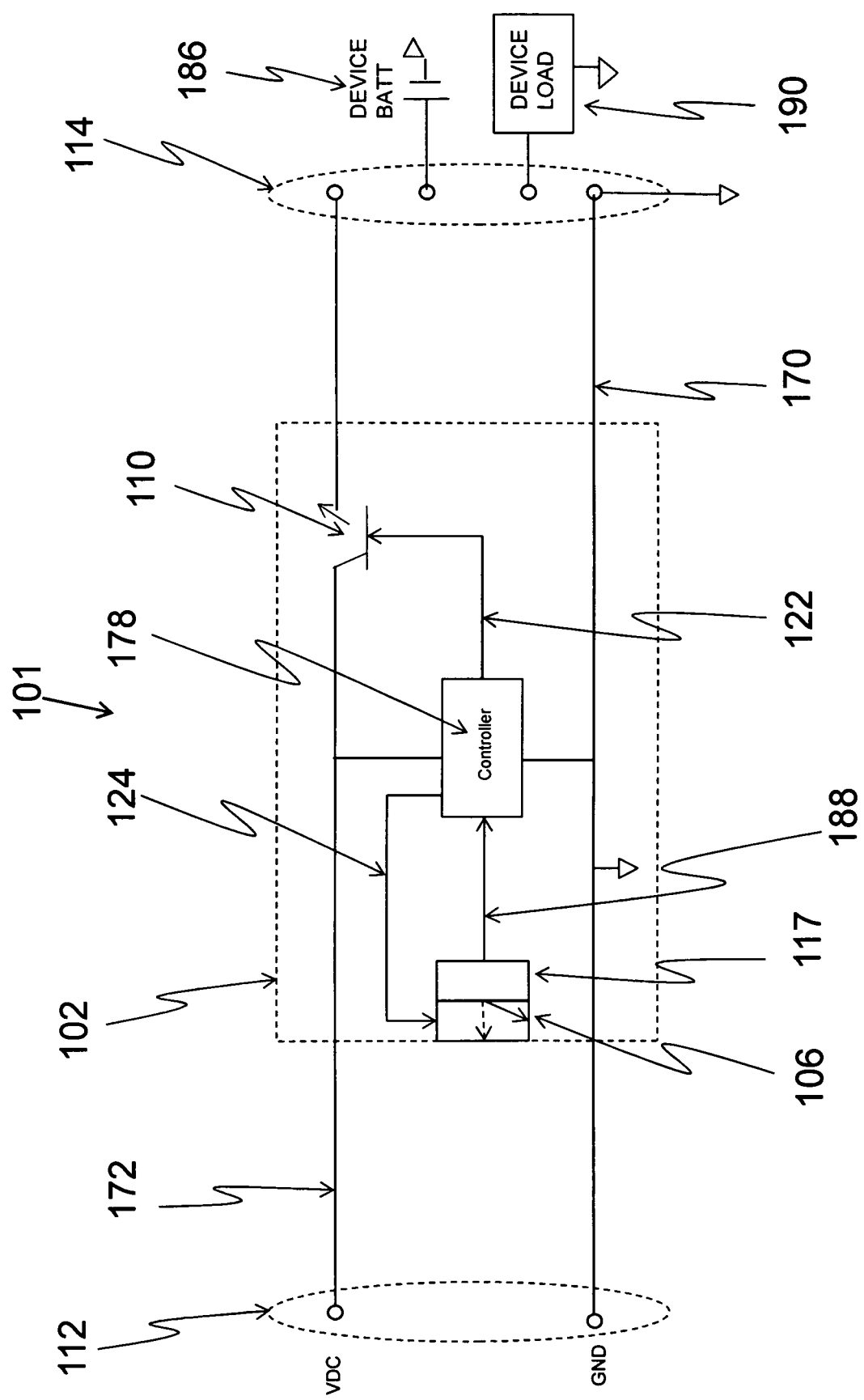
FIG. 11 is a schematic circuit diagram of a power interrupter mounted within an electronic device according to another embodiment of the present invention.

Depicted in FIG. 11 is a schematic representation of a power interrupter 101 integrated with the electronic circuitry of an electronic device that power interrupter 101 protects according to one embodiment of the present invention. Power interrupter 101 can be enclosed within the electronic device it protects, although in alternate embodiments the power interrupter may not be fully enclosed within the device it protects. In some embodiments, portions of the circuitry of power interrupter 101 are housed in an external device that selectively connects to and disconnects from the device it protects. In alternate embodiments, portions of the circuitry of power interrupter 101 are housed in an external device and portions are housed within the device that power interrupter 101 is protecting.

In at least one embodiment, power interrupter 101 is compatible with and may be connected to external power interrupters, such as the power interrupter depicted in FIG. 1.

Power from an external charging cord (e.g., charging cord 14 or the device's battery) can be supplied to apparatus 101 through input power connecter 112. Input power connector 112 presents power to the circuitry of power interrupter 101 through power bus 172 (which may be, e.g., a 5 VDC power bus) and ground bus 170. This circuitry may be positioned within a module 102, and in at least one embodiment module 102 is hermetically sealed.

Moisture sensor 117 communicates with the interior environment of the electronic device and can detect moisture within the device. In embodiments utilizing a hermetically sealed module 102, moisture sensor 117 can be sealed within hermetic sealed module 102 with the moisture sensing portion of moisture sensor 117 communicating with the interior of the device.

In at least one embodiment, moisture sensor 117 is optionally attached to a valve (e.g., a micro-fluidic 3-way valve 106), which has a port internal to an electronic device. Moisture sensor 117 may also be connected to a port external to the device, such as via a valve, such as valve 106. A pump (one example being pump 7) may also be used in some embodiments to place moisture sensor 117 in communication with the interior of the device.

A controller 178 (which in some embodiments is a microcontroller) is connected to and powered through charging cable bus 172 and ground bus 170, and receives information from the moisture sensor 117 via moisture sensor signal 188. Controller 178 controls switching transistor 110 through switching transistor control signal 122, and transistor 110 is connected to electronic device charging bus 114, which is connected to the electronics within the electronic device. Electronic device charging bus 114 provides electrical control and stimulus to device battery 186 and device load (e.g. radio, screen, etc.) 190.

Controller 178 may also control the valve (when included, which may take the form of micro-fluidic 3-way valve 106) through micro-fluidic valve control signal 124.

Depending on the state of transistor 110, electronic device charging bus 114 is either connected to or disconnected from the power source. When connected, various components of the electronic device may be powered by the power source, including the operational circuitry and/or the battery charging circuitry, depending on the internal structure of the device. When disconnected, the internal circuitry of the device is disconnected from power, which may prevent damage to the device when moisture in the device is sufficiently high.

When moisture detected by moisture sensor 117 is at or beyond a first threshold, controller 178 will inhibit or maintain a disconnected state between the power source and the electronic device charging bus 114, thereby protecting portions of the device that may be damaged when electrical power is applied under high moisture conditions.

When moisture detected by moisture sensor 117 is at or below a second threshold (which may or may not be the same as the first threshold), controller 178 will permit and/or maintain a connected state between the power source and the electronic device charging bus 114, thereby allowing portions of the device connected to charging bus 114 (such as the battery charging or electronic device operational circuits) to receive electrical power.

In at least one embodiment where the power interrupter is incorporated into the electronic device (and in other embodiments disclosed herein), the moisture detector can be at least partially sealed (e.g., hermetically sealed) to enhance its water-resistant (or waterproof) features. When sealed, a portion of the moisture detector's sensor face (e.g., silicon surface) will be exposed to the gas within (or the gas sampled from within) the device. In one example, a micro-fluidic 3-way valve may be attached to the moisture detector (one example being a relative humidity sensor) to allow communication between the moisture detector and the gas within the device. The moisture detector may include a small signal relay or switching transistor controlled by a microcontroller that may be sealed to avoid exposure to the gas within the device.

In some embodiments, the micro-fluidic 3-way valve is a MEMs type of device with one port being pneumatically connected to the outside of the electronic device for purposes of measuring the outside ambient humidity, while another port is pneumatically connected to the inside of the device for purposes of sampling the gas within the device. A microcontroller can provide switching signals for the micro-fluidic 3-way valve and a switching transistor that controls power to the remaining portions of the device. The microcontroller can compare the outside ambient conditions to the conditions within the device and determine if the switching transistor signal to the transistor should be biased.

In some embodiments, the power interrupter 101 includes a reset function similar to a Ground Fault Circuit Interrupter (GFCI). The reset could be an electro-mechanical type of reset, and could use a small reset port or a capacitive sensor.

Figure 12:
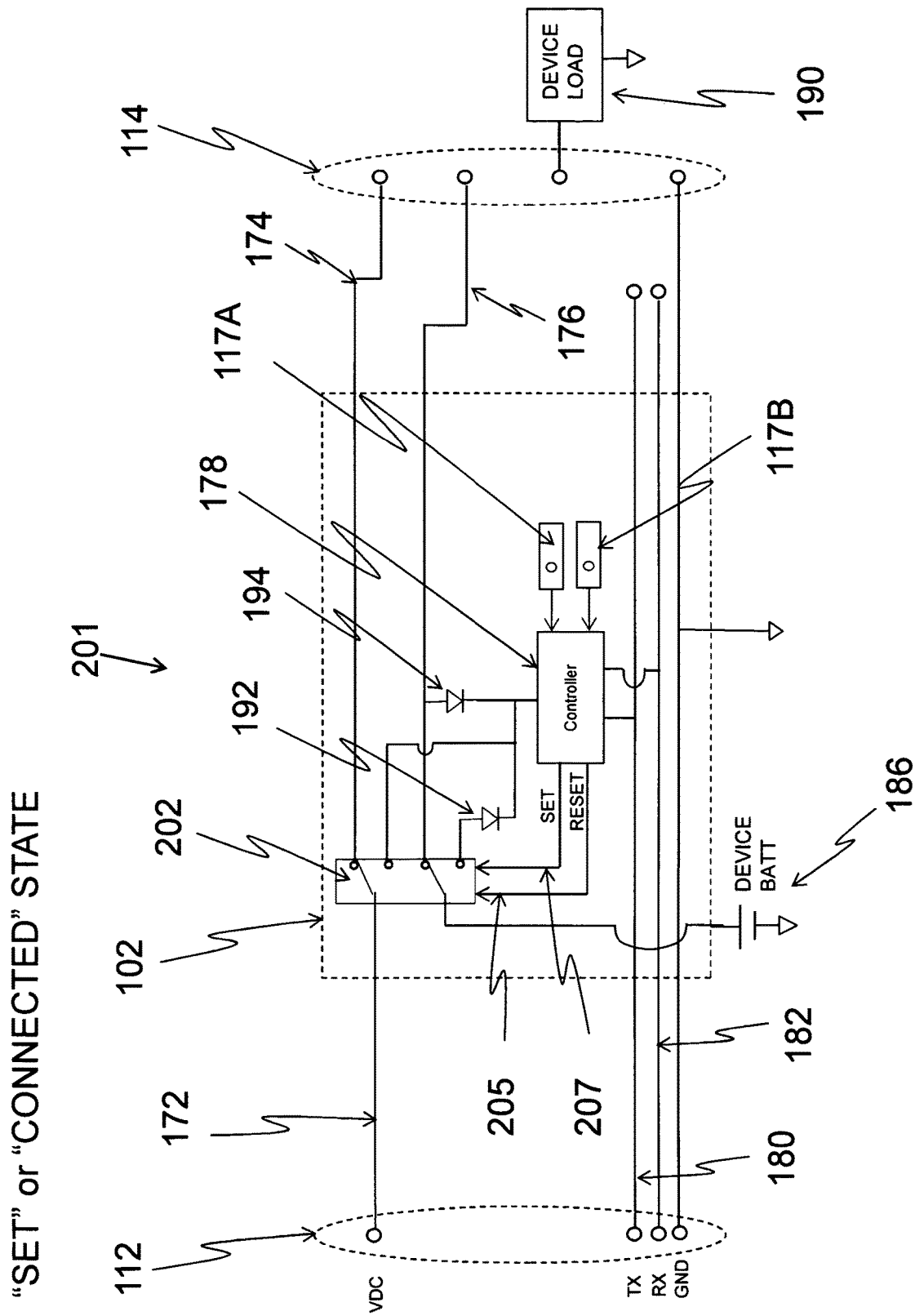
FIG. 12 is a schematic circuit diagram of a power interrupter mounted within an electronic device according to still a further embodiment of the present invention.
Figure 13:
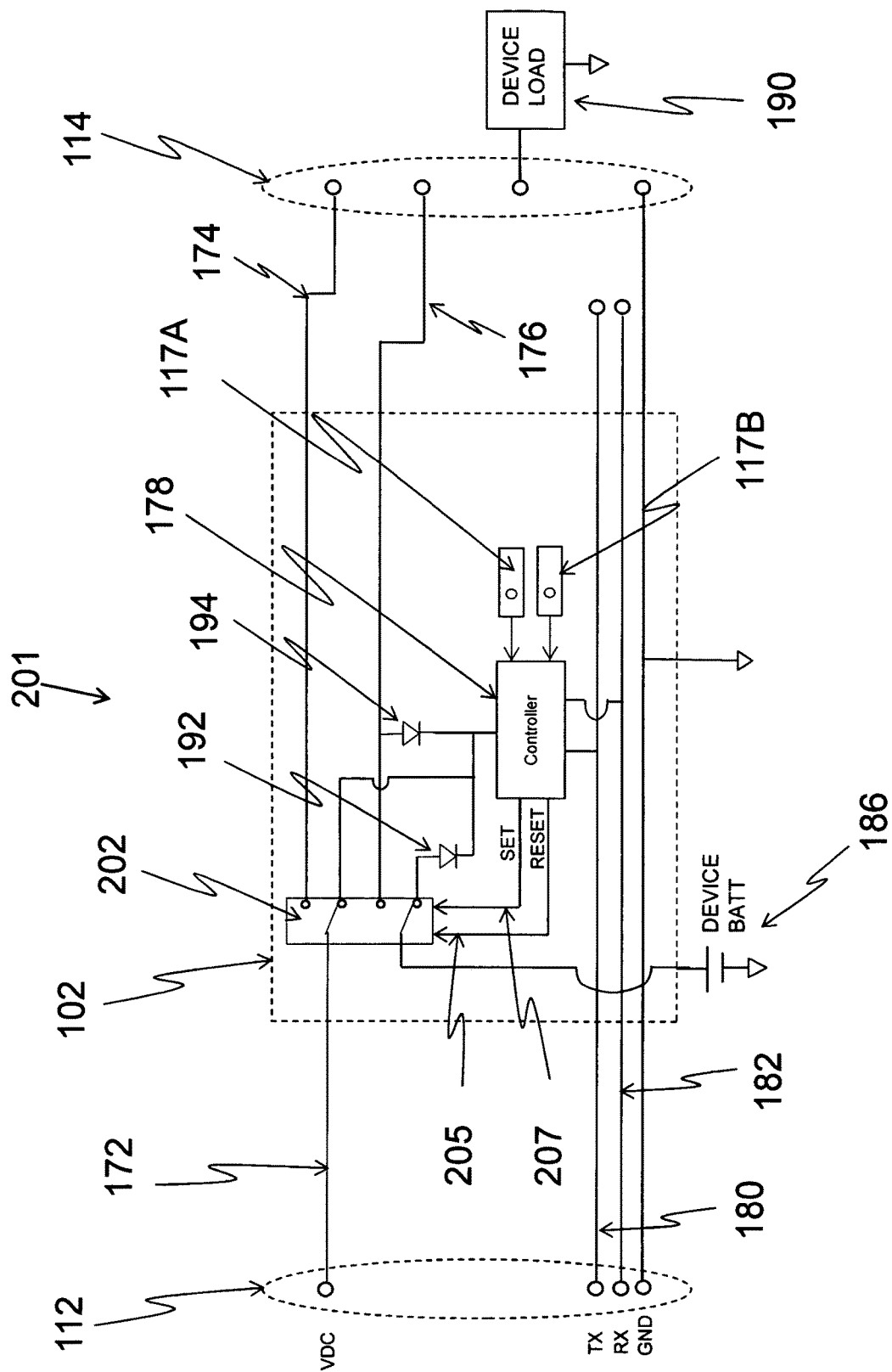
FIG. 13 is a schematic circuit diagram of the power interrupter depicted in FIG. 12 in a different mode of operation.

When moisture within an electronic device exceeds a certain threshold (e.g., the electronic device is considered unacceptably "wet"), electrical power from the device's power storage member (e.g., battery or capacitor) can damage the circuitry of the device. Embodiments of the present disclosure interrupt the flow of electrical power from the device's power storage member to portions of the device's circuitry, including interrupting power to all portions of the device outside of the battery. For example, FIGS. 12 and 13 depict schematic circuit diagrams of a power interrupter 201 for an electronic device that disconnects the device's battery from portions of the device's circuitry when the moisture within the device is sufficiently high, e.g., exceeds a threshold according to one embodiment of the present invention. FIG. 12 depicts power interrupter 201 in a "set" (connected) state. FIG. 13 depicts power interrupter 201 in a "reset" (disconnected or tripped) state. Elements depicted in FIGS. 11 and 12 with reference numerals similar to or the same as those depicted in other figure(s), e.g., FIG. 10, function similarly to or the same as the elements in the other figure(s) except as shown and/or described. Power interrupter 201 is typically enclosed within the electronic device it protects, although in alternate embodiments power interrupter may not be fully enclosed within the device it protects. In some embodiments, portions of the circuitry of power interrupter 201 are housed in an external device that connects to and disconnects from the device it protects. In alternate embodiments, portions of the circuitry of power interrupter 201 are housed in an external device and portions are housed within the device power interrupter 201 is protecting.

Device battery 186, which is typically housed within an electronic device, is electrically connected to an input leg of a relay, e.g., Double Pole, Double Throw (DPDT) relay 202. Electrical power from power connector 112 is electrically connected to another input leg of relay 202. In one embodiment, the electrical power is 5 VDC, although different levels and/or types of power may be used in other embodiments. In one embodiment, relay 202 is a "latched" type of relay, wherein RESET signal 205 and SET signal 207 are pulsed to provide minimal power to change relay 202 state (e.g. from tripped to set). In other embodiments, relay 202 is transistorized for low power consumption.

In other embodiments, the power interrupter 201 includes a communications routine housed within controller 178. In one example embodiment, power interrupter 201 may be electrically reset through power connector 112, such as by receiving electrical reset signals communicated through power connecter transmit line 180 and power connecter receive line 182.

Interrupter 201 preferably includes one or more moisture sensors. For example, in the depicted embodiment interrupter 201 includes a device humidity sensor 117A and an optional ambient humidity sensor 117B mounted within the electronic device. Ambient humidity sensor 117B includes (or is connected to) an ambient air sampling port for sampling gas (e.g., air) outside the device. Device humidity sensor 117A includes (or is connected to) an electronic device sampling port for sampling gas (e.g., air) within the device. Humidity sensors 117B and 117A can be used to determine the relative humidity difference from outside and inside the device, such as by means of computation using controller 178.

Blocking diodes 192 and 194 may be used to prevent electrical power feedback to/from power connector 112 and device battery 186.

In one embodiment, the "set" state (sometimes referred to as the "connected" state) of power interrupter 201 depicted in FIG. 12 permits electrical power from power connector 112 to flow through relay 202 and into device charging circuit 114 via power transfer line 174. Charging circuit 114 is electrically connected to device battery 186 via battery transfer line 176. Device load 190 is unaffected by charging bus 114, and charging bus 114 operates as if device battery 186 was integrated into device charging circuit 114. Stimulus power for power interrupter 201 may be provided by device battery 186 or by external power through power connector 112.

As depicted in FIG. 13, upon controller 178 determining through humidity sensor 117A (and in some embodiments with humidity sensor 117B also) that the moisture within the electronic device exceeds a threshold (e.g., the electronic device is unacceptably "wet"), controller 178 sends a reset signal, such as by sending a pulsed signal 205, to relay 202. In response, relay 202 "trips" and disconnects the electrical power being supplied from power connector 112 to charging circuit 114. Relay 202 simultaneously disconnects power being supplied from device battery 186 to charging circuit 114, preventing possible damage and/or overheating that may otherwise be caused by device battery 186. Controller 178 may then continue to poll humidity sensors 117A (and in some embodiments 117B) until device battery 186 is discharged or power from power connector 112 is removed.

Once tripped, power interrupter 201 can be reset, such as by handshaking on communications bus transmit line 180 and/or communications bus receive line 182. External signals may be communicated to controller 178 using power connector 112, which also houses communications bus. Controller 178 may be externally commanded (and/or internally commanded through communication algorithms within controller memory 100) to sample the humidity conditions within the electronic device, and in some embodiments to also sample ambient humidity conditions.

Some embodiments of power interrupter 201 sample the moisture conditions after some drying technique (such as some of the drying techniques employed herein) is employed to remove the moisture from within the device. Once controller 178 determines that the moisture is below a threshold (e.g., sufficiently close to zero), controller 178 is commanded (e.g., via transmit and receive communication (handshaking) lines 180 and 182) to reset, such as by pulsing reset signal 205. Reset signal 205 reverts the relay 202 back to the set state and electrical power is allowed to flow into charging circuit 114 and device battery 186.

Power interrupter 201 may be enclosed in a hermetically sealed encasement (e.g., a moisture-resistant epoxy or globtop) and isolated from the rest of the electronic device it protects.

Circuitry similar to the circuitry depicted in FIGS. 12 and 13 may be adapted to allow an external device, such as a power cord, to interrupt electrical power from the electronic device's battery to portions of the device's circuitry when the external device detects moisture within the device is too high, e.g., exceeds a threshold.

Embodiments of the present invention include sensors disposed within the electronic device to detect a high moisture event and disconnect the power source (e.g., battery and/or wall power) from the electrical circuitry in the device.

Over the course of several months, the inventors of the inventions disclosed herein ran experiments purposely subjecting electronic devices to forced (pressurized) water entry through the various ports that exist (e.g. headphone jack, speaker, etc.) on the devices. The inventors were attempting to establish a baseline Vacuum Drying Recovery Rate (VDRR) on various types of portable electronic devices using a vacuum drying system. This baseline VDRR was thought to be advantageous in the retail mobile phone store setting to establish expectation levels for consumers who had accidentally subjected their device to water contact (liquid or vapor water) and were seeking a drying solution so the consumer would appreciate whether a full recovery of the consumer's electronic device was likely. A low VDRR indicates a low probability of full recovery, while a high VDRR indicates a high probability of full recovery.

Under detailed and controlled experimentation, the electronic device types and VDRR were cataloged, with the inventors paying close attention to particular electronic devices that had a low VDRR. After recognizing what may be a correlation, the inventors began to collect the Percent Battery Life Remaining (PBLR) together with the device types and VDRR.

Furthermore, upon microscopic examination of those electronic devices that were not recovered, a high percentage exhibited burned and otherwise shorted conductive traces on the device printed circuit boards, defective/shorted electronic components, and devices that were altogether damaged beyond repair. This was presumably a result of the large energy storage medium that exists within the device power source, namely batteries, which are typically Lithium Ion batteries. These batteries exhibit storage capacities in the range of 5-10 watts and, according to recent new product announcements, can be greater than 10 watts. Normal battery voltages for these electronic devices are in the range of 3.6-3.8 VDC, which equates to potential current capacities under a shorting condition (e.g., as a result of water intrusion) of 1-3 amperes. This amount of current flowing through the electrical components of an electronic device typically causes irreparable damage to the electronics. Electronic device (smart phone) manufacturers are increasingly engineering newer power sources to extend device use, thus making charging more infrequent. However, based on the inventors' discovery of VDRR and the relation to PBLR, these larger capacity batteries exacerbate the issues with the battery itself damaging the electronic device (frequently beyond repair) under high-moisture conditions (such as liquid water intrusion).

Although some embodiments of the present invention may use a current limiter (either alone or in combination with any other type of sensor disclosed herein, such as a humidity sensor), difficulties with current limiters were discovered during testing. For example, it was discovered that damage to electronic components can occur at very low currents (30-50 mA), while the electronic devices being tested typically drew 100-300 mA during normal operations. Given these results, embodiments of the present invention utilizing current limiters produced mixed results. One reason for these mixed results was that damage could occur even when the current was within (and sometimes substantially below) normal operating ranges. Embodiments that detect water vapor (humidity) within the device tended to produce good results since humidity in the device could be used to detect an unacceptably high moisture in the device that built up over an extended period (e.g., high environmental humidity) or liquid water intrusion (such as by monitoring the rate-of-change of sensor moisture). Some embodiments of the present disclosure disconnect the power source from the sensitive circuitry of the electronic device irrespective of the current draw.

Figure 14:
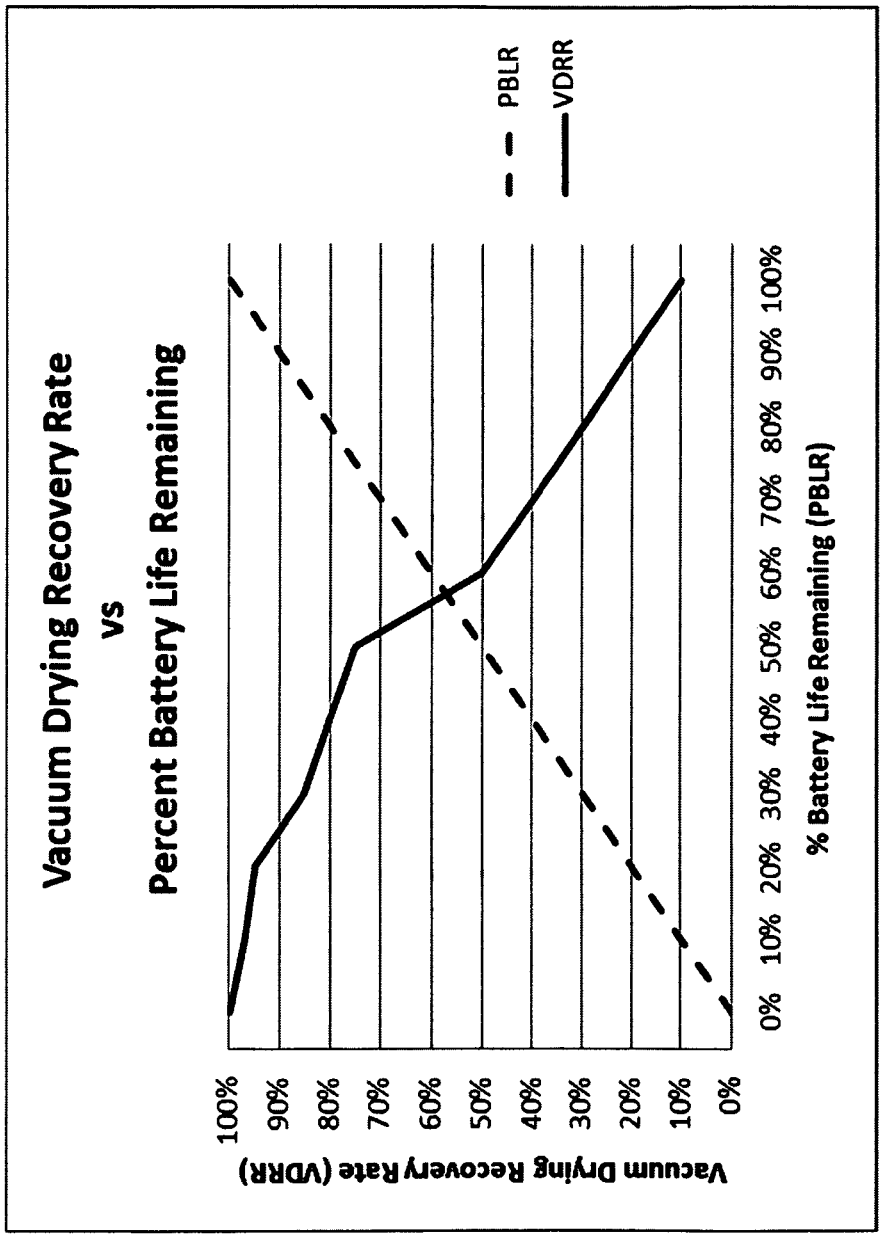
FIG. 14 is a graphical representation of vacuum drying recovery rate versus percent battery life remaining for an example battery.

The inventors developed a graphical model of VDRR vs. PBLR and hypothesized that what was needed was a method and/or apparatus to determine any rapid rate of change of the humidity (moisture content) within the electronic device or some method to sense a rapid current draw, or both. FIG. 14 depicts experimental data of VDRR and PBLR generated by testing a sample battery. See also Table 1 below, depicting the data shown in FIG. 14. These humidity and/or current measurements, which may be computer controlled, can be used to sense these harmful conditions in order electrically disconnect the battery source from the electronic device itself before the device is damaged, thus providing a self-protection means.

TABLE 1

| PBLR | VDRR |
|------|------|
| 0%   | 100% |
| 10%  | 97%  |
| 20%  | 95%  |
| 30%  | 85%  |
| 40%  | 80%  |
| 50%  | 75%  |
| 60%  | 50%  |
| 70%  | 40%  |
| 80%  | 30%  |
| 90%  | 20%  |
| 100% | 10%  |

Taking this new discovery, the inventors designed and developed a new type of battery control circuit, some embodiments of which employ an "active control" of the battery. Further embodiments maintain a connection between the battery and the device under normal conditions, and effectively disconnects the battery from the device when the device is subjected to moisture intrusion (e.g., water intrusion) and/or rapid current draw (such as can result from a "shorting" condition) to preserve the electronic device itself. This "active control" circuitry may be housed in the battery itself, making the battery a self-protecting system, may be housed in the electronic device, or may be implemented as a separate device electrically positioned between the battery and the device (such as a case for the battery). When using this type of protection device, the user can dry the electronic device (such as by using a device drying service) and return the device to a fully operable condition. Moreover, this type of protection is effective irrespective of the type of electronic device or, potentially more importantly, the level of charge of the battery power source.

Figure 15:
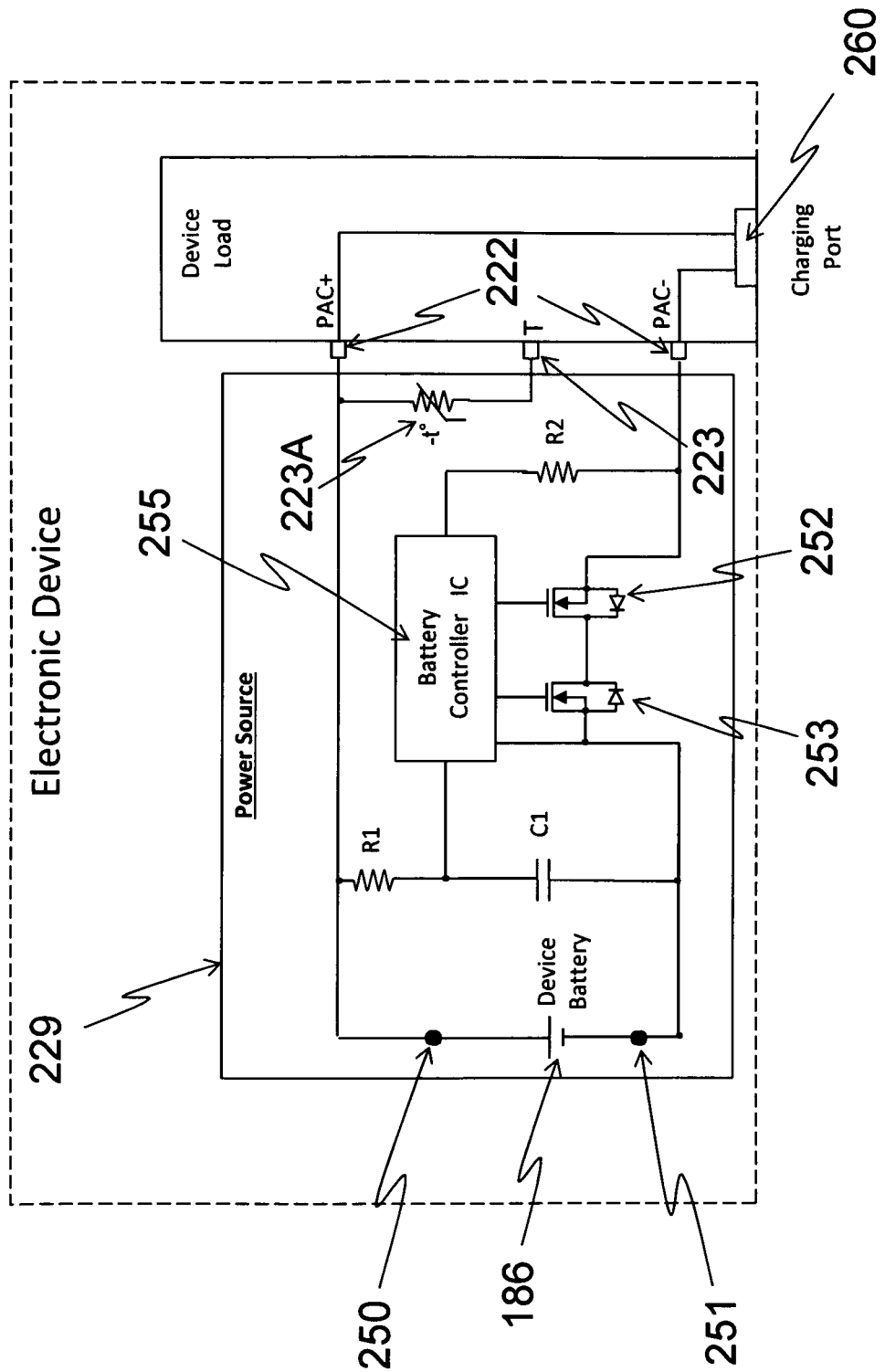
FIG. 15 is a schematic view of an electronic device including a power source and charging circuit, device battery and device load.

FIG. 15 depicts a schematic of an electronic device including a power source 229, a battery controller 255, and charging and discharging transistors 252 and 253 (e.g., Metal Oxide Field Effect Transistors (MOSFETs)). Battery 186, which may be rechargeable, is electrically connected to the device load through charging and discharging transistors 252 and 253. Charging and discharging transistors 252 and 253 are switched at high speed through battery controller 255, which provides precise electrical charging and discharging of battery 186 when the device load is drawing current through power source connector tabs 222 or when a DC charging circuit is connected to charging port 260. The electronic device monitors the temperature of battery 186 through thermistor sensing connector 223, which is electrically connected to negative temperature compensating thermistor 223A and the positive battery supply.

Figure 16:
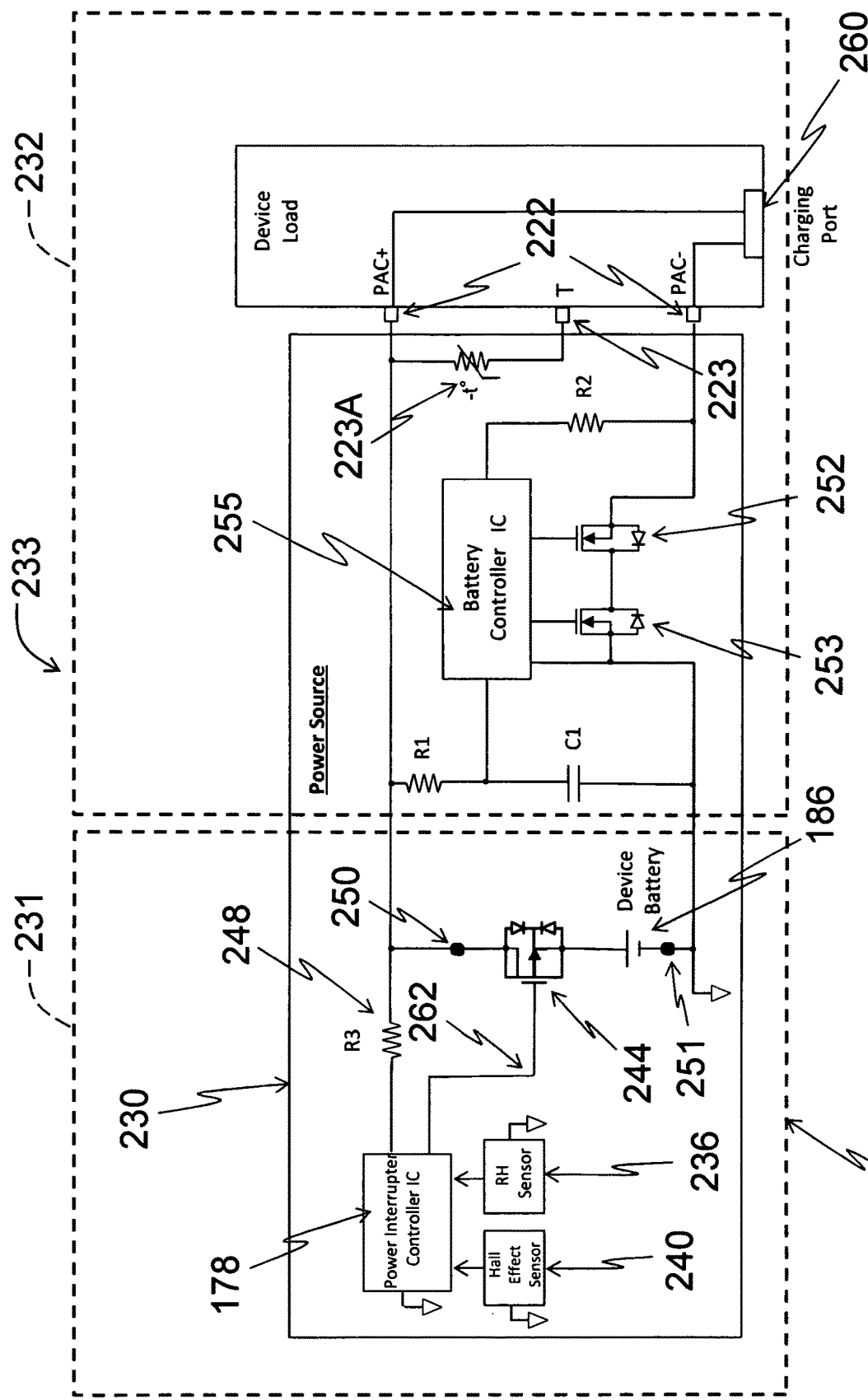
FIG. 16 is a schematic circuit diagram of one embodiment of an electronic power interruption arrangement of the present invention electrically connected to the electronic device depicted in FIG. 15.

FIG. 16 depicts a schematic diagram of one embodiment of an electronic power interrupter arrangement 233 integrated into a power source 230. The right side 232 of FIG. 16 is similar to the power source 229 depicted in FIG. 15. The left side 231 of FIG. 16 depicts additional circuitry and functionality beyond that disclosed in FIG. 15. Power is supplied to a interrupter controller 178, a sensor 240 (e.g., a Hall Effect sensor) and a moisture sensor 236 (e.g., a relative humidity (RH) or liquid water sensor) via a voltage dropping resistor 248A. Power interrupter switch 244 (e.g., a bi-directional MOSFET switch) is electrically connected to battery 186 (e.g., connected to the positive lead of battery 186) and to the device load. Moisture sensor 236 may have a sensing surface exposed to the inside environment of an electronic device when power source 230 is installed in the device.

If water or moisture intrusion into the electronic device takes place, power interrupter controller 178, which can sample moisture sensor 236 periodically or continuously, will detect a high-moisture condition. Power interrupter controller 178 then samples sensor 240 for a high-current draw condition, which may occur nearly simultaneously with power interrupter controller detecting the high-moisture condition. Power interrupter controller 178 can provide high-speed switching, such as by using on-board ROM control algorithms with deterministic RH levels and current levels, to power interrupter switch 244, such as via control signals along control line 262.

Once a high-moisture condition (which may include detection of liquid water), a high-current condition, or a combination of the two is detected, power interrupter controller 178 turns off signal line 260, which in turn electrically disconnects device battery 186 from battery controller 255 and device load conduction connector point 250. This electrical disconnection of battery 186 prevents damage to battery controller 255, to charging and discharging MOSFETs 252 and 253, and to the device load electronics.

Once the electronic device is dry, such as after being subjected to newly developed conductive vacuum drying and tested for dryness, the electronic device may be reset to restore its functionality. In some embodiments, the device may be plugged into a DC charging circuit via charging port 260. Thereafter, in at least the embodiment depicted in FIG. 16, power interrupter controller 178 will be powered via power source connector tabs 222 and will "boot up" and begin reading moisture sensor 236.

Some embodiments provide a means by which a user can signal the power interrupter circuitry to reset, such as by using a magnetic switch. For example, in the embodiment depicted in FIG. 16, the power interrupter controller 178 boot routine can poll a magnetic field sensor (e.g., Hall Effect sensor 240). When a magnet (e.g., a strong-field Neodymium or similar magnet) is brought within proximity of Hall Effect sensor 240 from outside the electronic device, the device will initiate a reset. Hall Effect sensor 240 then conducts electrical current with the introduction of the nearby magnetic field. Power interrupter controller 178 senses this conduction state change in sensor 240 and turns on power interrupter MOSFET 244 via control line 262. This change of state on Hall Effect sensor 240 allows the power interrupter controller 178 to reset itself.

In other embodiments, the power interrupter circuitry is self-resetting by means of connection of a known recharging power source once the electronic device has achieved a dry state. Due to PAC+ and PAC− power source connection 222 being electrically connected to power interruption circuit 231, controller 178 energizes and samples relative humidity sensor 236. Controller 178 algorithms determine whether the moisture (e.g., relative humidity) inside the device is at an acceptably dry level, for example, below thirty (30) percent relative humidity (<30% RH). If the device is sufficiently dry, controller 178 boots-up the overall control circuitry and activates MOSFET 244, which electrically connects device battery 186, and charging circuitry 232 charges and powers the portable electronic device under normal conditions. Thus, for example, when power interrupter controller 178 and moisture sensor 236 sense a dry condition (e.g. low humidity and therefore low moisture) in these embodiments, the control algorithm resets power interrupter MOSFET 244 under ROM based software control. As such, there is no need for Hall Effect sensor 240 in these embodiments.

In some embodiments, the power interrupter circuitry can be powered by residual battery power that may remain in the device's battery.

It should be appreciated that with significant water intrusion the battery will likely short, which will likely damage the battery. However, the power interrupter circuitry as described in the various embodiments herein will prevent damage to the other portions of the electronic device, which are typically much more expensive to repair or replace than the battery.

Still further embodiments isolate the battery terminals exposed for connection to the circuitry of the electronic device from the charge retaining portion of the battery using the power interruption circuitry herein described to prevent damage to the battery itself.

Power interrupter MOSFET 244 can be a low-power type of bi-directional MOSFET switch to decrease current drain from device battery 186. In certain embodiments, power interrupter controller 178 can be put into a low-power state with moisture sensor 236 acting as a watch dog that allows power interrupter controller 178 to wake up and de-energize power interrupter bi-directional MOSFET switch 244 Similarly, Hall Effect sensor 240 can also be used as a watch dog to trigger power interrupter controller 178 to wake in the event that a high current draw is sensed by Hall Effect sensor 240 as a result of water/moisture intrusion.

In other embodiments, power interrupter controller 178 and battery charging controller 255 can be integrated into a single supervisory controller that would control all charging circuit and power interrupter functions.

In yet other embodiments, moisture sensor 236 can also be integrated into the same semiconductor substrate, thus resulting in a full functioning charging circuit controller, power interrupter controller and RH sensor on a single piece of silicon.

Figure 17:
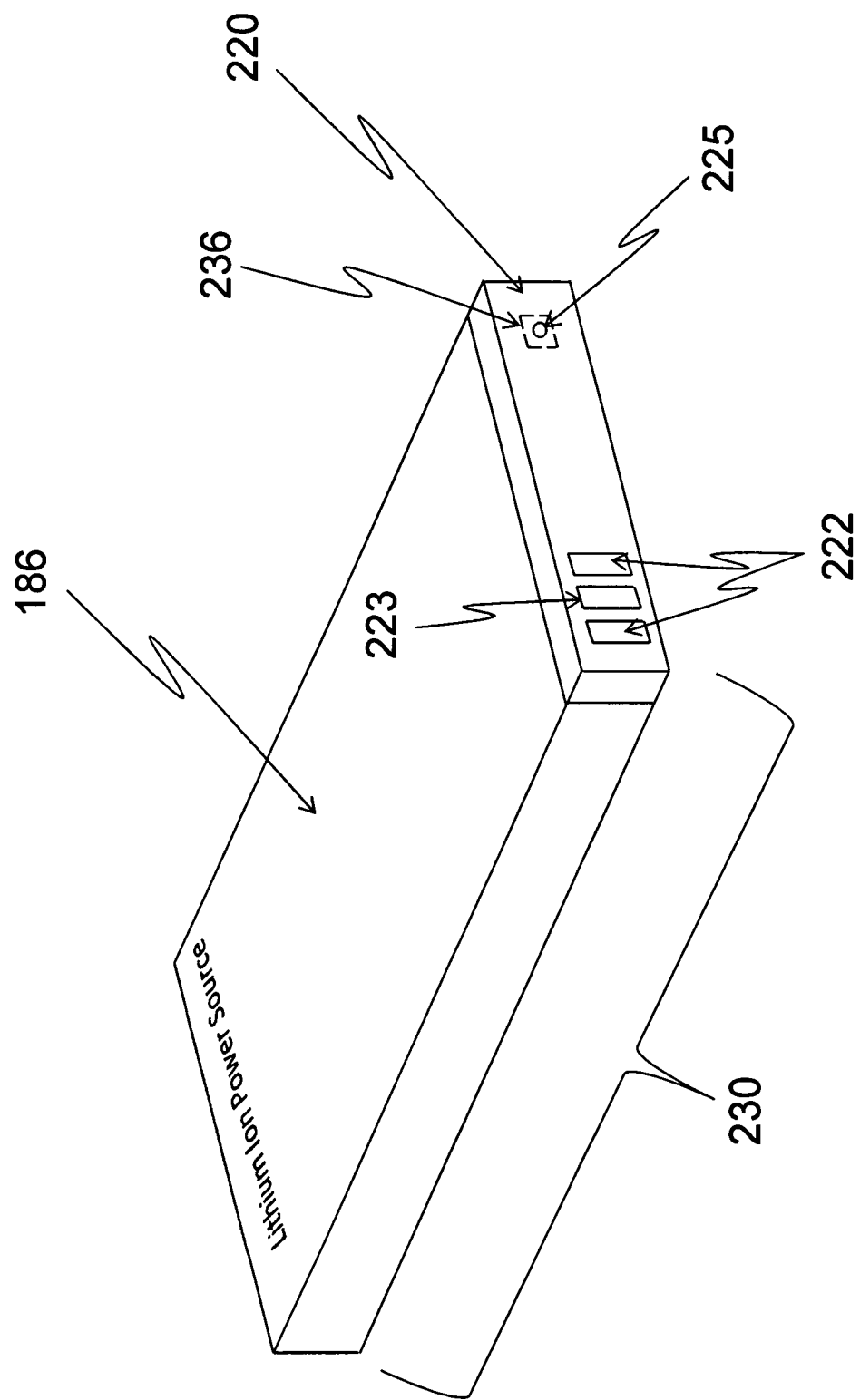
FIG. 17 is a isometric view of a power source and charging printed circuit board shown in a sub-assembly with charging circuit cover attached according to one embodiment of an electronic power interruption arrangement of the present invention.

In FIG. 17, a physical configuration of an electronic device power source 230 is shown with rechargeable battery 186, charging circuit enclosure 220, power source connector tabs 222, and thermistor sensing connector tab 223. A printed circuit board 234 (see FIG. 18A) is housed behind charging circuit enclosure 220. Charging circuit enclosure 220 includes a sensing weep hole 225 (which may sense water vapor, liquid water, or both), and is depicted mounted on one end of rechargeable battery 186.

Figure 18A:
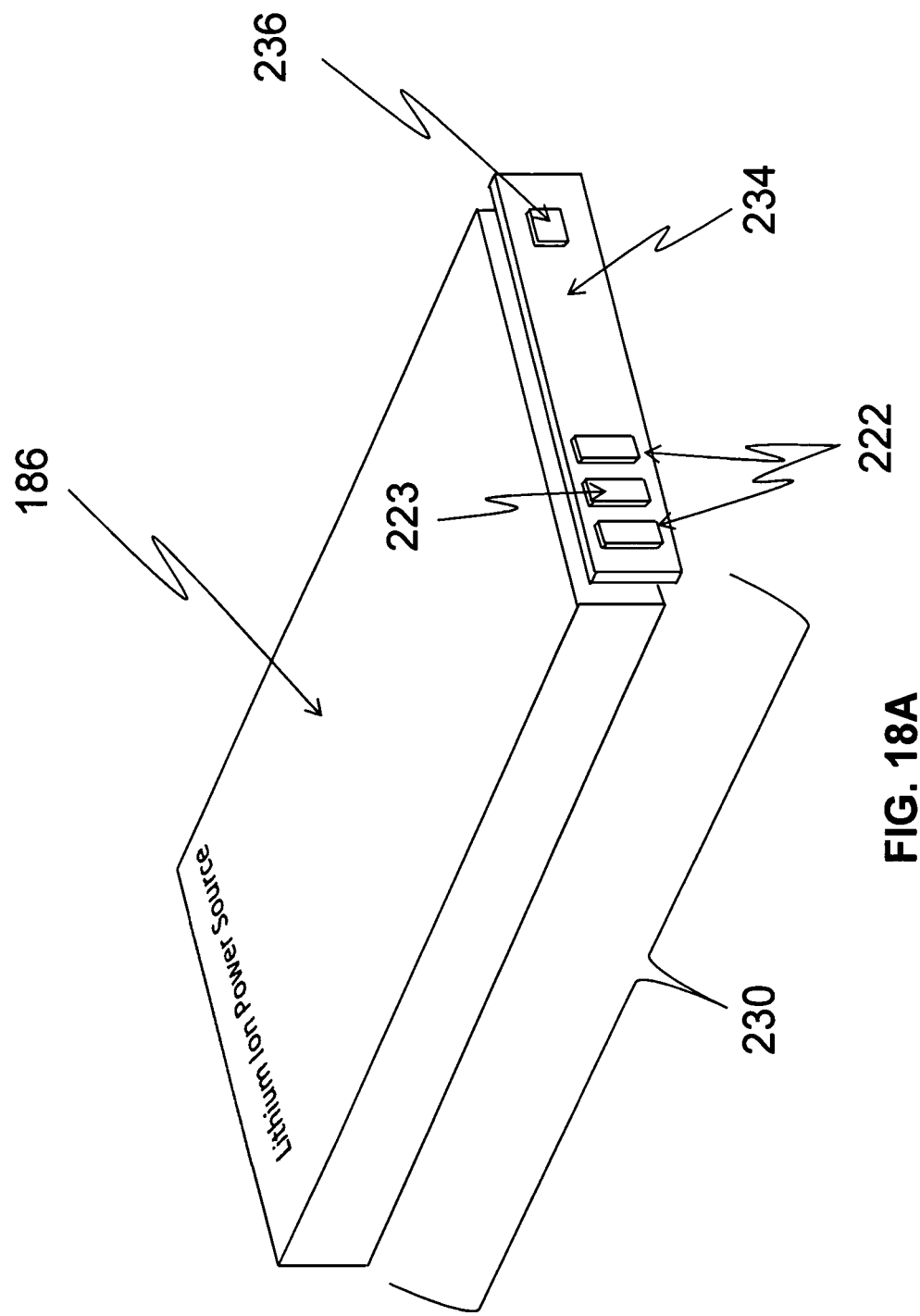
FIG. 18A is a isometric view of a power source and charging printed circuit board shown in a sub-assembly with charging circuit cover removed and moisture sensor attached to the charging circuit printed circuit board according to one embodiment of an electronic power interruption arrangement of the present invention.
Figure 18B:
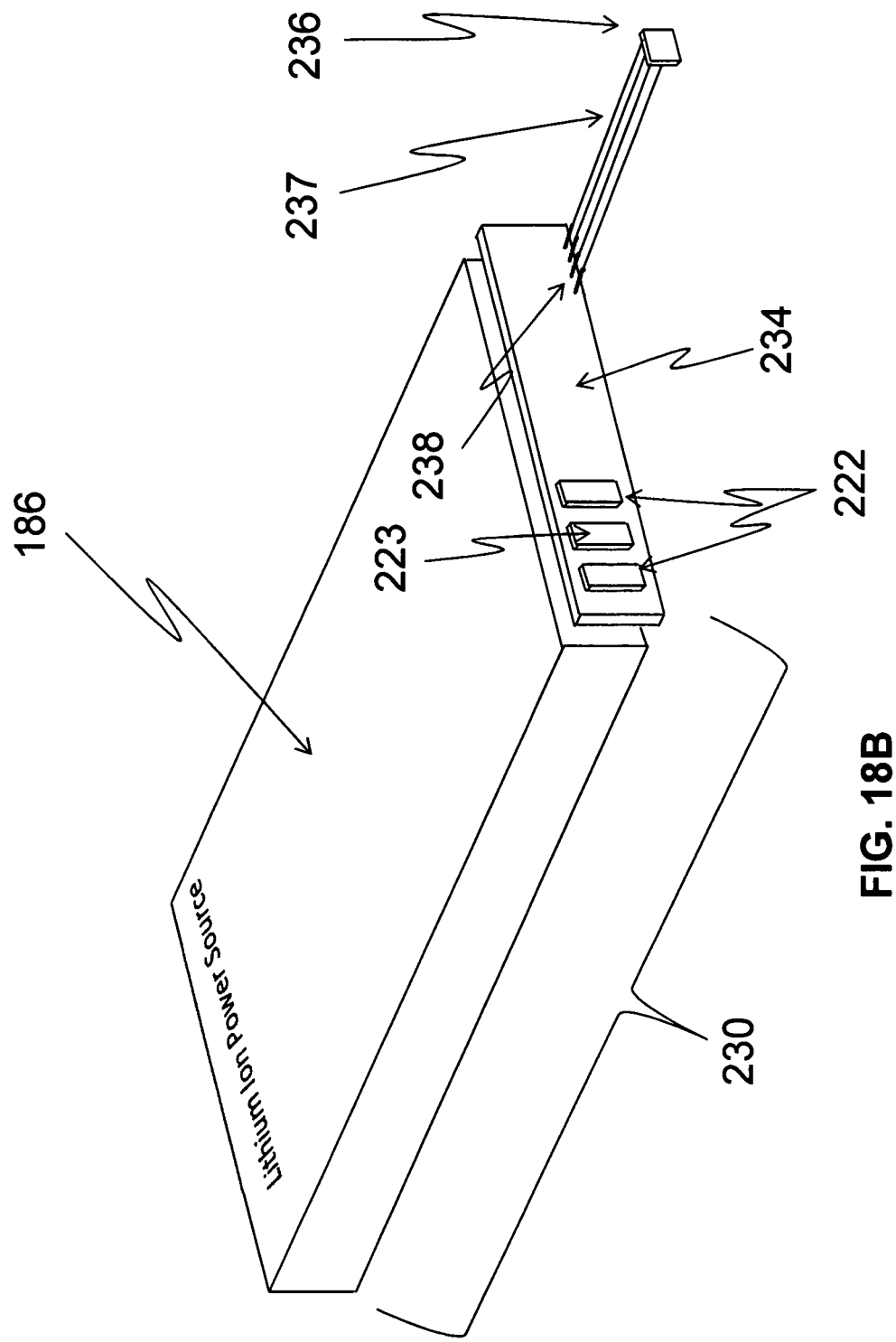
FIG. 18B is a isometric view of a power source and charging printed circuit board shown in a sub-assembly with charging circuit cover removed and moisture sensor detached from the charging circuit printed circuit board according to one embodiment of an electronic power interruption arrangement of the present invention.

In FIGS. 18A and 18B, power source 230 is shown in isometric view with charging circuit enclosure 220 removed. Printed circuit board 234 includes a moisture sensor, e.g., relative moisture sensor 236. Moisture sensor 236 may be mounted on the printed circuit board 234 or connected via a connector 238 and wiring 237 for mounting the humidity sensor off of the printed circuit board 234.

Referring now to FIG. 19, power source 230 is shown from a top view with charging circuit controller 255, power connector tabs 222, thermistor sensing tab 223, relative moisture sensor 236, power interrupter controller 178, Hall Effect sensor 240, and power interrupter bi-directional MOSFET switch 244. Conductive connector posts 250 and 251 provide electrical connectivity between rechargeable battery 186 and printed circuit board 234.

FIG. 20 depicts a smart phone 256 with a power source 230 (e.g., a Lithium Ion battery), speaker 258, microphone 259, headphone jack 257, charging/data port 260, and moisture sensor 236, which may be mounted in one or more of various locations within the smart phone 256 as illustrated by, three possible locations being depicted in FIG. 20. Moisture sensor 236 can be mounted outside of lithium ion power source 230 and/or in various positions within the smart phone 256. In some embodiments, a moisture sensor 236 is mounted at or near one or more openings or throughholes (for example, a speaker opening, a microphone opening, or a power port) through which it is possible for moisture (e.g., liquid water or water vapor) to enter the smart phone 256. Placing moisture sensor 236 near one or more openings may assists microcontroller 186 in having a faster response time to changing moisture if water ingress occurs. It should be appreciated that, as described above, one or more moisture sensors may be built into the battery charging circuitry.

In at least one embodiment, the through-hole that moisture sensor 236 is adjacent to has a width or diameter of at least 0.25 millimeters. One example through-hole 262 is depicted in FIG. 20. A membrane (schematically and fragmentarily depicted as membrane 264) can be used to mask through-hole 262 to allow water vapor to penetrate into through-hole 262 but to prevent liquid water from penetrating into through-hole 262. In one embodiment, masking membrane 264 is formed of expanded Polytetrafluoroethylene (PTFE) Teflon. In some embodiments, the membrane is configured (such as by being expanded or stretched) to permit removal of water vapor from the moisture sensor through the membrane during a vacuum drying process that may be later performed on the device.

Figure 21:
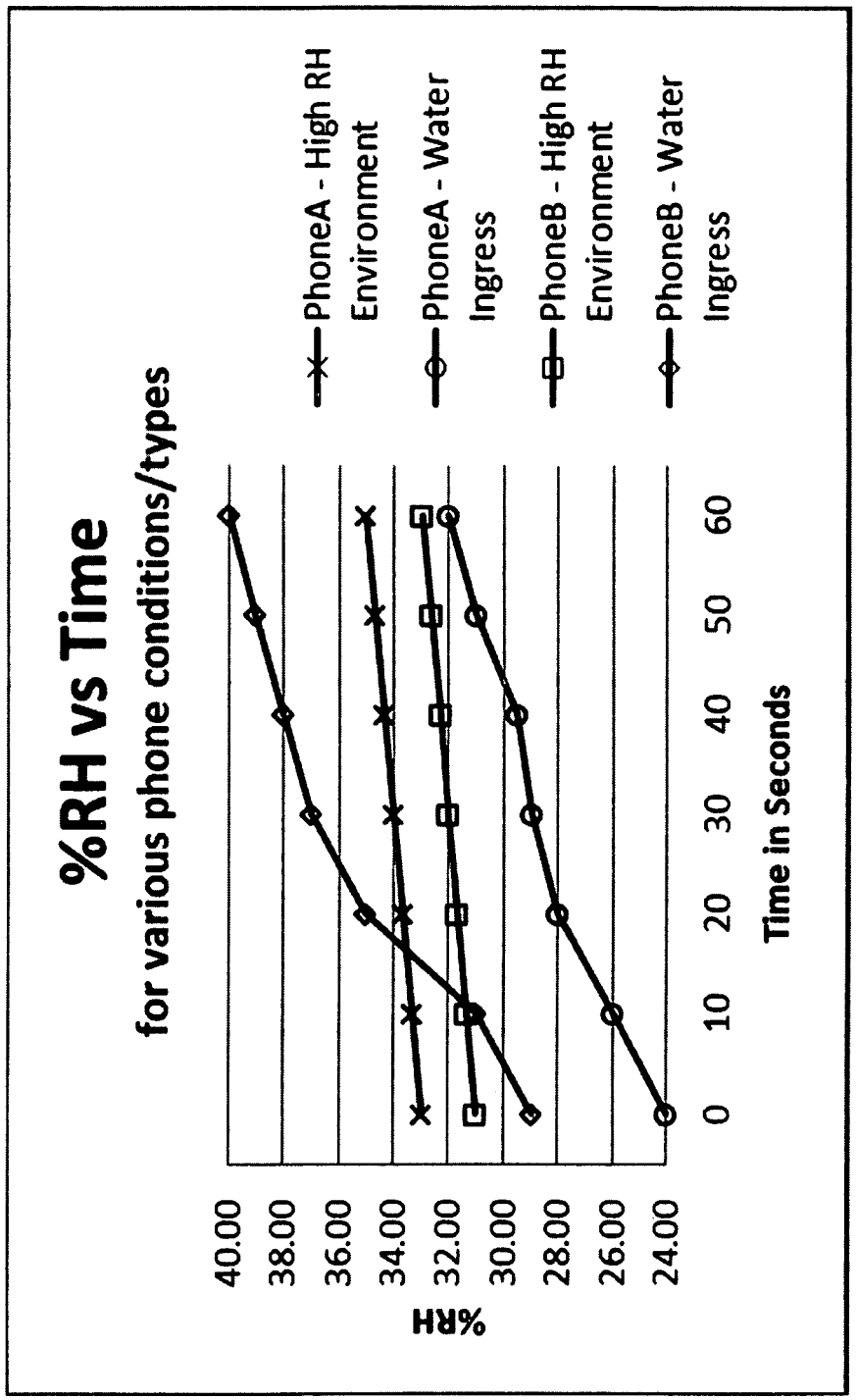
FIG. 21 is a graphical representation of relative humidity over time of two (2) smart phones that have been subjected to a high humidity environment and the same phones subjected to forced water ingress through the various ports.

FIG. 21 depicts a comparison of internal humidity of smart phones subjected to high humidity environments to the internal humidity of the same smart phones subjected to forced ingress of water through various entry points, such as the through-holes depicted in FIG. 19. The graphical data depicted in FIG. 21 represents the response of moisture sensor 236 when mounted to the lithium ion power source 230 as depicted in FIG. 18A. In other embodiments, the moisture sensor 236 has similar responses and response curves when mounted in the various locations depicted in FIG. 20, but the time domain may be shifted such that the humidity change begins earlier or later (while only by several hundred milliseconds). Although it is possible for the general gas exchange and humidity levels to be relatively the same anywhere within certain electronic devices (e.g., certain smart phones), there may nevertheless be certain preferred locations for placement of the moisture sensor within an electronic device, such as the moisture sensor being placed adjacent a speaker, microphone, or power port, or onto the battery itself.

Some embodiments of the present disclosure sensors for directly detecting liquid water intrusion, such as utilize liquid contact indicators (LCIs), either alone or in combination with other types of moisture sensors disclosed herein to detect intrusion of liquid water into the electronic device.

In analyzing the change in relative humidity over time for high environmental humidity conditions and for liquid water ingress, linear regression analysis was performed on the data depicted in in FIG. 21. High environmental humidity conditions were used to simulate use of the electronic device (e.g., cellular phone) in high humidity geographical locations, a user with perspiring hands, or bathroom conditions filled with steam from hot water. As shown in the graphical plots in FIG. 22, the slope of the response of moisture sensor 236 (which, for this testing, was a relative humidity sensor) is much greater for phones subjected to liquid water ingress than for phones subjected to high environmental humidity conditions, e.g., water vapor ingress. It was discovered that the slopes representing liquid water ingress can be 0.1 percent relative humidity per second or greater (0.1% RH/second<=dRH/dt) while the slopes that represent water vapor ingress are frequently between 0.03 and 0.04 percent relative humidity per second (0.03% RH/second<=dRH/dt<=0.04% RH/second). Other testing revealed that the rate-of-change of humidity for water ingress into an electronic device can be at least twice, and in some tested devices four to six times greater, than the rate-of-change of humidity for water vapor ingress. As such, while the initial humidity within an electronic device (e.g., a cellular phone) during water ingress may not exceed a predetermined threshold established to disconnect the power source from the electronic device when the device has been subjected to high humidity conditions for an extended period, the circuitry can nevertheless determine that liquid water is entering the device and disconnect the power source prior to damage occurring. By monitoring the rate-of-change of humidity, embodiments of the present disclosure can prevent damage that can occur prior to the relative humidity within the electronic device reaching a predetermined level set to protect the device against long term exposure to high humidity, which can be particularly beneficial in situations where the absolute humidity levels within the electronic device begin at very low levels during water ingress. Various embodiments of the present disclosure monitor the rate-of-change of relative humidity, and some embodiments use this information to determine if liquid water is entering the device. Embodiments can determine the difference between liquid water and water vapor entering the device and adjust how the circuitry reacts based on that difference. Monitoring the rate-of-change of relative humidity can be used alone or in combination with other monitoring, such as the monitoring of relative humidity in the electronic device.

Some embodiments of the present disclosure disconnect power from the circuitry within the electronic device when the rate-of-change of humidity sensed by the moisture sensor is at 0.1% per second or greater. Further embodiments disconnect power from the circuitry within the device when the rate-of-change of humidity sensed by the moisture sensor is at 0.2% per second or greater. Still further embodiments disconnect power from the circuitry within the device when the rate-of-change of humidity sensed by the moisture sensor is at 0.3% per second or greater.

Some embodiments of the present disclosure disconnect power from circuitry within the electronic device when the rate-of-change of humidity sensed by the moisture sensor exceeds the rate-of-change of humidity sensed by the moisture sensor during testing of water vapor ingress into a similar electronic device. Some embodiments disconnect power from circuitry within the device when the rate-of-change of humidity sensed by the moisture sensor is at least twice (2 times) the rate-of-change of humidity sensed by the moisture sensor during testing of water vapor ingress into a similar electronic device. Further embodiments disconnect power from circuitry within the device when the rate-of-change of humidity sensed by the moisture sensor is at least four (4) times the rate-of-change of humidity sensed by the moisture sensor during testing of water vapor ingress into a similar electronic device. Still further embodiments disconnect power from circuitry within the device when the rate-of-change of humidity sensed by the moisture sensor is at least six (61 times the rate-of-change of humidity sensed by the moisture sensor during testing of water vapor ingress into a similar electronic device.

Figure 23A:
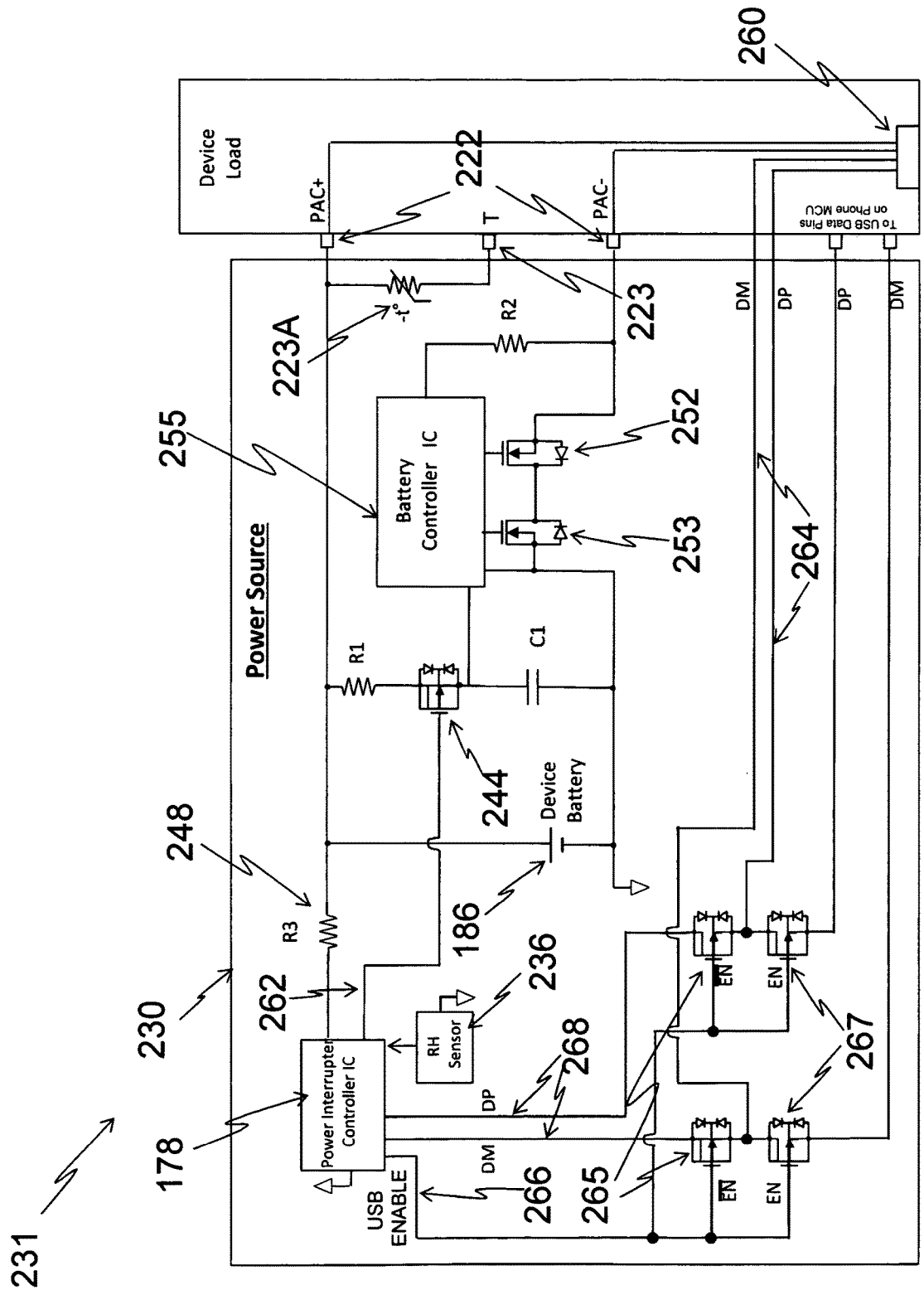
FIG. 23A is a schematic circuit diagram of an electronic power interruption arrangement electrically connected to an electronic device according to one embodiment of the present invention.

Another embodiment for interrupting power to an electronic device is depicted in FIG. 23A. This embodiment includes a reset feature that uses a universal serial bus (USB) charging cord and associated USB signals to reset the power interrupter controller. In this embodiment, power source 230 includes power interrupter switch 244 (e.g., a bi-directional MOSFET switch), interrupter controller 178, power interrupter control line 262, moisture sensor 236, device battery 186, USB control line 266, USB data line enabled low switches 265 (e.g., LOW MOSFET switches), and USB data line enabled high switches 267 (e.g., HIGH MOSFET switches). Charging port 260 has USB data-plus and data-minus (DP/DM) lines 264 electrically connected to a common point of enabled LOW MOSFET switches 265 and enabled HIGH MOSFET switches 267. Power interrupter controller 178 has USB control line 266 electrically connected to the gate controls of enabled LOW MOSFET switches 265 and to the gate controls of enabled HIGH MOSFET switches 267.

Figure 23B:
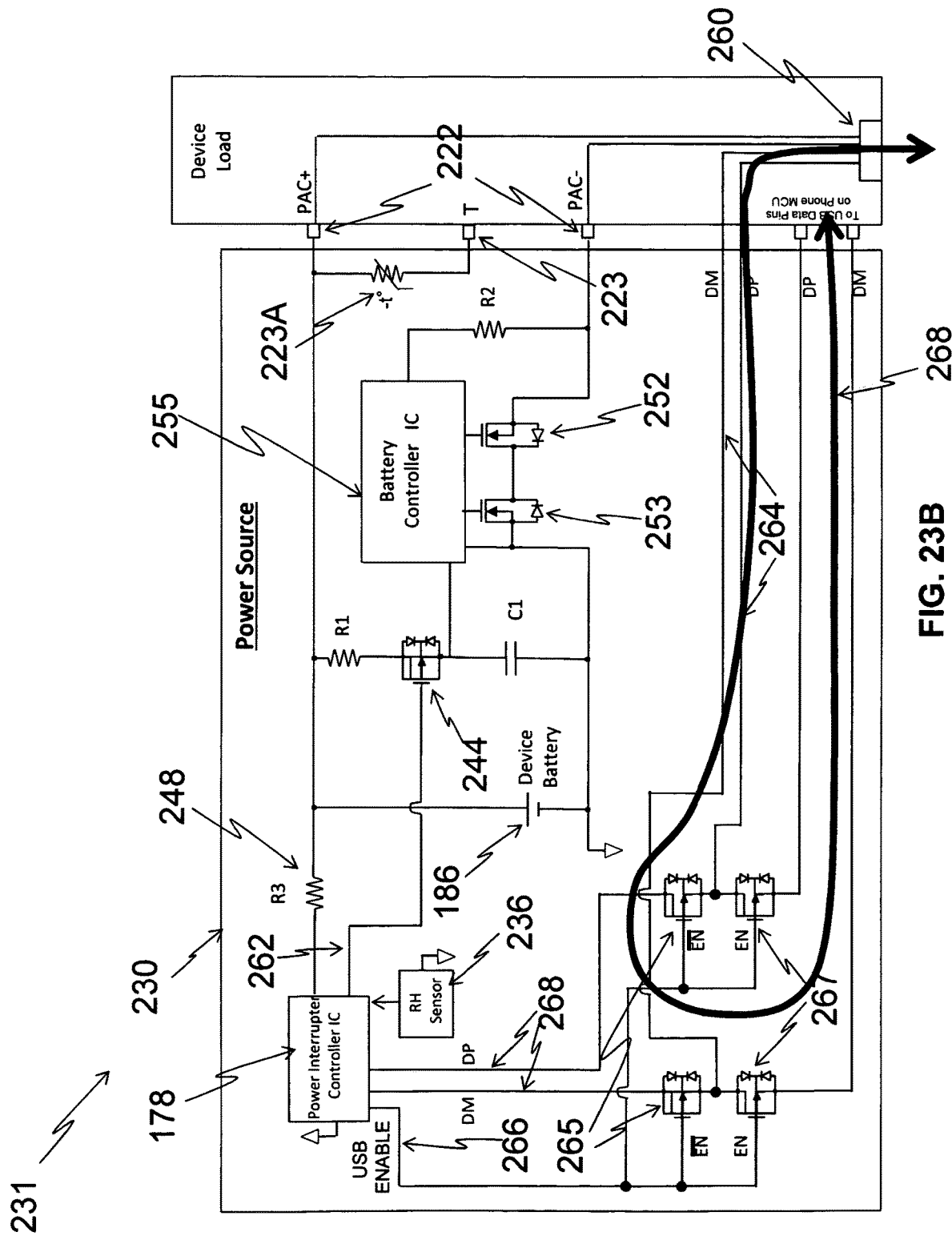
FIG. 23B is a schematic circuit diagram of the embodiment depicted in FIG. 23A in a normal operational electrical state.

Under normal conditions, e.g., no water intrusion, power interrupter controller 178 provides an enable HIGH signal on the USB control line 266, thus turning on enabled HIGH MOSFET switches 267 and providing electrical continuity for normal data handshaking during phone syncing as shown in FIG. 23B and depicted by electrical continuity line 268.

Figure 23C:
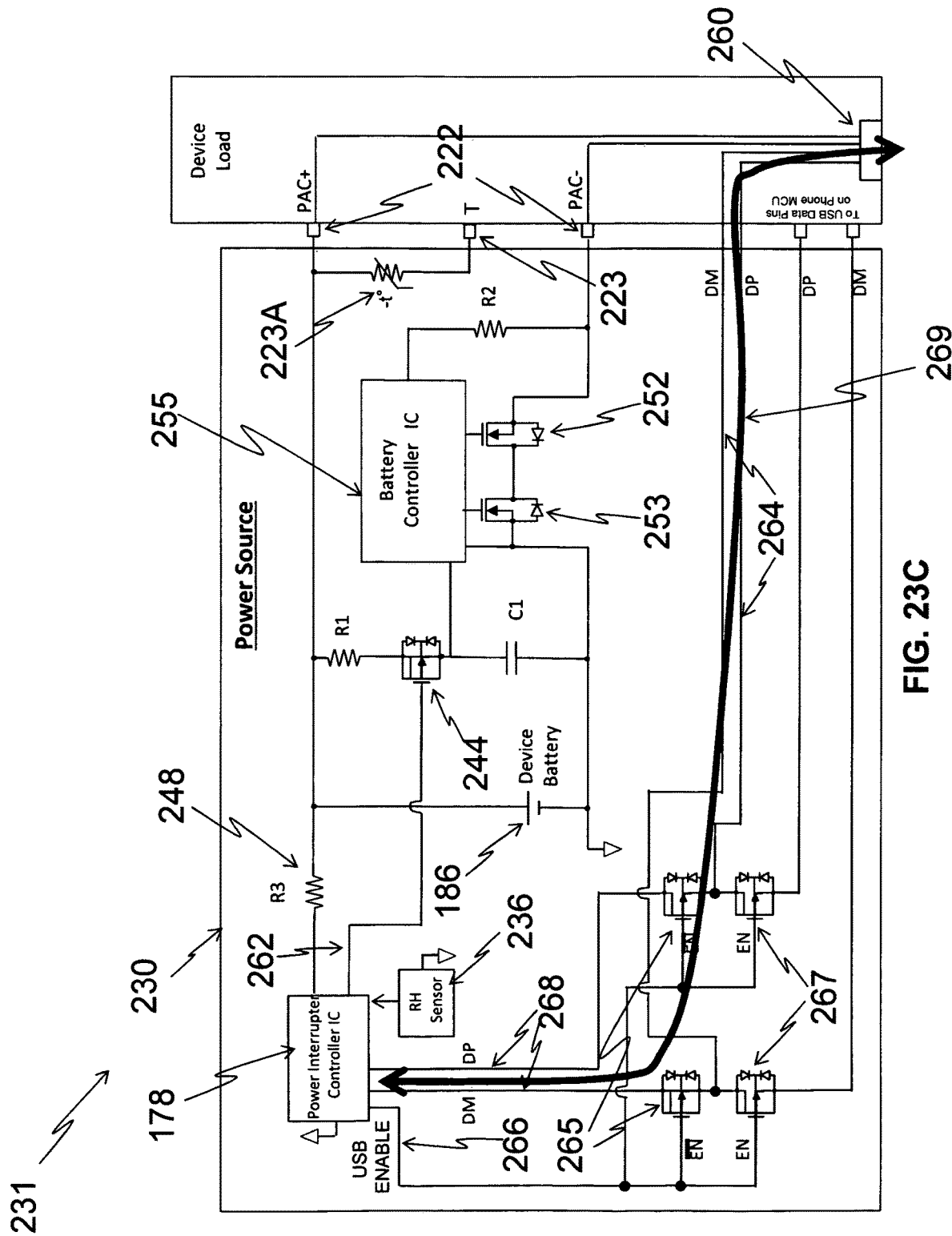
FIG. 23C is a schematic circuit diagram of the embodiment depicted in FIG. 23A under fault conditions.

Under fault conditions, e.g., when power interrupter controller 178 has sensed moisture intrusion, power interrupter controller 178 provides an enable LOW signal on the USB control line 266, which turns on enabled LOW MOSFET switches 265 and provides electrical continuity for fault or reset handshaking as shown in FIG. 23C and depicted by electrical continuity line 269. Power interrupter controller 178 may sense moisture intrusion due to the sensed moisture exceeding a predetermined threshold, or the rate-of-change of sensed moisture (e.g., dRH/dt) exceeding a predetermined threshold. It should be appreciated that other embodiments of the present disclosure may also sense moisture intrusion in these ways.

Power interrupter controller 178 is programed with the necessary algorithms required to sample the moisture sensor 236 via charging port 260, and can reset power interrupter controller 178 if certain RH requirements are met (e.g. RH is below a threshold signifying it has been dried).

For example, controller 178 can handshake with an external controller (e.g., a "reset" box at a retail store) to sense moisture (e.g., humidity) and reset controller 178.

In some embodiments, the power interrupter is configured to be reset by certain types of devices, which may be referred to as reset boxes or reset controllers. In utilizing these embodiments, a reset box may be located at a retail store so that a user with a power interrupter that has disconnected the electronic device from the power source (e.g., battery) can take the electronic device to a retail store to reset the electronic device. Ideally, only a properly configured reset box can be used to reset the electronic device. In at least one embodiment, the configuration of the reset box is to perform handshaking of USB signals on the charging/power cord to allow sampling of the internal environmental conditions of the device. If the moisture is below a safe threshold (e.g., below approximately 30% relative humidity), power interrupter controller 178 algorithms boot-up and take control of charging circuitry. These embodiments can have advantages in that they can drive the consumer to the retail store to seek moisture removal and, if the relative humidity conditions are met, such as following a drying routing, would the reset box allow the device to activate normally.

Once power interrupter controller 178 (though its electrical connection to and poling of moisture sensor 236) has determined the relative humidity is at an acceptable level (for example, less than or equal to 40% or, in some embodiments, less than or equal to 30%), power interrupter controller 178 activates battery control MOSFET switch 244 to an "ON" state using battery MOSFET signal control line 262. Thereafter (and in some embodiments simultaneously, or at least as simultaneously as the circuitry will allow) power interrupter controller 178 activates USB control line 266 and the charging port is once again activated for normal electrical operation as shown is FIG. 23B.

Some embodiments of the present disclosure include the features depicted and described in FIGS. 11-19 and 22A-22C with a pump (one example being pump 7) to enhance the ability of moisture sensor 117 to sample the interior of the electronic device.

Some embodiments of the present disclosure physically incorporate power interruption circuitry with the battery. Advantages to these embodiments include the ability to offer protection to electronic devices that do not have such circuitry as part of the device.

Some embodiments of the present disclosure physically incorporate power interruption circuitry with the electronic device itself. Advantages to these embodiments include reduced costs associated with manufacturing replacement batteries since the protective circuitry is already resident in the device.

Some embodiments of the present disclosure physically incorporate power interruption circuitry with an electronic device that can be inserted between the battery and the device, such as a clip or case (e.g., a case that holds the battery) that is electrically positioned between the battery and the device.

Some embodiments of the present disclosure include a moisture sensor, moisture detector, or water vapor sensor that detects the rate-of-change of moisture or water vapor. The moisture sensor, moisture detector, or water vapor sensor in these embodiments may include a controller, such as to calculate the rate-of-change of moisture using information form the moisture sensor, moisture detector, or water vapor sensor. The optional controller may be a controller as disclosed herein (for example, controller 78/178) or may be a different controller additional to the controllers disclosed herein (such as a separate controller physically attached to the moisture sensor, moisture detector, or water vapor sensor). In embodiments using a controller disclosed herein (e.g., controller 78/178), the moisture sensor, moisture detector, or water vapor sensor may use a portion of the processing ability of controller 78/178 to determine the rate-of-change of moisture being sensed by the moisture sensor.

Controller 78/178 can be a microcontroller, general purpose microprocessor, or generally any type of controller or processor that can perform the requisite control functions. Controller 78/178 can read its program from memory 100, and may be comprised of one or more components configured as a single unit. Alternatively, when of a multi-component form, controller 78/178 may have one or more components located remotely relative to the others. One or more components of controller 78/178 may be of the electronic variety including digital circuitry, analog circuitry, or both. In one example embodiment, controller 78/178 is of a conventional, integrated circuit microprocessor arrangement, such as one or more CORE i7 HEXA processors from INTEL Corporation (450 Mission College Boulevard, Santa Clara, Calif. 95052, USA), ATHLON or PHENOM processors from Advanced Micro Devices (One AMD Place, Sunnyvale, Calif. 94088, USA), POWER8 processors from IBM Corporation (1 New Orchard Road, Armonk, N.Y. 10504, USA), or PIC Microcontrollers from Microchip Technologies (2355 West Chandler Boulevard, Chandler, Ariz. 85224, USA). In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Likewise, memory 100 in various embodiments includes one or more types such as solid-state electronic memory, magnetic memory, or optical memory, just to name a few. By way of non-limiting example, memory 100 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a flash memory device; or a plurality and/or combination of these memory types. Also, memory 100 may be volatile, nonvolatile, or a hybrid combination of volatile and nonvolatile varieties. Memory 100 in various embodiments is encoded with programming instructions executable by controller 78 to perform the automated methods disclosed herein.

The moisture sensors described herein (e.g., moisture sensor 17/117) may detect absolute humidity, relative humidity, and/or specific humidity. The moisture detectors may also detect the presence of liquids, such as water. Moreover, the moisture detector may detect the amount of water (vapor or otherwise) in the electronic device and/or the amount of another gas or liquid that can damage the electronic device if the electronic device has been exposed to the gas or liquid and the electronic device is thereafter connected to an electrical power source.

Although a USB Mini-B connector is depicted herein as a connector 16 for power interrupter 8, other embodiments include any form of standardized or specialized connectors tailored to provide electrical power to specific electronic devices.

Although depicted as a centrifugal pump, pump 7 takes different forms (such as a positive displacement pump or alternate types of dynamic pumps) in alternate embodiments.

In the methods and apparatuses described herein, reference is frequently made to sampling gas (and/or moisture) from within the electronic device and determining whether there are any constituents of the gas (which can include moisture, e.g., water vapor) that could cause a malfunction in the electronic device. One example gas that is sampled is air, which is a combination of various gases and may contain gaseous water, liquid water, and/or other element (or compounds) that could cause the electronic device to malfunction. However, any type of gas that may be within the electronic device (or introduced into the device) may be sampled, and the gas may be evaluated to determine whether there are any type(s) of elements or compounds in the electronic device that could cause the device to malfunction.

As used herein, moisture can refer to any gas, liquid, element or compound that is suspended in (or part of) the gas that is within an electronic device, and in particular can be a gas, liquid, element or compound that can have detrimental effects on the operation of an electronic device when exposed to moisture. One common example of moisture that can have a detrimental effects on electronic devices is water, either in a gaseous or liquid (e.g., vapor or droplet form, or condensed on a surface) state.

Co-pending U.S. application Ser. No. 14/903,886, titled "APPARATUSES AND METHODS FOR CONTROLLING POWER TO ELECTRONIC DEVICES," filed on Jan. 8, 2016 is hereby incorporated by reference for all purposes. International Application No. PCT/US14/046151, titled "APPARATUSES AND METHODS FOR CONTROLLING POWER TO ELECTRONIC DEVICES," filed on Jul. 10, 2014 is also hereby incorporated by reference for all purposes. Additionally, U.S. Provisional Application No. 61/844,654, filed on Jul. 10, 2013 is hereby incorporated by reference for all purposes.

Various aspects of different embodiments of the present disclosure are expressed in paragraphs X1. X2. X3, X4, X5, X6, X7, X8, X9, X10, X11, X12, or X13 as follows:

X1. One embodiment of the present disclosure includes an apparatus for connecting an electronic device to a power source (e.g., an electrical power source), comprising: a power connector configured and adapted to removably connect to and receive electrical energy form an electrical power source; a device connector configured and adapted to removably connect to and deliver electrical energy to an electrical power receptacle of an electronic device: a switch connected to the power connector and the device connector, the switch including a connected condition wherein the power connector is electrically connected to the device connector, and a disconnected condition wherein the power connector is electrically disconnected from the device connector; a pneumatic connector configured and adapted to removably connect to and draw gas from a port of an electronic device; a moisture detector connected to the switch; and a pump connected to the pneumatic connector and the moisture detector, the pump configured and adapted to move gas from the pneumatic connector to the moisture detector; wherein the disconnected condition of the switch is maintained when the power connector is connected to an electrical power source, the device connector is connected to an electrical power receptacle of an electronic device, the pneumatic connector is connected to a port of the electronic device, and the moisture detector detects moisture in the gas from the pneumatic connector exceeds a first predetermined threshold; and wherein the connected condition of the switch is maintained when the power connector is connected to an electrical power source, the device connector is connected to an electrical power receptacle of an electronic device, the pneumatic connector is connected to a port of the electronic device, and the moisture detector detects moisture in the gas from the pneumatic connector does not exceed a second predetermined threshold.

X2. Another embodiment of the present disclosure includes an apparatus, comprising: an electrical connector configured and adapted to connect to a power source and to the power input circuitry of an electronic device, the electrical connector having a connected state, wherein the power source is connected to the power input circuitry of an electronic device, and a disconnected state, wherein the power source is disconnected from the power input circuitry of an electronic device; a moisture detector connected to the electrical connector; and a pump configured and adapted to move gas from within an electronic device to which the electrical connector is connected to the moisture detector; wherein the electrical connector is maintained in the disconnected state when the moisture detector detects moisture in a gas from within an electronic device to which the electrical connector is connected is greater than or equal to a first predetermined threshold; and wherein the electrical connector is maintained in the connected state when the moisture detector detects moisture in a gas from within the electronic device to which the electrical connector is connected is less than a second predetermined threshold.

X3. Another embodiment of the present disclosure includes a method, comprising the acts of: sampling air from within an electronic device; measuring the moisture in the sampled device air; and maintaining a disconnection between the source of electrical power and the electronic device when the moisture within the sampled device air exceeds a first predetermined threshold.

X4. Another embodiment of the present disclosure includes an electrical power device configured and adapted to connect to and disconnect from an electronic device, comprising: an electronic device connector configured and adapted to connect to and disconnect from an electronic device; a power connector; a water vapor sensor; and a switch connected to the electronic device connector, the power connector, and the water vapor sensor; wherein, when the electronic device connector is connected to an electronic device and the power connector is connected to a source of electrical power, the water vapor sensor senses water vapor in the electronic device, and the switch inhibits connection of the power connector to the electronic device connector when the sensed water vapor from within the electronic device is not below a first threshold.

X5. Another embodiment of the present disclosure includes a method of manufacturing an electrical connector, comprising the acts of: connecting a moisture sensor to a pneumatic connector, the moisture sensor configured and adapted to detect moisture in a gas, and the pneumatic connector configured and adapted to connect to a port in pneumatic communication with the interior of an electronic device; connecting a switch to the moisture sensor; connecting the switch to a power input connector, the power input connector being configured and adapted to connect to and receive electrical power from a power source; and connecting the switch to a power output connector, the power output connector being configured and adapted to connect to and deliver electrical power to an electrical power port of an electronic device; wherein the switch maintains an electrical connection between the power input connector and the power output connector when the moisture sensor detects moisture in a gas received from the pneumatic connector is below a first threshold.

X6. Another embodiment of the present disclosure includes an apparatus, comprising: a moisture detector configured and adapted to obtain gas from an electronic device and detect moisture within a gas sample; and a switch connected to the moisture detector, the switch configured and adapted to connect to a source of electrical power and to the power input circuitry of an electronic device, the switch including a disconnected state wherein the switch is configured and adapted to electrically isolate a source of electrical power to which the switch is connected from the power input circuitry of an electronic device to which the switch is connected when the moisture detector detects the moisture within the electronic device to which the switch is connected is at or above a first predetermined threshold.

X7. Another embodiment of the present disclosure includes an apparatus, comprising: a moisture detector; and means for controlling the flow of electrical energy from a power source to which the moisture detector is connected to an electronic device to which the moisture detector is connected in response to the detection of moisture by the moisture detector.

X8. Another embodiment of the present disclosure includes an electronic apparatus including a battery powering a load. A switching device is connected to the battery and is connected to the load. The switching device has a first state in which the battery is enabled to power the load through the switching device, and a second state in which the battery is prevented from powering the load. A moisture sensor (e.g., a liquid water or vapor water sensor) senses humidity associated with the apparatus. A control device is connected to the switching device and to the moisture sensor. The control device switches the switching device between the first state and the second state dependent upon humidity sensed by the moisture sensor.

X9. Another embodiment of the present disclosure includes an electronic apparatus including a battery powering a load. A switching device is connected to the battery and is connected to the load. The switching device has a first state in which the battery is enabled to power the load through the switching device, and a second state in which the battery is prevented from powering the load. An electrical current sensor senses electrical current drawn from the battery. A control device is connected to the switching device and to the electrical current sensor. The control device switches the switching device between the first state and the second state dependent upon electrical current sensed by the electrical current sensor.

X10. Another embodiment of the present disclosure includes an electronic apparatus including a battery connected to a load. A switching device is connected to the load and to the battery and has a first state in which the battery is enabled to power the load through the switching device, and a second state in which the battery is prevented from powering the load. A moisture sensor (e.g., a liquid water or vapor water sensor) senses humidity associated with the apparatus. A control device is connected to the switching device and to the moisture sensor. The control device switches the switching device between the first state and the second state dependent upon humidity sensed by the moisture sensor. The load, the battery, the switching device, the moisture sensor and the control device are each contained within at least one housing. The at least one housing includes a through-hole having a size allowing water vapor to enter the at least one housing. The moisture sensor is disposed adjacent to the through-hole.

X11. Still another embodiment of the present disclosure includes a method, comprising the acts of: sensing moisture within an electronic device, the electronic device including electronic circuitry powered by an electrical power source; and disconnecting the circuitry within the electronic device from the power source based on the moisture sensed.

X12. Still a further embodiment of the present disclosure includes a method of manufacturing a battery, comprising the acts of: connecting a moisture sensor to a battery, the moisture sensor configured and adapted to detect moisture in a gas: and connecting a switch to the battery, the switch including a power output connector configured to connect to an electrical device, wherein the switch maintains an electrical disconnection between the battery and the power output connector when the moisture sensor detects moisture in a gas received from the pneumatic connector is at or above a first threshold.

X13. Yet another embodiment of the present disclosure includes a method of manufacturing a power interrupter for interrupting power from a battery, comprising the acts of: connecting a moisture sensor to a switch, the switch including a battery connector configured to electrically connect to a battery, and an electrical device connector configured to electrically connect to an electrical device; wherein the switch maintains an electrical connection between the battery connector and the electrical device connector when the moisture sensor senses moisture below a first threshold; and wherein the switch maintains an electrical disconnection between the battery connector and the electrical device connector when the moisture sensor senses moisture above a second threshold.

Yet other embodiments include the features described in any of the previous statements X1, X2, X3, X4, X5, X6, X7, X8, X9, X10, X11, X12, or X13, as combined with (i) one or more of the previous statements X1, X2, X3, X4, X5, X6, X7, X8, X9. X10, X11. X12, or X13, (ii) one or more of the aspects disclosed in [0181]-[334], or (iii) one or more of the previous statements X1, X2, X3, X4, X5, X6, X7, X8, X9, X10, X11, X12, or X13, and one or more of the aspects disclosed in paragraphs [0181]-[334].

Wherein the disconnected condition of the switch is maintained when the moisture detector is malfunctioning.

Wherein the disconnected state of the electrical connector is maintained when the moisture detector is malfunctioning.

Determining whether the device performing said measuring is malfunctioning.

Maintaining a disconnection between the source of electrical power and the electronic device when the device performing said measuring is malfunctioning.

Wherein the switch inhibits connection of the power connector to the electronic device connector when the water vapor sensor is malfunctioning.

Wherein the switch maintains an electrical disconnection between the power input connector and the power output connector when the moisture sensor is malfunctioning.

Wherein the disconnected state of the switch is maintained when the moisture detector is malfunctioning.

Means for determining when the moisture detector is malfunctioning.

Wherein said means for controlling the flow of electrical energy from a power source to which the moisture detector is connected to an electronic device to which the moisture detector is connected electrically disconnects a power source to which the moisture detector is connected from an electronic device to which the moisture detector is connected when said means for determining determines the moisture detector is malfunctioning.

Wherein the moisture detector detects water vapor, and wherein the first and second thresholds are water vapor thresholds.

Wherein the moisture detector detects humidity, and wherein the first and second thresholds are humidity thresholds.

Wherein the moisture detector detects water vapor, and wherein the first and second predetermined thresholds are water vapor thresholds.

Wherein the moisture detector detects humidity, and wherein the first and second predetermined thresholds are humidity thresholds.

Wherein said measuring includes measuring the water vapor in the sampled device air.

Wherein said measuring includes measuring the humidity in the sampled device air. Wherein the water vapor sensor senses the humidity in the electronic device, and wherein the first and second thresholds are humidity thresholds.

Wherein the moisture sensor is configured and adapted to detect water vapor; and wherein the first and second thresholds are water vapor thresholds.

Wherein the moisture sensor is configured and adapted to detect humidity; and wherein the first and second thresholds are humidity thresholds.

Wherein the moisture detector detects water vapor, and wherein the first and second thresholds are water vapor thresholds.

Wherein the moisture detector detects humidity, and wherein the first and second thresholds are humidity thresholds.

Wherein the moisture detector detects water vapor in the electronic device to which the moisture detector is connected, and wherein said means for controlling is in response to the water vapor detected by the moisture detector.

Wherein the moisture detector detects humidity in the electronic device to which the moisture detector is connected, and wherein said means for controlling is in response to the humidity detected by the moisture detector.

Maintaining a connection between the source of electrical power and the electronic device when the moisture within the sampled device air does not exceed the second predetermined threshold.

Wherein the switch maintains an electrical disconnection between the power input connector and the power output connector when the moisture sensor detects moisture in a gas received from the pneumatic connector is at or above a second threshold.

Wherein the switch includes a connected state wherein the switch is configured and adapted to electrically connect a source of electrical power to which the switch is connected from the power input circuitry of an electronic device to which the switch is connected when the moisture detector detects the moisture within the electronic device to which the switch is connected is below a second predetermined threshold.

Wherein said sampling includes moving air from within the electronic device to a moisture detector.

Wherein said measuring includes measuring the moisture in the sampled device air with the moisture detector.

Wherein said sampling includes decreasing pressure within the power interrupter. Wherein the switch connects the power connector to the electronic device connector when the sensed water vapor from within the electronic device is below a second threshold.

A pneumatic connector configured and adapted to connect to a port of an electronic device.

A pump configured and adapted to move gas from the pneumatic connector to the water vapor sensor.

Wherein, when the electronic device connector and the pneumatic connector are connected to an electronic device and the power connector is connected to a source of electrical power, the pump moves gas from the electronic device to which the pneumatic connector is connected to the water vapor sensor.

Connecting a pneumatic pump to the moisture sensor and the pneumatic connector, wherein the pump moves gas from the pneumatic connector to the moisture sensor.

A pump configured and adapted to move gas from an electronic device to the moisture detector.

Means for moving air from within the electronic device to the moisture detector. Wherein the electrical connector, the moisture detector, and the pump are located within a device configured and adapted to removably connect to an electronic device.

Wherein the power connector is configured and adapted to connect to and disconnect from a power source.

Wherein the pneumatic connector and the power output connector are configured and adapted to connect to and disconnect from one or more external ports of an electronic device.

Wherein the pneumatic connector is configured and adapted to connect to an internal port of an electronic device and remain connected to the internal port of the electronic device during user operation.

Wherein the moisture detector and the switch are configured and adapted to repeatedly connect to and disconnect from one or more external ports of an electronic device by hand. Means for repeatedly connecting the moisture detector to a power source and an electronic device.

Means for repeatedly disconnecting the moisture detector from a power source and an electronic device.

Wherein the electrical connector, the moisture detector, and the pump are located within the electronic device to which the electrical connector is connected.

Wherein the moisture detector is configured and adapted to connect to an internal port of an electronic device and remain connected to the internal port of the electronic device during user operation.

Wherein the moisture detector is configured and adapted to connect to an internal port of an electronic device and remain connected to the internal port of the electronic device during user operation.

Means for inhibiting the flow of electrical energy from the power source to the electronic device to which the moisture detector is connected when the moisture detected by the moisture detector exceeds a first threshold.

An interrupter connected to the device connector, the interrupter configured and adapted to interrupt the flow of electrical energy from a power storage member in the electronic device to which the device connector is connected to other portions of the circuitry in the electronic device to which the device connector is connected when the moisture detector detects moisture in the gas from the pneumatic connector exceeds a third predetermined threshold.

Wherein the first predetermined threshold and the third predetermined threshold are the same.

Wherein the first predetermined threshold and the third predetermined threshold are different.

An interrupter connected to the electrical connector, the interrupter configured and adapted to interrupt the flow of electrical energy from a power storage member in the electronic device to which the electrical connector is connected to other portions of the circuitry in the electronic device to which the electrical connector is connected when the moisture detector detects moisture in a gas from within an electronic device to which the electrical connector is connected is greater than or equal to a third predetermined threshold.

Wherein the first predetermined threshold and the third predetermined threshold are the same.

Wherein the first predetermined threshold and the third predetermined threshold are different.

Interrupting the flow of electrical energy from a power storage member in the electronic device to other portions of the circuitry in the electronic device when the moisture within the sampled device air exceeds a third predetermined threshold.

Wherein the first predetermined threshold and the third predetermined threshold are the same.

Wherein the first predetermined threshold and the third predetermined threshold are different.

An interrupter connected to the electronic device connector, the interrupter configured and adapted to interrupt the flow of electrical energy from a power storage member in the electronic device to which the electronic device connector is connected to other portions of the circuitry in the electronic device to which the electrical connector is connected when the sensed water vapor from within the electronic device is not below a third threshold.

Wherein the first threshold and the third threshold are the same.

Wherein the first threshold and the third threshold are different.

Connecting an interrupter to the power output connector, the interrupter configured and adapted to interrupt the flow of electrical power from a power storage member in an electronic device to which the power output connector is configured and adapted to connect to other portions of the circuitry in the electronic device to which the power output connector is configured and adapted to connect when the moisture sensor detects moisture in a gas received from the pneumatic connector is at or above a third threshold.

Wherein the first threshold and the third threshold are the same.

Wherein the first threshold and the third threshold are different.

An interrupter connected to the moisture detector, the interrupter configured and adapted to interrupt the flow of electrical energy from a power storage member in the electronic device to which the moisture connector is connected to other portions of the circuitry in the electronic device to which the moisture connector is connected when the moisture detector detects the moisture within the electronic device to which the switch is connected is at or above a third predetermined threshold.

Wherein the first predetermined threshold and the third predetermined threshold are the same.

Wherein the first predetermined threshold and the third predetermined threshold are different.

Means for interrupting the flow of electrical energy from a power storage member in an electronic device to which the moisture detector is connected to other portions of the circuitry in the electronic device to which the moisture detector is connected when the moisture detected by the moisture detector exceeds a third threshold Wherein the first threshold and the third threshold are the same.

Wherein the first threshold and the third threshold are different. A sensor configured and adapted to detect when the device connector is connected to an electrical power receptacle of an electronic device, wherein the disconnected condition of the switch is maintained when the sensor has not detected a connection between the device connector and an electrical power receptacle of an electronic device.

A sensor configured and adapted to detect when the electrical connector is connected to the power input circuitry of an electronic device, wherein the disconnected state of the electrical connector is maintained when the sensor has not detected a connection between the electrical connector and the power input circuitry of an electronic device.

A sensor configured and adapted to detect when the electronic device connector is connected to an electronic device.

Wherein the switch inhibits connection of the power connector to the electronic device connector when the sensor has not detected a connection between the electronic device connector and an electronic device.

Connecting a connection sensor to the switch, the connection sensor configured and adapted to detect when the power output connector is connected to an electrical power port of an electronic device.

Wherein the switch maintains an electrical disconnection between the power input connector and the power output connector when the connection sensor has not detected a connection between the power output connector and an electrical power port of an electronic device.

A sensor configured and adapted to detect when the switch is connected to an electrical power receptacle of an electronic device, wherein the disconnected state of the switch is maintained when the sensor has not detected a connection between the switch and an electrical power receptacle of an electronic device.

Means for detecting when the moisture detector is connected to an electrical power receptacle of an electronic device.

Means for inhibiting the flow of electrical energy from a power source to which the moisture detector is connected to the electrical power receptacle of an electronic device to which the moisture detector is connected when said means for detecting has not detected a connection between the moisture detector and the electrical power receptacle of an electronic device.

Wherein the first predetermined threshold and the second predetermined threshold are the same.

Wherein the first predetermined threshold and the second predetermined threshold are different.

Wherein the first threshold and the second threshold are the same. Wherein the first threshold and the second threshold are different.

Means for facilitating the flow of electrical energy from the power source to the electronic device to which the moisture detector is connected when the moisture detected by the moisture detector does not exceed a second threshold.

Wherein the pneumatic connector and the device connector are configured and adapted to connect to the same port of an electronic device.

Wherein the pneumatic connector and the device connector are configured and adapted to connect to different ports of an electronic device.

A pneumatic connector configured and adapted to removably connect to and draw gas from a port of an electronic device;

Wherein the pneumatic connector and the electrical connector are configured and adapted to connect to the same port of an electronic device.

Wherein the pneumatic connector and the electrical connector are configured and adapted to connect to different ports of an electronic device.

Wherein said connecting includes connecting an electrical connector of the power interrupter to an electrical port of an electronic device, and connecting a pneumatic connector of the power interrupter to a pneumatic port of an electronic device.

Wherein said sampling air includes sampling air through the pneumatic connector.

Wherein said connecting includes connecting the electrical connector and the pneumatic connector to the same port of an electronic device.

Wherein said connecting includes connecting the electrical connector and the pneumatic connector to different ports of an electronic device.

Wherein said connecting includes connecting the electrical connector and the pneumatic connector to different ports of an electronic device.

Wherein the pneumatic connector and the electronic device connector are configured and adapted to connect to the same port of an electronic device.

Wherein the pneumatic connector and the electronic device connector are configured and adapted to connect to different ports of an electronic device.

Wherein the pneumatic connector and the power output connector are configured and adapted to connect to the same port of an electronic device.

Wherein the pneumatic connector and the power output connector are configured and adapted to connect to different ports of an electronic device.

A pneumatic connector connected to the moisture detector, the pneumatic connector configured and adapted to removably connect to a first port of an electronic device and direct gas from the first port to the moisture detector when connected to the first port.

An electrical connector connected to the switch, the electrical connector configured and adapted to removably connect to a second port of an electronic device and electrically connect the switch and the second port when connected to the second port.

Wherein the pneumatic connector and the electrical connector are configured and adapted to removably connect to the same port of an electronic device.

Wherein the pneumatic connector and the electrical connector are configured and adapted to connect to different ports of an electronic device.

Wherein the means for pneumatically connecting and the means for electrically connecting connect to the same port of an electronic device.

Wherein the means for pneumatically connecting and the means for electrically connecting connect to different ports of an electronic device.

Wherein the moisture detector detects moisture in the ambient air, and wherein the determination of whether the moisture detector detects moisture in the gas from the pneumatic connector does not exceed a second predetermined threshold includes a comparison of the moisture measured in the ambient air and the moisture measured in the gas from the pneumatic connector.

Wherein the moisture detector detects moisture in the ambient air, and wherein the determination of whether moisture in a gas from within the electronic device to which the electrical connector is connected is less than a second predetermined threshold includes a comparison of the moisture measured in the ambient air and the moisture measured from within the electronic device to which the electrical connector is connected.

Sampling ambient air from outside the electronic device.

Measuring the moisture in the sampled ambient air.

Wherein said maintaining a connection between the source of electrical power and the electronic device includes comparing the moisture in the sampled device air to the moisture in the sampled ambient air.

Wherein the water vapor sensor senses water vapor in the ambient air outside the electronic device.

Wherein the determination of whether the sensed water vapor from within the electronic device is below a first threshold includes a comparison of the sensed water vapor from within the electronic device and the sensed water vapor from the ambient air.

Wherein the moisture sensor is configured and adapted to sense moisture in the ambient air outside the electrical connector and outside an electronic device to which the electrical connector is connected.

Wherein the determination whether the moisture sensor detects moisture in a gas received from the pneumatic connector is below a first threshold includes a comparison of the sensed moisture in the ambient air and the sensed moisture in a gas received from the pneumatic connector.

Wherein the moisture detector detects moisture in the ambient air. and wherein the determination of whether moisture within the electronic device to which the switch is connected is below a first predetermined threshold includes a comparison of the moisture detected in the ambient air and the moisture detected from within the electronic device to which the switch is connected.

Wherein the moisture detector detects moisture in the electronic device to which the moisture detector is connected and in the ambient air outside the electronic device to which the moisture detector is connected.

Wherein the electrical connector includes a standard electrical power connector for connecting the device to a source of power.

Wherein said means for controlling includes a switch, the apparatus comprising:

Means for pneumatically connecting the moisture detector to a pneumatic port of an electronic device.

Means for electrically connecting the switch to an electrical port of an electronic device.

Wherein the power input connector is configured and adapted to repeatedly connect to and disconnect from a power source by hand.

Wherein the power output connector is configured and adapted to repeatedly connect to and disconnect from an electrical power port of an electronic device;

Connecting a power interrupter to a source of electrical power and to the electronic device.

Determining when said connecting occurs, wherein said maintaining a connection occurs after said determining.

Wherein said sampling, measuring, maintaining a disconnection, and maintaining a connection are performed with a power interrupter.

Wherein the electronic device is inoperative.

Wherein the electronic device is inoperative as a result of moisture intrusion.

Wherein the control device switches the switching device from the first state to the second state in response to the moisture sensor sensing humidity above a threshold value.

Wherein the control device switches the switching device from the first state to the second state in response to the moisture sensor sensing humidity rising at a rate with respect to time that is above a threshold value.

Wherein the control device switches the switching device from the first state to the second state in response to the moisture sensor sensing relative humidity rising at a rate of at least 0.1% per second.

Wherein the moisture sensor is disposed adjacent to a through-hole of a housing containing the battery and/or the load.

Wherein the switching device is a bi-directional metal oxide field effect transistor. Wherein the moisture sensor is disposed on a same circuit board as a power source connector tab that is connected to the battery.

Wherein the electrical current sensor is a Hall Effect sensor.

Wherein the control device switches the switching device from the first state to the second state in response to the electrical current sensor sensing current above a threshold value.

Wherein the control device switches the switching device from the first state to the second state in response to the electrical current sensor sensing current rising at a rate with respect to time that is above a threshold value.

Wherein the moisture sensor is in fluid communication with the through-hole.

Wherein the through-hole has a diameter of at least 0.25 millimeters.

Wherein the battery comprises a lithium ion battery.

Wherein the through-hole is masked by a membrane to allow water vapor penetration but to prevent liquid water penetration.

Wherein the masked membrane is made of expanded Polytetrafluoroethylene (PTFE) Teflon.

Wherein the PTFE membrane is expanded in such a manner to allow water vapor to be removed from the moisture sensor during eventual vacuum drying.

Wherein said sensing includes sensing the rate-of-change of moisture within the electronic device.

Testing one or more electronic test devices for the rate-of-change of moisture within the electronic device as liquid water enters the electronic device.

Determining a threshold rate-of-change of moisture to indicate ingress of liquid water based on said testing.

Wherein said disconnecting occurs when the rate-of-change of moisture within the electronic device exceeds the threshold rate-of-change.

Wherein said sensing includes sensing an instantaneous level of moisture in the device.

Reconnecting the circuitry within the electronic device with the power source when the sensed moisture is below a threshold value.

Receiving a reset signal, wherein said reconnecting occurs after said receiving. Sensing the presence of a magnetic field external to the electronic device, wherein said reconnecting occurs after said sensing.

Wherein the first threshold and the second threshold are the same.

Wherein the first threshold and the second threshold are different.

Wherein the moisture detector detects the rate-of-change of moisture within the electronic device. Wherein the moisture detector detects an instantaneous level of moisture within the electronic device.

Wherein the moisture sensor detects the rate-of-change of moisture within the electronic device.

Wherein the moisture sensor detects an instantaneous level of moisture within the electronic device.

Wherein the water vapor sensor detects the rate-of-change of moisture within the electronic device.

Wherein the water vapor sensor detects an instantaneous level of moisture within the electronic device.

Wherein said measuring the moisture in the sampled device air includes measuring the rate-of-change of moisture in the sampled device air.

Wherein said maintaining a disconnection includes maintaining a disconnection when the rate-of-change of moisture within the sampled air exceeds a first predetermined threshold.

Wherein said measuring the moisture in the sampled device air includes measuring the instantaneous level of moisture in the sampled device air.

Wherein said maintaining a disconnection includes maintaining a disconnection when the instantaneous level of moisture of the sampled air exceeds a first predetermined threshold.

Wherein the moisture sensor is configured and adapted to detect the rate-of-change of moisture in a gas.

Wherein the moisture sensor is configured and adapted to detect an instantaneous level of moisture in a gas.

Wherein the first, second and third thresholds are rate-of-change of moisture thresholds.

Wherein the first, second and third thresholds are instantaneous levels of moisture thresholds.

In some embodiments, an apparatus is provided. The apparatus comprises: a battery configured to power a load; a switching device connected to the battery, the switching device having a first state in which the battery is enabled to power the load through the switching device, and a second state in which the battery is prevented from powering the load; a moisture sensor configured to sense moisture data associated with moisture in the apparatus; and a control device connected to the switching device and to the moisture sensor, the control device being configured to switch the switching device between the first state and the second state based on the moisture data.

In some embodiments, the moisture data comprises a humidity, and wherein the control device is configured to switch the switching device from the first state to the second state in response to the humidity data rising at a rate, with respect to time, above a threshold value.

In some embodiments, the moisture sensor is disposed adjacent to a through-hole of a housing comprising at least one of the battery and the load.

In some embodiments, the through-hole is masked by a membrane to enable vapor penetration but to prevent liquid penetration.

In some embodiments, the moisture sensor is disposed on a same circuit board as a power source connector tab connected to the battery.

In some embodiments, an apparatus is provided, comprising: a battery configured to power a load; a switching device connected to the battery, the switching device comprising a first state in which the battery is enabled to power the load through the switching device, and a second state in which the battery is prevented from powering the load; a current sensor configured to sense current data associated with current drawn from the battery; and a control device connected to the switching device and to the current sensor, the control device being configured to switch the switching device between the first state and the second state based at least partially on the current data associated with the current sensed by the current sensor.

In some embodiments, the control device is configured to switch the switching device from the first state to the second state in response to the current data being equal to or greater than a threshold value.

In some embodiments, the control device is configured to switch the switching device from the first state to the second state in response to the current data rising at a rate with respect to time that is above a threshold value.

In some embodiments, the apparatus further comprises a moisture sensor configured to sense humidity associated with the apparatus, the control device being configured to switch the switching device between the first state and the second state based at least partially on humidity data associated with the humidity sensed by the moisture sensor.

In some embodiments, the control device is configured to switch the switching device from the first state to the second state in response to the humidity data being equal to or greater than a first threshold value or a rate of rise of the humidity data being equal to or greater than above a second threshold value.

In some embodiments, a method is provided for manufacturing a power interrupter for interrupting power from a battery, comprising the acts of: connecting a moisture sensor to a switch or to a battery, the moisture sensor sensing moisture data associated with moisture in an electronic device; connecting the switch to the battery, the switch including an electronic device connector configured to connect to the electronic device, wherein the switch establishes, based on the moisture data, or maintains, based on the moisture data, a connection or a disconnection between the battery and the electronic device.

In some embodiments, the battery is comprised in the electronic device.

In some embodiments, the battery is located outside the electronic device.

In some embodiments, the moisture data comprises a rate of change of the moisture.

In some embodiments, the connection between the battery and the electronic device is based on a first threshold, and wherein the disconnection between the battery and the electronic device is based on a second threshold.

In some embodiments, the first threshold is approximately equal to the second threshold, or wherein the first threshold is different from the second threshold.

In some embodiments, an apparatus is provided, comprising: a connector configured to connect to a power source and to the power circuitry of an electronic device, the connector comprising: a connected state, wherein the power source is connected to the power circuitry of the electronic device, and a disconnected state, wherein the power source is disconnected from the power circuitry of the electronic device; and a moisture detector connected to the connector, wherein the moisture detector detects moisture data associated with moisture in the electronic device, and wherein the connector is maintained in or switched to, based on the moisture data, the disconnected state such that the power source is disconnected from the power circuitry of the electronic device, or the connected state such that the power source is connected to the power circuitry of the electronic device.

In some embodiments, the connector is maintained in or switched to the disconnected state when the moisture data associated with the moisture in the electronic device to which the connector is connected is greater than or equal to a first threshold, or wherein the connector is maintained in the connected state when the moisture data associated with the moisture in the electronic device to which the connector is connected is less than a second threshold.

In some embodiments, the first predetermined threshold and the second predetermined threshold are at least approximately the same.

In some embodiments, the first predetermined threshold and the second predetermined threshold are different.

In some embodiments, the apparatus comprises a pump configured to move gas from within the electronic device to which the connector is connected.

In some embodiments, the moisture in the electronic device comprises moisture in the gas moved from within the electronic device to which the connector is connected.

In some embodiments, the connector, the moisture detector, and the pump are comprised in the electronic device to which the connector is connected.

In some embodiments, the connector, the moisture detector, and the pump are comprised a device configured to connect to the electronic device.

In some embodiments, the connector and the moisture detector are comprised in the electronic device to which the connector is connected.

In some embodiments, the connector and the moisture detector are comprised in a device configured to connect to the electronic device.

In some embodiments, the apparatus further comprises a pneumatic connector configured to connect to and draw gas from a port of the electronic device.

In some embodiments, the pneumatic connector and the connector are configured and adapted to connect to the same port of the electronic device.

In some embodiments, the pneumatic connector and the connector are configured to connect to different ports of the electronic device.

In some embodiments, the disconnected state of the connector is maintained when the moisture detector malfunctions.

In some embodiments, the moisture data comprises humidity data.

In some embodiments, the humidity data comprises a rate of change of humidity.

In some embodiments, the electronic device comprises a portable electronic device.

In some embodiments, the apparatus further comprises a sensor configured to detect when the connector is connected to the power circuitry of the electronic device, wherein the disconnected state of the connector is maintained when the sensor has not detected a connection between the connector and the power circuitry of the electronic device.

In some embodiments, the moisture detector detects ambient moisture data associated with moisture in ambient air, and wherein the connector is maintained in or switched to, based on the ambient moisture data, the disconnected state such that the power source is disconnected from the power circuitry of the electronic device, or the connected state such that the power source is connected to the power circuitry of the electronic device.

In some embodiments, the apparatus further comprises an interrupter connected to the connector, the interrupter configured to interrupt, based on the moisture data, flow of energy from a power storage in the electronic device to other portions of the power circuitry in the electronic device.

In some embodiments, an apparatus is provided comprising: a moisture detector configured to detect moisture in an electronic device; and a switch connected to the moisture detector, the switch configured to connect or disconnect a source of power with electronic circuitry of an electronic device, the switch configured to switch between a: a disconnected state, wherein, in the disconnected state, the switch is configured to isolate the source of power to which the switch is connected from the electronic circuitry of the electronic device to which the switch is connected, and a connected state, wherein, in the connected state, the switch is configured to connect the source of power to which the switch is connected to the electronic circuitry of the electronic device to which the switch is connected, wherein the switch is configured to switch between the disconnected state and the connected state based on moisture data associated with the moisture in the electronic device.

In some embodiments, the source of power is comprised in the electronic device.

In some embodiments, the source of power is located outside the electronic device.

While illustrated examples, representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment (such as the particular circuitry depicted in any of the illustrated embodiments) may be used in combination with features of other embodiments (such as the electronic circuitry depicted in any other illustrated embodiment) as would be understood by one of ordinary skill in the art. whether or not explicitly described as such. Exemplary embodiments have been shown and described, and all changes and modifications that come within the spirit of the disclosure are desired to be protected.

The invention claimed is:

1. An apparatus comprising:
   a battery configured to power a load;
   a switching device connected to the battery, the switching device having a first state in which the battery is enabled to power the load through the switching device, and a second state in which the battery is prevented from powering the load;
   a moisture sensor configured to sense moisture data associated with moisture in the apparatus, wherein the moisture data comprises humidity data; and
   a control device connected to the switching device and to the moisture sensor, the control device being configured to switch the switching device between the first state and the second state based at least partially on a comparison of the humidity data, obtained from a first port internal to the apparatus, with second humidity data associated with ambient air located outside the apparatus obtained from a second port external to the apparatus.

2. The apparatus of claim 1, wherein the control device is configured to switch the switching device from the first state to the second state in response to the humidity data rising at a rate, with respect to time, above a third threshold value.

3. The apparatus of claim 1, wherein the moisture sensor is disposed adjacent to a through-hole of a housing comprising at least one of the battery and the load.

4. The apparatus of claim 3, wherein the through-hole is masked by a membrane to enable vapor penetration but to prevent liquid penetration.

5. The apparatus of claim 1, wherein the moisture sensor is disposed on a same circuit board as a power source connector tab connected to the battery.

6. The apparatus of claim 1, wherein the control device is commanded from an external source.

7. The apparatus of claim 1, wherein the control device is commanded from a memory in the control device.

8. The apparatus of claim 1, wherein the moisture sensor is connected to a three-way valve, wherein the three-way valve comprises the first port internal to the apparatus and the second port external to the apparatus.

9. The apparatus of claim 1, further comprising a pump for moving air to the moisture sensor.

10. The apparatus of claim 1, wherein the control device calculates a difference between the humidity data in the apparatus and the second humidity data external to the apparatus.

11. The apparatus of claim 10, wherein the moisture sensor senses the humidity data, and wherein a second moisture sensor senses the second humidity data.

12. The apparatus of claim 1, wherein the apparatus is comprised in a hearable.

13. An apparatus comprising:
   a battery configured to power a load;
   a switching device connected to the battery, the switching device comprising a first state in which the battery is enabled to power the load through the switching device, and a second state in which the battery is prevented from powering the load;
   a moisture sensor configured to sense moisture data associated with moisture in the apparatus, wherein the moisture data comprises humidity data;
   a current sensor configured to sense current data associated with current drawn from the battery; and
   a control device connected to the switching device, to the moisture sensor, and to the current sensor, the control device being configured to switch the switching device between the first state and the second state based at least partially on the current data associated with the current sensed by the current sensor, and based at least partially on a comparison of the humidity data, obtained from a first port internal to the apparatus, with second humidity data associated with ambient air located outside the apparatus obtained from a second port external to the apparatus.

14. The apparatus of claim 13, wherein the current data comprises a rate of change of the current data with respect to time.

15. The apparatus of claim 13, wherein the control device is configured to switch the switching device from the first state to the second state in response to the humidity data being equal to or greater than a first threshold value or a rate of rise of the humidity data being equal to or greater than a second threshold value.

16. A method of operating a power interrupter for interrupting power from a battery, comprising the acts of:
   connecting a moisture sensor to a switch or to the battery, the moisture sensor sensing moisture data associated with moisture in an electronic device,
   wherein the moisture data comprises humidity data; and
   connecting the switch to the battery, the switch including an electronic device connector configured to connect to a load of the electronic device, wherein the switch selectively establishes or maintains; a connection or a disconnection between the battery and the load of the electronic device based at least partially on a comparison of the humidity data, obtained from a first port internal to the electronic device, with second humidity data associated with ambient air located outside the electronic device obtained from a second port external to the electronic device, and wherein the moisture sensor, the battery, and the switch are comprised in the electronic device.

17. The method of claim 16, wherein the moisture data comprises a rate of change of the moisture.

* * * * *